(12) United States Patent
Katsuta et al.

(10) Patent No.: US 10,444,895 B2
(45) Date of Patent: Oct. 15, 2019

(54) INPUT DETECTION DEVICE AND ELECTRONIC DEVICE

(71) Applicant: Japan Display Inc., Tokyo (JP)

(72) Inventors: Tadayoshi Katsuta, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 163 days.

(21) Appl. No.: 15/619,069

(22) Filed: Jun. 9, 2017

(65) Prior Publication Data

US 2017/0357368 A1    Dec. 14, 2017

(30) Foreign Application Priority Data

Jun. 10, 2016 (JP) ................. 2016-116231

(51) Int. Cl.
*G06F 3/046* (2006.01)
*G06F 3/041* (2006.01)
*G06F 3/044* (2006.01)
*G06F 3/0354* (2013.01)
*G02F 1/1333* (2006.01)

(52) U.S. Cl.
CPC ........ *G06F 3/0416* (2013.01); *G06F 3/03545* (2013.01); *G06F 3/044* (2013.01); *G06F 3/046* (2013.01); *G06F 3/0412* (2013.01); *G02F 1/13338* (2013.01); *G06F 2203/04106* (2013.01); *G06F 2203/04108* (2013.01)

(58) Field of Classification Search
CPC .. G06F 3/0416; G06F 3/03545; G06F 3/0412; G06F 3/046; G02F 1/13338
See application file for complete search history.

(56) References Cited

U.S. PATENT DOCUMENTS

| 5,682,019 A | 10/1997 | Katsurahira et al. |
| 8,115,499 B2 | 2/2012 | Osoinach et al. |
| 8,797,281 B2 * | 8/2014 | Simmons ............. G06F 3/0416 345/173 |

(Continued)

FOREIGN PATENT DOCUMENTS

| CN | 101387929 A | 3/2009 |
| CN | 102439539 A | 5/2012 |

(Continued)

OTHER PUBLICATIONS

Notification of Opinion on Examination issued in connection with Taiwanese Patent Application No. 106116260, dated Mar. 26, 2018. (6 pages).

(Continued)

*Primary Examiner* — Ricardo Osorio
(74) *Attorney, Agent, or Firm* — K&L Gates LLP

(57) ABSTRACT

An input detection device includes a plurality of drive electrodes which are arranged in parallel to each other in plan view, and each of which has a pair of ends. At least one drive electrode among the plurality of drive electrodes is driven such that a first drive state where a first drive voltage is supplied to one end of the drive electrode and a second drive voltage different from the first drive voltage is supplied to the other end of the drive electrode and a second drive state where the second drive voltage is supplied to the one end and the first drive voltage is supplied to the other end temporally alternately occur.

16 Claims, 25 Drawing Sheets

(56) References Cited

U.S. PATENT DOCUMENTS

| | | | |
|---|---|---|---|
| 9,134,827 B2* | 9/2015 | Small | G06F 3/044 |
| 9,569,046 B2 | 2/2017 | Kim et al. | |
| 2007/0124515 A1 | 5/2007 | Ishikawa et al. | |
| 2009/0065267 A1 | 3/2009 | Sato | |
| 2013/0321341 A1* | 12/2013 | Takahama | G06F 3/0416 |
| | | | 345/174 |
| 2014/0354596 A1* | 12/2014 | Djordjev | G06K 9/0002 |
| | | | 345/175 |
| 2015/0002984 A1* | 1/2015 | Teh | H01L 25/16 |
| | | | 361/277 |
| 2015/0103035 A1* | 4/2015 | Kim | G06F 3/041 |
| | | | 345/174 |
| 2016/0196785 A1* | 7/2016 | Amesz | G02F 1/167 |
| | | | 345/690 |
| 2016/0349921 A1* | 12/2016 | Mizuhashi | G06F 3/046 |
| 2017/0115817 A1 | 4/2017 | Kim et al. | |
| 2017/0131798 A1 | 5/2017 | Geaghan et al. | |
| 2017/0261387 A1* | 9/2017 | Vosgueritchian | G01L 1/2268 |
| 2017/0285848 A1* | 10/2017 | Rosenberg | G06F 3/0202 |
| 2017/0357367 A1* | 12/2017 | Katsuta | G06F 3/0416 |
| 2018/0059461 A1* | 3/2018 | Katsuta | G02F 1/13338 |

FOREIGN PATENT DOCUMENTS

| | | |
|---|---|---|
| JP | H07-020624 U | 4/1995 |
| JP | H10-049301 A | 2/1998 |
| JP | 2006-085488 A | 3/2006 |
| JP | 2006-085490 A | 3/2006 |
| TW | 201523409 A | 6/2015 |
| TW | 201617799 A | 5/2016 |

OTHER PUBLICATIONS

Japanese Office Action issued in related Japanese Patent Application No. 2016-116231 dated Sep. 3, 2019 and English translation of same. 7 pages.

* cited by examiner

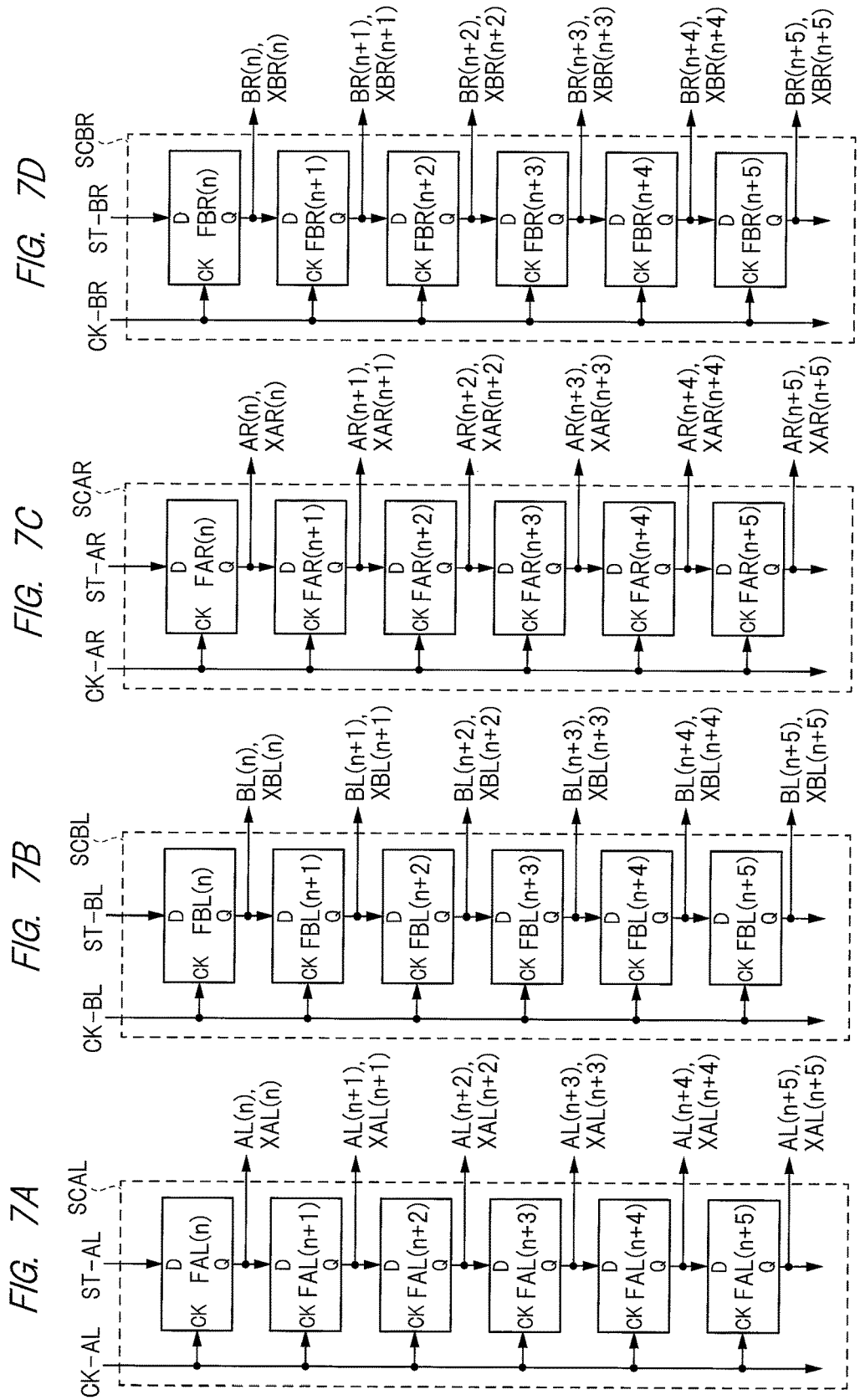

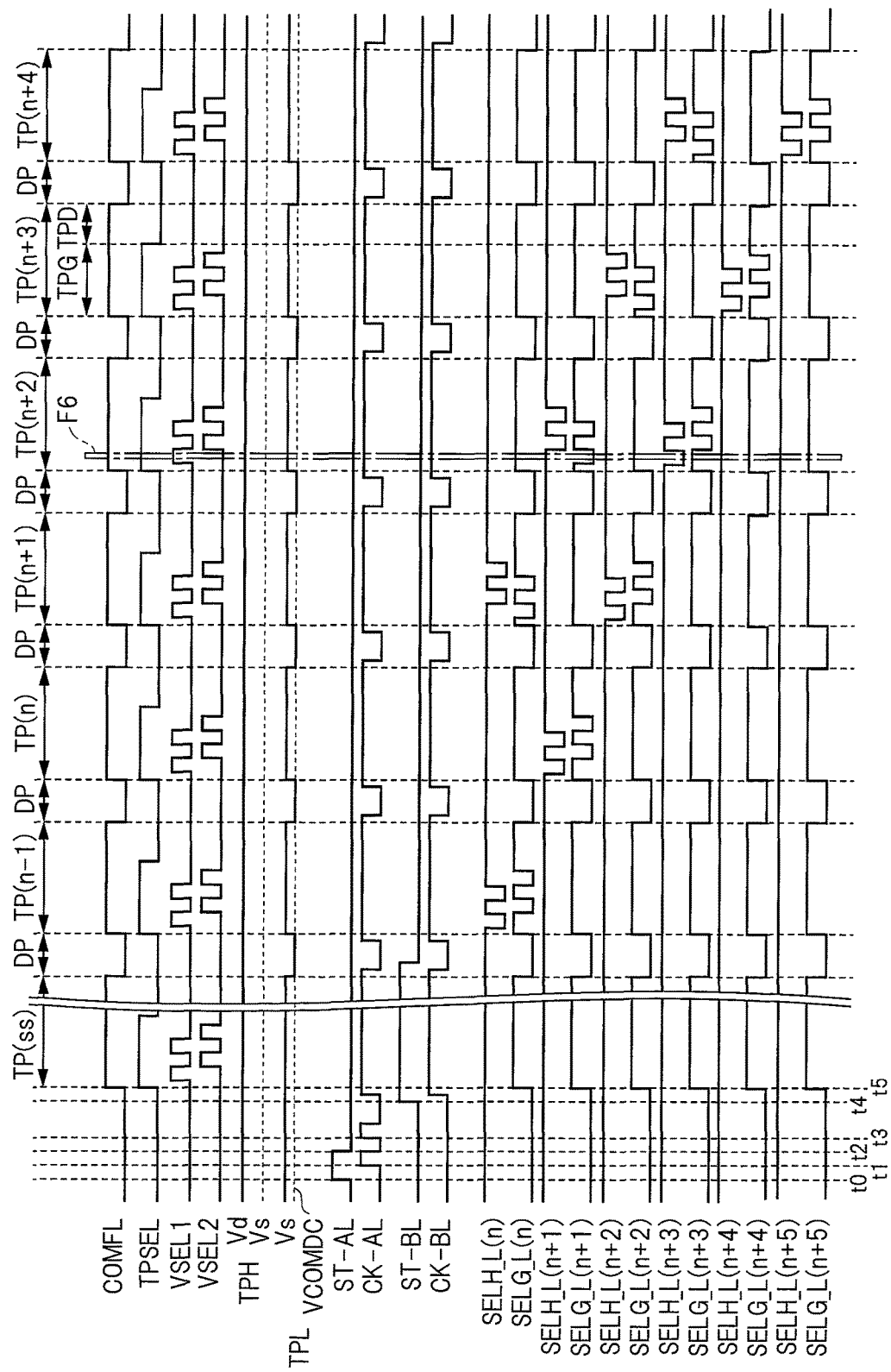

INPUT DETECTION DEVICE AND ELECTRONIC DEVICE

CROSS-REFERENCE TO RELATED APPLICATION

The present application claims priority from Japanese Patent Application No. 2016-116231 filed on Jun. 10, 2016, the content of which is hereby incorporated by reference into this application.

TECHNICAL FIELD OF THE INVENTION

The present invention relates to an input detection device and an electronic device, and particularly relates to an input detection device and an electronic device with a touch detection function capable of detecting proximity of an external object.

BACKGROUND OF THE INVENTION

An input detection device capable of detecting proximity or contact of an external object, so-called a touch panel, has been known. Such a touch panel can be used in combination with a display device in which liquid crystal, an OLED, or the like are used and can be mounted on electronic equipment such as a mobile phone or a tablet.

A capacitive sensing touch panel has been known as an example of the input detection device which detects an external object such as a finger. In addition, a touch panel capable of detecting a pen such as a stylus, as an external object, also has been known. With a pen, a region smaller than a region that can be designated with a finger can be designated, and a handwritten character can be input. An electromagnetic induction touch panel has been known as an example of the method for detecting touch with a pen.

A technique related to the electromagnetic induction touch panel is described, for example, in Japanese Patent Application Laid-Open Publication No. H10-49301 (Patent Document 1).

SUMMARY OF THE INVENTION

In a magnetic induction touch panel, for example, an input detection device includes a coil which generates a magnetic field (hereinafter also referred to as a magnetic field generation coil) and a coil which detects a magnetic field (hereinafter also referred to as a magnetic field detection coil). In addition, a pen, which is an external object, incorporates a coil and a capacitive element which constitute a resonance circuit.

When the pen is in proximity to the input detection device, the magnetic field generation coil and the coil inside the pen are magnetically coupled to each other. In this case, when a current flowing through the magnetic field generation coil changes, an induction voltage is generated at the coil inside the pen due to electromagnetic induction, and the capacitive element inside the pen is charged. According to the electric charge quantity charged in the capacitive element inside the pen, the coil inside the pen generates a magnetic field, and the magnetic field detection coil detects the magnetic field. Thus, proximity of the pen is detected.

However, in such a touch panel, there are the following problems: when a charged quantity of the capacitance inside the pen is insufficient, detection sensitivity lowers, a detection period becomes longer in order to compensate for the lowering of the detection sensitivity, and the like.

An object of the present invention is to provide an input detection device capable of improving detection sensitivity of such an electromagnetic induction touch panel.

According to one aspect of the present invention, an input detection device includes a plurality of drive electrodes which are arranged in parallel to each other in plan view and each of which has a pair of ends. Here, at least one first drive electrode among the plurality of drive electrodes is driven such that a first drive state where a first drive voltage is supplied to one end of the first drive electrode and a second drive voltage different from the first drive voltage is supplied to the other end of the first drive electrode and a second drive state where the second drive voltage is supplied to the one end and the first drive voltage is supplied to the other end temporally alternately occur.

Also, according to one aspect of the present invention, an input detection device includes a drive electrode and generates a magnetic field by making a current flow through the drive electrode. Here, the drive electrode includes one end and the other end, and in the input detection device, a first drive state where a current flows from the one end to the other end and a second drive state where a current flows from the other end to the one end temporally alternately occur in an identical drive electrode, and thus, a direction of a magnetic field generated by the drive electrode is reversed at a time interval.

BRIEF DESCRIPTIONS OF THE DRAWINGS

FIG. 7A is a block diagram schematically illustrating a configuration of a scanner circuit according to the first embodiment;

FIG. 7B is another block diagram schematically illustrating a configuration of a scanner circuit according to the first embodiment;

FIG. 7C is a block diagram schematically illustrating a configuration of another scanner circuit according to the first embodiment;

FIG. 7D is a block diagram schematically illustrating a configuration of another scanner circuit according to the first embodiment;

FIG. 11 is a waveform diagram illustrating an entire operation of the magnetic field touch detection according to the first embodiment;

DESCRIPTIONS OF THE PREFERRED EMBODIMENTS

Figure 1A:
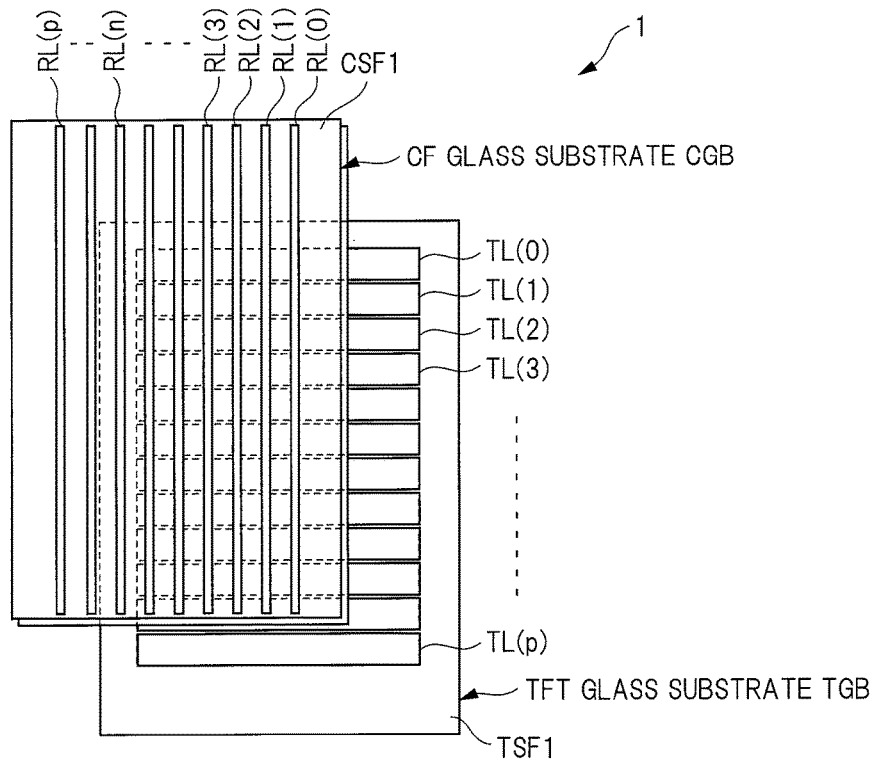
FIG. 1A is a plan view illustrating a configuration of a display device.

Hereinafter, embodiments of the present invention will be described with reference to the accompanying drawings. Note that this disclosure is an example only and suitable modifications which can be easily conceived by those skilled in the art without departing from the gist of the present invention are included within the scope of the present invention as a matter of course. In addition, in order to further clarify the description, a width, a thickness, a shape, and the like of respective portions may be more schematically illustrated in the drawings than those in an actual state, but they are examples only and do not limit the interpretation of the present invention.

In addition, in this specification and the respective drawings, the same components described in the drawings which have been described before are denoted by the same reference characters, and detailed description thereof may be omitted as needed. Hereinafter, a liquid crystal display device with a touch detection function will be described as an example of an input detection device; however, the input detection device is not limited to this. For example, the input detection device may be a device which includes a device for displaying an image and a device for touch detection. Also, the input detection device may be the device for touch detection without the device for displaying an image. The device for touch detection may be a device which includes an electromagnetic induction touch panel and a capacitive sensing touch panel. Also, the device for touch detection may be a device which includes an electromagnetic induction touch panel without a capacitive sensing touch panel. The device for displaying an image may be a liquid crystal display device, an OLED display device, or the like. Also, in this specification, touch means direct contact or approach to a front surface of the input detection device.

First Embodiment

A first embodiment provides a liquid crystal display device with a touch detection function (hereinafter also referred to as a display device). The display device is capable of detecting both touch with a pen and touch with a finger. That is, in the first embodiment, an electromagnetic induction touch panel and a capacitive sensing touch panel are incorporated in the liquid crystal display device. In other words, the display device of the first embodiment includes at least one of a substrate or an electrode that serves for both as a component of the liquid crystal display device and as a component of the touch panel. First, the basic configuration of the display device will be described. Next, principles of magnetic field detection (hereinafter also referred to as magnetic field touch detection) detecting touch with a pen and electric field detection (hereinafter also referred to as electric field touch detection) detecting touch with a finger will be described.

<Basic Configuration of Display Device>

Figure 1B:
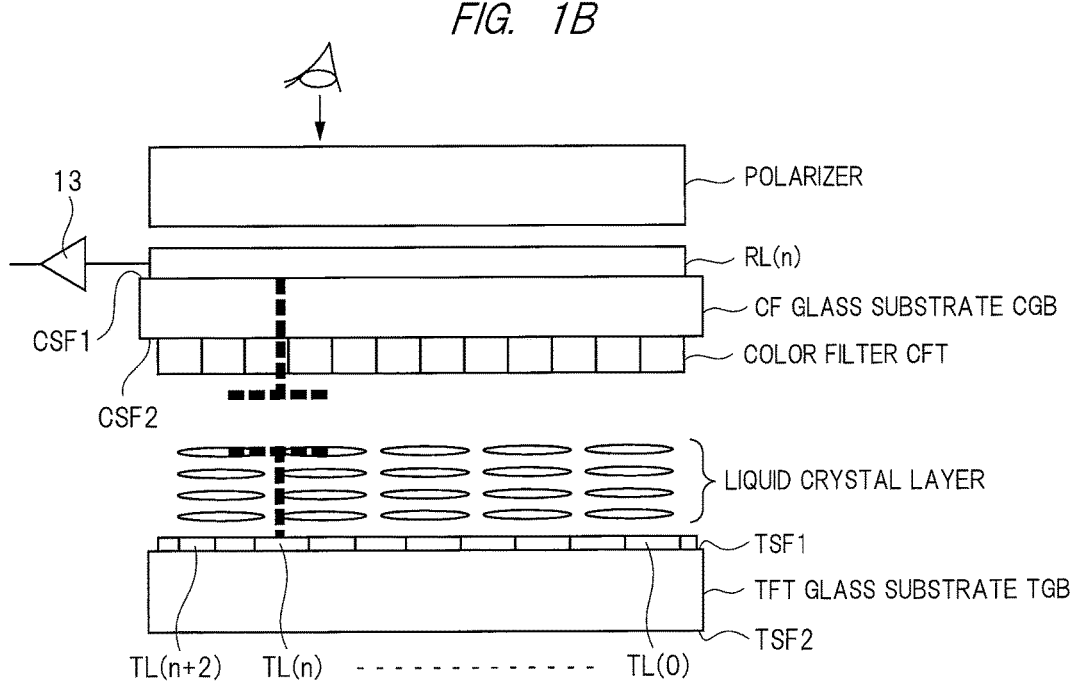
FIG. 1B is a cross-sectional view illustrating the configuration of the display device.

FIGS. 1A and 1B are views schematically illustrating the configuration of the display device. In FIGS. 1A and 1B, reference numeral 1 denotes the display device. FIG. 1A is a plan view illustrating a plane of the display device 1, and FIG. 1B is a cross-sectional view illustrating a cross section of the display device 1. The display device 1 includes a TFT (Thin Film Transistor) glass substrate (hereinafter also referred to as an insulating first substrate or simply referred to as a first substrate) TGB, a layer layered over the first substrate TGB, a color filter CFT, a CF (Color Filter) glass substrate (hereinafter also referred to as an insulating second substrate or simply referred to as a second substrate) CGB, and a layer layered over the second substrate CGB. Also, the first substrate TGB and the second substrate CGB are not limited to glass substrates. For example, at least one of the first substrate TGB and the second substrate CGB may be a resin substrate.

In FIG. 1A, reference characters TL(0) to TL(p) denote drive electrodes configured of the layer formed over a first main surface TSF1 of the first substrate TGB. Also, reference characters RL(0) to RL(p) denote detection electrodes formed on a first main surface CSF1 of the second substrate CGB. In FIG. 1A, the first substrate TGB and the second substrate CGB are illustrated such that the substrates are separated from each other. However, in reality, as illustrated in FIG. 1B, the first substrate TGB and the second substrate CGB are arranged such that the first main surface TSF1 of the first substrate TGB and a second main surface CSF2 of the second substrate CGB face each other across a liquid crystal layer.

In FIG. 1B, the drive electrodes TL(0) to TL(n+2), the liquid crystal layer, and the color filter CFT are arranged between the first main surface TSF1 of the first substrate TGB and the second main surface CSF2. The plurality of detection electrodes RL(0) to RL(p) and a polarizer are arranged over the first main surface CSF1 of the second substrate CGB. Reference numeral 13 denotes a unit detection circuit connected to the detection electrode RL(n).

In the present specification, a description will be given assuming that, as illustrated in FIG. 1A, a state of the display device 1 viewed from a side of the first main surface CSF1 of the second substrate CGB and the first main surface TSF1 of the first substrate TGB is a plan view (a viewing direction illustrated in FIG. 1B). In plan view, the drive electrodes TL(0) to TL(p) extend in a row direction (lateral direction) and are arranged in parallel to each other in a column direction (longitudinal direction) on the first main surface TSF1 of the first substrate TGB. In addition, the detection electrodes RL(0) to RL(p) extend in the column direction (longitudinal direction) and are arranged in parallel to each other in the row direction (lateral direction) on the first main surface CSF1 of the second substrate CGB.

The drive electrodes TL(0) to TL(p) and the detection electrodes RL(0) to RL(p) are arranged such that the drive electrodes and the detection electrodes three-dimensionally cross with each other and are electrically isolated from each other. A capacitance formed between the drive electrode TL and the detection electrode RL is depicted by dashed lines in FIG. 1B.

In FIG. 1A, the drive electrodes TL(0) to TL(p) and the detection electrodes RL(0) to RL(p) are arranged such that the drive electrodes and the detection electrodes are perpendicular to each other; however, the arrangement of the drive electrodes and the detection electrodes is not limited to this, and the drive electrodes and the detection electrodes may cross at a predetermined angle. In the present embodiment, the drive electrodes TL(0) to TL(p) can serve as electromagnetic induction touch drive electrodes and capacitive sensing touch drive electrodes, and the detection electrodes RL(0) to RL(p) can serve as electromagnetic induction touch detection electrodes and capacitive sensing touch detection electrodes. In addition, the drive electrodes TL(0) to TL(p) can also serve as a common electrode of the display device.

<Principles of Magnetic Field Detection>

Figure 2A:
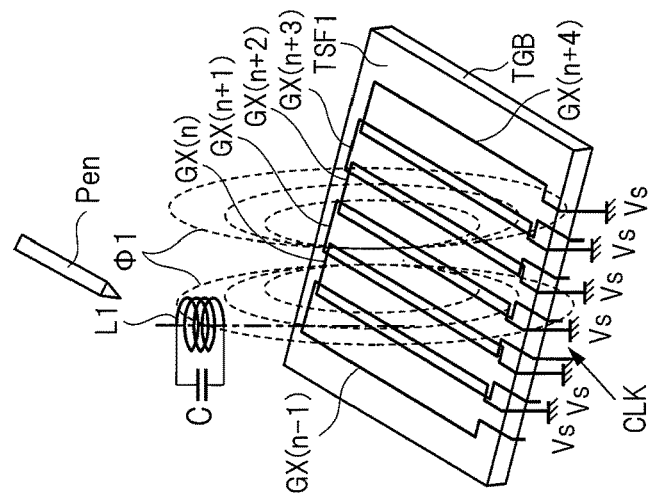
FIG. 2A is an explanatory diagram illustrating a principle of an electromagnetic induction method.
Figure 2B:
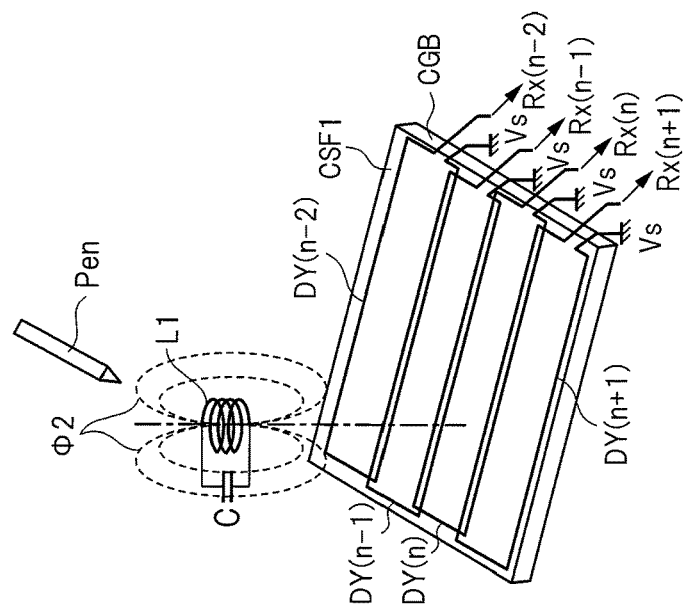
FIG. 2B is an explanatory diagram illustrating the principle of the electromagnetic induction method.
Figure 2C:
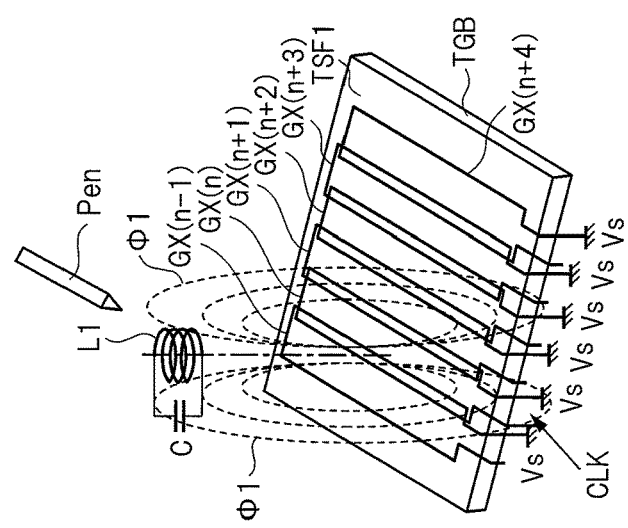
FIG. 2C is an explanatory diagram illustrating the principle of the electromagnetic induction method.

FIGS. 2A to 2C are explanatory diagrams illustrating principles in detecting a pen, that is, principles of magnetic field detection. A period of magnetic field detection is configured of a magnetic field generation period in which a magnetic field is generated and a magnetic field detection period in which a magnetic field is detected. FIGS. 2A and 2C each illustrate an operation during the magnetic field generation period, and FIG. 2B illustrates an operation during the magnetic field detection period. Note that FIGS. 2A to 2C illustrate states obtained by rotating FIG. 1A by 90 degrees.

During the magnetic field generation period, ends of predetermined drive electrodes among the drive electrodes TL(0) to TL(p) are electrically connected, and a first voltage and a magnetic field drive signal are supplied to the drive electrodes whose ends are connected. The first voltage is a DC voltage, for example, a ground voltage Vs. For example, among one end and the other end of each of the drive electrodes TL(0) and TL(2) illustrated in FIG. 1A, the other end of each of the drive electrodes TL(0) and TL(2) on the right side in FIG. 1A is electrically connected. Thus, the drive electrodes TL(0) and TL(2) arranged in parallel to each other are connected in series. The ground voltage Vs is supplied to the one end of the drive electrode TL(0) on the left side in FIG. 1A, and the magnetic field drive signal is supplied to the one end of the drive electrode TL(2) on the left side in FIG. 1A. Here, the magnetic field drive signal is a signal whose voltage periodically changes. The drive electrodes TL(0) and TL(2) constitute a magnetic field generation coil where a region interposed (a region formed) by the drive electrodes is located inside the coil. The magnetic field generation coil generates a magnetic field corresponding to a change in voltage of the magnetic field drive signal inside the coil.

In FIG. 2A, reference character GX(n−1) denotes the magnetic field generation coil constituted by the drive electrodes TL(0) and TL(2). Similarly to the magnetic field generation coil GX(n−1), reference characters GX(n) to GX(n+4) denote magnetic field generation coils constituted by the drive electrodes TL(1) and TL(3) to TL(p).

In FIG. 2A, reference characters C and L1 denote a capacitive element and a coil incorporated in a pen Pen, respectively. The capacitive element C and the coil L1 are connected in parallel such that the capacitive element and the coil constitute a resonance circuit. In the magnetic field generation period, the ground voltage Vs is supplied to one end of each of the magnetic field generation coils GX(n−1) to GX(n+3). A magnetic field drive signal CLK is supplied to the other end of the magnetic field generation coil GX(n). Therefore, the magnetic field generation coil GX(n) generates a magnetic field $\varphi 1$ corresponding to a change in voltage of the magnetic field drive signal CLK. When the pen Pen is in proximity to the magnetic field generation coil GX(n), the magnetic field generation coil GX(n) and the coil L1 are electromagnetically coupled, the magnetic field $\varphi 1$ causes an induced voltage due to mutual induction to be generated in the coil L1, and the capacitive element C is charged.

Next, the magnetic field generation period transitions to the magnetic field detection period illustrated in FIG. 2B. In the magnetic field detection period, a magnetic field is detected by using the detection electrodes RL(0) to RL(p). Each of the detection electrodes RL(0) to RL(p) includes a pair of ends. Among one ends and the other ends of the detection electrodes RL(0) to RL(p), the other ends of predetermined detection electrodes are electrically connected to each other. For example, the other ends of the detection electrodes RL(0) and RL(3) illustrated in FIG. 1A are electrically connected to each other on the upper side in FIG. 1A. Therefore, the detection electrodes RL(0) and RL(3) arranged in parallel to each other are connected in series. In the magnetic field detection period, a second voltage is supplied to the one end of the detection electrode RL(3), and the one end of the detection electrode RL(0) is connected to the unit detection circuit. The second voltage is a DC voltage, for example, a ground voltage Vs. Thus, a magnetic field detection coil is formed, and a region interposed (a region formed) by the detection electrodes RL(0) and RL(3) is located inside the coil. The magnetic field detection coil detects a magnetic field generated by the pen Pen.

In FIG. 2B, reference character DY(n−2) denotes a magnetic field detection coil constituted by the detection electrodes RL(0) and RL(3). Similarly, reference characters DY(n−1) to DY(n+1) denote magnetic field detection coils constituted by the detection electrodes RL(2) to RL(p). In the magnetic field detection period, the second voltage is supplied to one end of each of the magnetic field detection coils DY(n−2) to DY(n+1). Signals Rx(n−2) to Rx(n+1) from the respective other ends of the magnetic field detection coils DY(n−2) to DY(n+1) are supplied to the unit detection circuits.

If the capacitive element C is charged in the magnetic field generation period, the coil L1 generates a magnetic field φ2 which changes according to a resonance frequency of the resonance circuit depending on electric charges charged in the capacitive element C in the magnetic field detection period. In FIG. 2B, the center (alternate long and short dash line) of the coil L1 is present inside the magnetic field detection coil DY(n). Therefore, the magnetic field detection coil DY(n) and the coil L1 are electromagnetically coupled to each other, and an induced voltage is generated in the magnetic field detection coil DY(n) due to mutual induction. As a result, the signal Rx(n) from the other end of the magnetic field detection coil DY(n) changes according to a charge quantity charged in the capacitive element C. The unit detection circuit connected to the magnetic field detection coil DY(n) outputs the change in the signal Rx(n) as a detection signal. Accordingly, it is possible to detect whether the pen Pen is in proximity (touches) and to extract the coordinates of the pen. In addition, since the detection signal changes according to the charge quantity, it is possible to determine a distance to the pen Pen.

FIG. 2C illustrates the magnetic field generation period subsequent to the state illustrated in FIG. 2B. FIG. 2C is different from FIG. 2A in that the magnetic field drive signal CLK is supplied to the magnetic field generation coil GX(n+1). At this time, since the center of the coil L1 is not present inside the magnetic field generation coil GX(n+1), an induced voltage is not generated in the coil L1, and the capacitive element C is not charged. Therefore, in the magnetic field detection period subsequent to the state illustrated in FIG. 2C, proximity of the pen Pen is not detected. Subsequently, in a similar manner, by scanning the driven magnetic field generation coil and the magnetic field detection coil, the pen Pen in the display region is detected.

<Principle of Electric Field Detection>

Figure 3A:
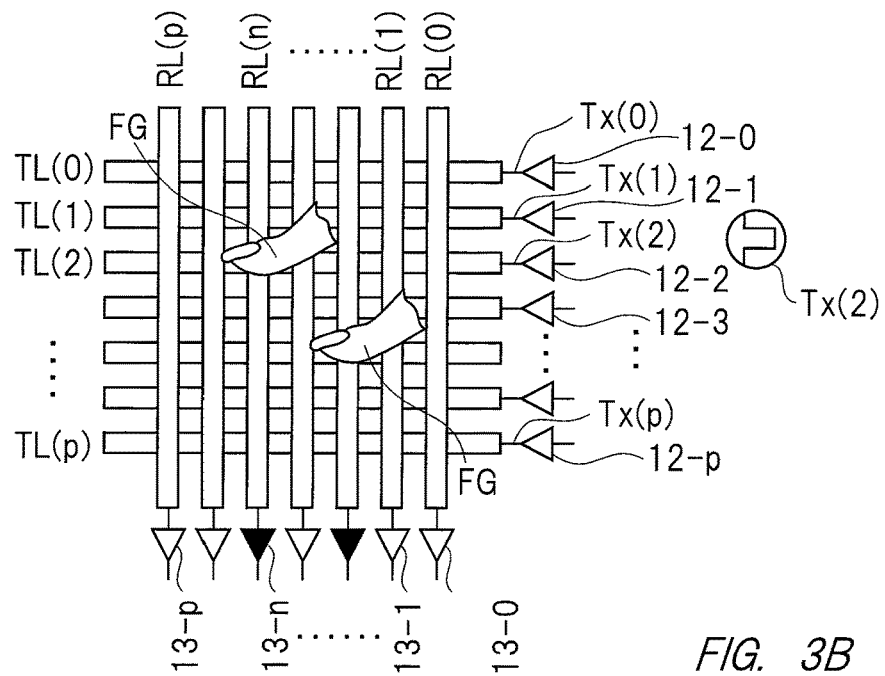
FIG. 3A is an explanatory diagram illustrating a principle of a capacitive sensing method.
Figure 3B:
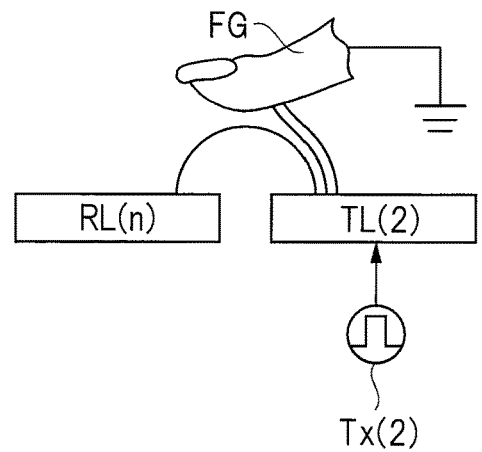
FIG. 3B is an explanatory diagram illustrating the principle of the capacitive sensing method.
Figure 3C:
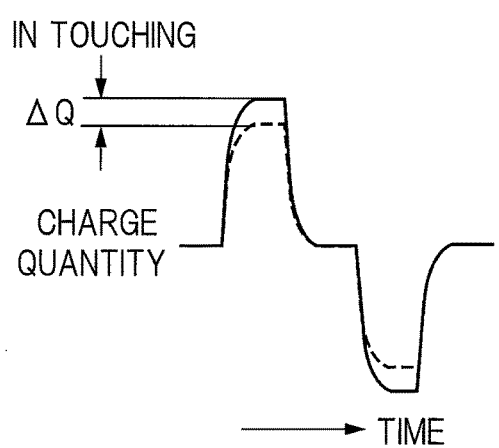
FIG. 3C is a graph illustrating the principle of the capacitive sensing method.

FIG. 3A is an explanatory diagram illustrating a principle in detecting a finger, that is, a principle of electric field detection, FIG. 3B is an explanatory diagram illustrating the principle of the electric field detection, and FIG. 3C is a graph illustrating the principle of the electric field detection. In FIG. 3A, each of reference characters 12-0 to 12-*p* denotes a unit drive circuit outputting an electric field drive signal, and each of reference characters 13-0 to 13-*p* denotes the unit detection circuit. In addition, in FIG. 3A, a pulse signal encircled by a solid line represents a waveform of an electric field drive signal Tx(2) supplied to the drive electrode TL(2). Reference character FG denotes a finger as an external object.

When the electric field drive signal Tx(2) is supplied to the drive electrode TL(2), an electric field is generated between the drive electrode TL(2) and the detection electrode RL(n) perpendicular to the drive electrode TL(2) as illustrated in FIG. 3B. At this time, when the finger FG touches the vicinity of the drive electrode TL(2), an electric field is also generated between the finger FG and the drive electrode TL(2), and the electric field generated between the drive electrode TL(2) and the detection electrode RL(n) reduces. Accordingly, a charge quantity between the drive electrode TL(2) and the detection electrode RL(n) reduces. As a result, as illustrated in FIG. 3C, the charge quantity generated in response to supply of the drive signal Tx(2) when the finger FG touches the vicinity is smaller by ΔQ than that when the finger FG does not touch the vicinity. The difference in charge quantity leads to a difference in voltage, and the difference in voltage is supplied to the unit detection circuit 13-*n* and is output as a detection signal.

Similarly, by supplying an electric field drive signal to each of the other drive electrodes, a change in voltage of the signal depending on whether or not the finger FG touches the vicinity of the drive electrode is generated in one of the detection electrodes RL(0) to RL(p), and the change in voltage is output as a detection signal. Thus, it is possible to detect whether or not the finger FG touches and to extract the coordinates of the finger.

As described above, in magnetic field detection, a ground voltage and a magnetic field drive signal are supplied to a drive electrode selected from among the drive electrodes TL(0) to TL(p), and in electric field detection, an electric field drive signal is supplied to the selected drive electrode. Meanwhile, in displaying, a display drive signal is supplied to each of the drive electrodes TL(0) to TL(p). Since the display drive signal causes the drive electrodes TL(0) to TL(p) to have the same voltage, the drive electrodes TL(0) to TL(p) can be considered as one common electrode.

<Entire Configuration of Display Device>

Figure 4:
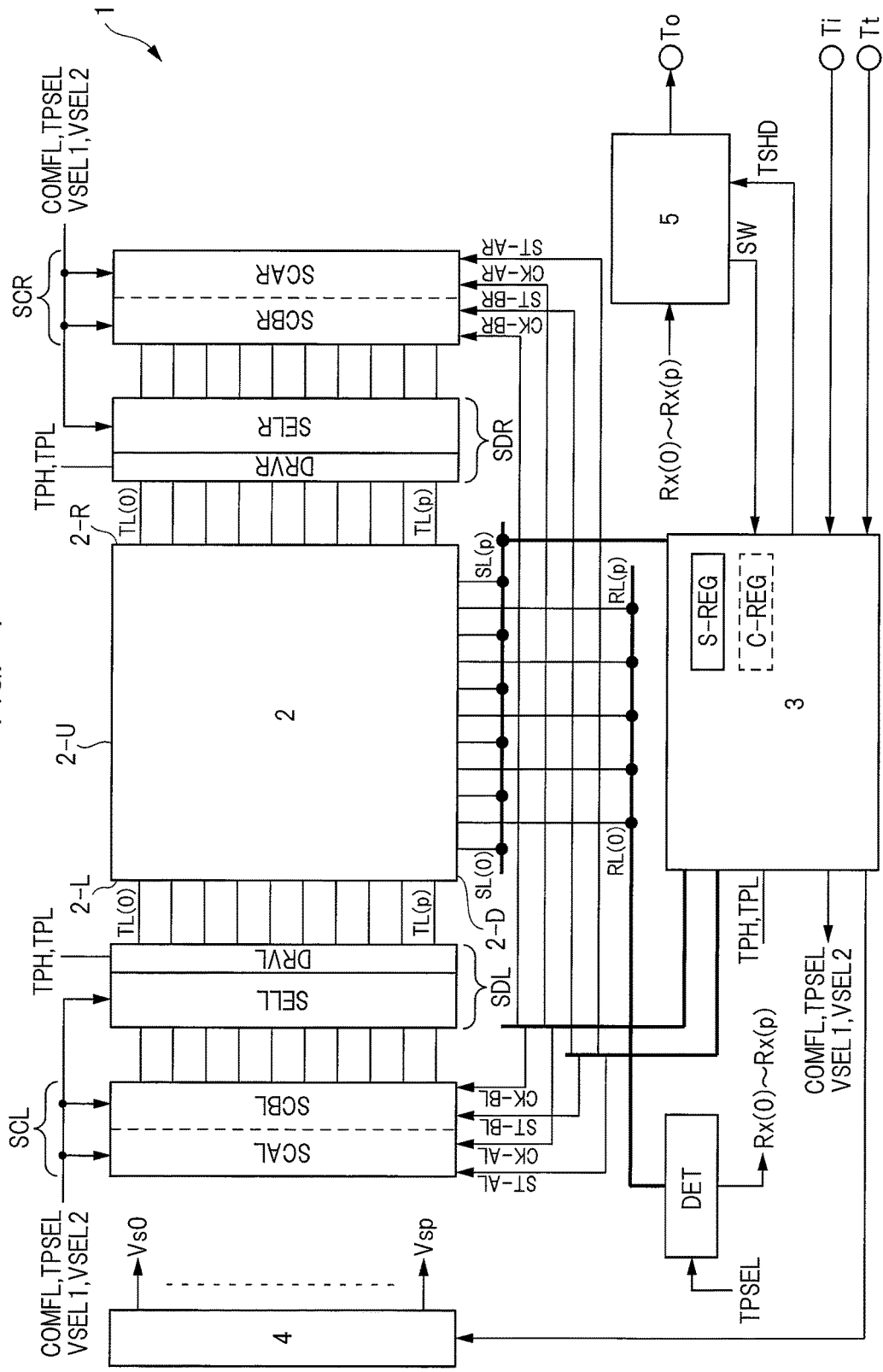
FIG. 4 is a block diagram illustrating a configuration of a display device according to a first embodiment.

FIG. 4 is a block diagram illustrating the configuration of the display device 1 according to the first embodiment. In FIG. 4, the display device 1 includes a display panel (liquid crystal panel), a control device 3, a gate driver 4, and a touch control device 5. In addition, the display device 1 further includes a first scanner circuit SCL, a second scanner circuit SCR, a first selection drive circuit SDL, a second selection drive circuit SDR, and a detection circuit DET. The display panel includes a display region (display section) where display is performed, a peripheral region (peripheral section) where a peripheral circuit or the like is arranged. In FIG. 4, reference numeral 2 denotes the display region.

The display region 2 includes a pixel array where a plurality of pixels are arranged in a matrix. In the pixel array, a plurality of signal lines, the plurality of drive electrodes, a plurality of scan lines, and the plurality of detection electrodes are arranged. With reference to FIG. 4, in the pixel array, the signal lines SL(0) to SL(p) extend in the longitudinal direction (column direction) and are arranged in parallel to one another in the lateral direction (row direction). In addition, the drive electrodes TL(0) to TL(p) extend in the lateral direction and are arranged in parallel to one another in the longitudinal direction. Further, the scan lines extend in the lateral direction and are arranged in parallel to one another in the longitudinal direction. The detection electrodes RL(0) to RL(p) extend in the longitudinal direction and are arranged in parallel to one another in the lateral direction. In this case, the pixels are arranged in spaces formed by the plurality of signal lines and the plurality of scan lines crossing each other. In a period for display (display period), a pixel is selected by the signal line and the scan line, a voltage of the signal line and a voltage of the drive electrode at this time are applied to the selected pixel, and display according to the difference in voltage between the signal line and the drive electrode is performed.

The control device 3 receives a timing signal supplied to an external terminal Tt and image information supplied to an input terminal Ti, generates an image signal according to the image information in the display period, and supplies the image signal to the plurality of signal lines SL(0) to SL(p). In addition, the control device 3 receives the timing signal supplied to the external terminal Tt and a control signal SW supplied from the touch control device 5, and generates various signals. In FIG. 4, only signals necessary for the description are depicted as representatives among the signals generated by the control device 3. That is, the control device 3 generates a synchronization signal TSHD, drive signals TPH and TPL, a control signal COWL, a detection timing signal TPSEL, and state selection signals VSEL1 and VSEL2. In addition, the control device 3 generates shift clock signals CK-AR, CK-BR, CK-AL, and CK-BL, and start signals ST-AR, ST-BR, ST-AL, and ST-BL.

In the first embodiment, the control device 3 includes a separation quantity register (first register) S-REG, although there is no particular limitation. A separation quantity is equivalent to the number n of non-selected drive electrodes arranged between selected drive electrodes when the plurality of drive electrodes are selected and a coil is formed at a time of generation of a magnetic field. Detection sensitivity and detection accuracy in pen detection can be adjusted by the separation quantity n. Based on information stored in the separation quantity register S-REG, the control device 3 generates the start signals ST-AR, ST-BR, ST-AL, and ST-BL, and the shift clock signals. In addition, the control device 3 includes a bundle register (second register) C-REG depicted by a dashed line. The number of drive electrodes bundled together, the number stored in the bundle register C-REG, is the number m of adjacent drive electrodes included in each of a plurality of selected drive electrodes when the plurality of drive electrodes are selected and a coil is formed. The number m of drive electrodes bundled together is information selecting the size of the coil, and the detection sensitivity and the detection accuracy of the input detection device can be adjusted by the number of drive electrodes bundled together. The bundle register C-REG will be described later in a third embodiment and therefore will not be described here.

The synchronization signal TSHD is a synchronization signal for discriminating the display period in which display is performed in the display region 2 and a touch detection period in which touch detection is performed in the display region 2. The control device 3 controls such that the touch control device 5 operates in the touch detection period by using the synchronization signal TSHD.

In displaying, the gate driver 4 generates scan line signals Vs0 to Vsp according to a timing signal from the control device 3 and supplies the scan line signals Vs0 to Vsp to the scan lines in the display region 2. In the display period, pixels connected to a scan line to which a high-level scan line signal is supplied are selected, and the selected pixels perform display according to image signals supplied to the signal lines SL(0) to SL(p) at this time.

In magnetic field touch detection or electric field touch detection, the detection circuit DET detects changes in signal in the detection electrodes RL(0) to RL(p) and outputs detection signals Rx(0) to Rx(p).

The touch control device 5 receives the detection signals Rx(0) to Rx(p), extracts the coordinates of the touched location, and outputs the coordinates from an external terminal To. In addition, the touch control device 5 outputs the control signal SW, and the touch control device 5 receives the synchronization signal TSHD and operates in synchronization with the control device 3.

The display region 2 has sides 2-U and 2-D parallel to the row of the pixel array, and sides 2-R and 2-L parallel to the column of the pixel array. Here, the side 2-U and the side 2-D face each other, and the plurality of drive electrodes and the plurality of scan lines in the pixel array are arranged between the two sides. In addition, the side 2-R and the side 2-L face each other, and the plurality of signal lines and the plurality of detection electrodes in the pixel array are arranged between the two sides.

The first scanner circuit SCL and the first selection drive circuit SDL are arranged along the side 2-L of the display region 2 such that the first scanner circuit SCL and the first selection drive circuit SDL are in proximity to one ends of the plurality of drive electrodes, and the first selection drive circuit SDL is connected to the one end of each of the drive electrodes TL(0) to TL(p) on the side 2-L. Similarly, the second scanner circuit SCR and the second selection drive circuit SDR are arranged along the side 2-R of the display region 2 such that the second scanner circuit SCR and the second selection drive circuit SDR are in proximity to the other ends of the plurality of drive electrodes, and the second selection drive circuit SDR is connected to the other end of each of the drive electrodes TL(0) to TL(p) on the side 2-R.

The first scanner circuit SCL includes a pair of scanner circuits SCAL and SCBL, and the first selection drive circuit SDL includes a selection circuit SELL and a drive circuit DRVL. Similarly, the second scanner circuit SCR includes a pair of scanner circuits SCAR and SCBR, and the second selection drive circuit SDR includes a selection circuit SELR and a drive circuit DRVR. In the present specification, in order to discriminate the scanner circuits SCBL and SCAL from the first scanner circuit SCL, the scanner circuit SCBL is also referred to as a first unit scanner circuit SCBL, and the scanner circuit SCAL is also referred to as a second unit scanner circuit SCAL. Similarly, In the present specification, in order to discriminate the scanner circuits SCBR and SCAR from the second scanner circuit SCR, the scanner circuit SCBR may also be referred to as a third unit scanner circuit SCBR, and the scanner circuit SCAR may also be referred to as a fourth unit scanner circuit SCAR. Each of the drive circuit DRVL and the drive circuit DRVR includes a signal wire TPH and a signal wire TPL.

In magnetic field touch detection, the first scanner circuit SCL, the second scanner circuit SCR, the first selection drive circuit SDL, and the second selection drive circuit SDR select a desired drive electrode from among the drive electrodes TL(0) to TL(p) and supply a magnetic field drive signal and a ground voltage to the selected drive electrode via the signal wires TPH and TPL. Also in electric field touch detection, the first scanner circuit SCL, the second scanner circuit SCR, the first selection drive circuit SDL, and the second selection drive circuit SDR select a desired drive electrode and supply an electric field drive signal to the selected drive electrode via the signal wire TPH. Therefore, in magnetic field touch detection or electric field touch detection, it can be considered that a drive circuit driving a drive electrode is constituted by the first scanner circuit SCL, the second scanner circuit SCR, the first selection drive circuit SDL, and the second selection drive circuit SDR.

The first scanner circuit SCL, the second scanner circuit SCR, the first selection drive circuit SDL, and the second selection drive circuit SDR will be described in detail later with reference to the drawings. Therefore, a further description will not be given here.

<Module Configuration of Display Device 1>

Figure 5:
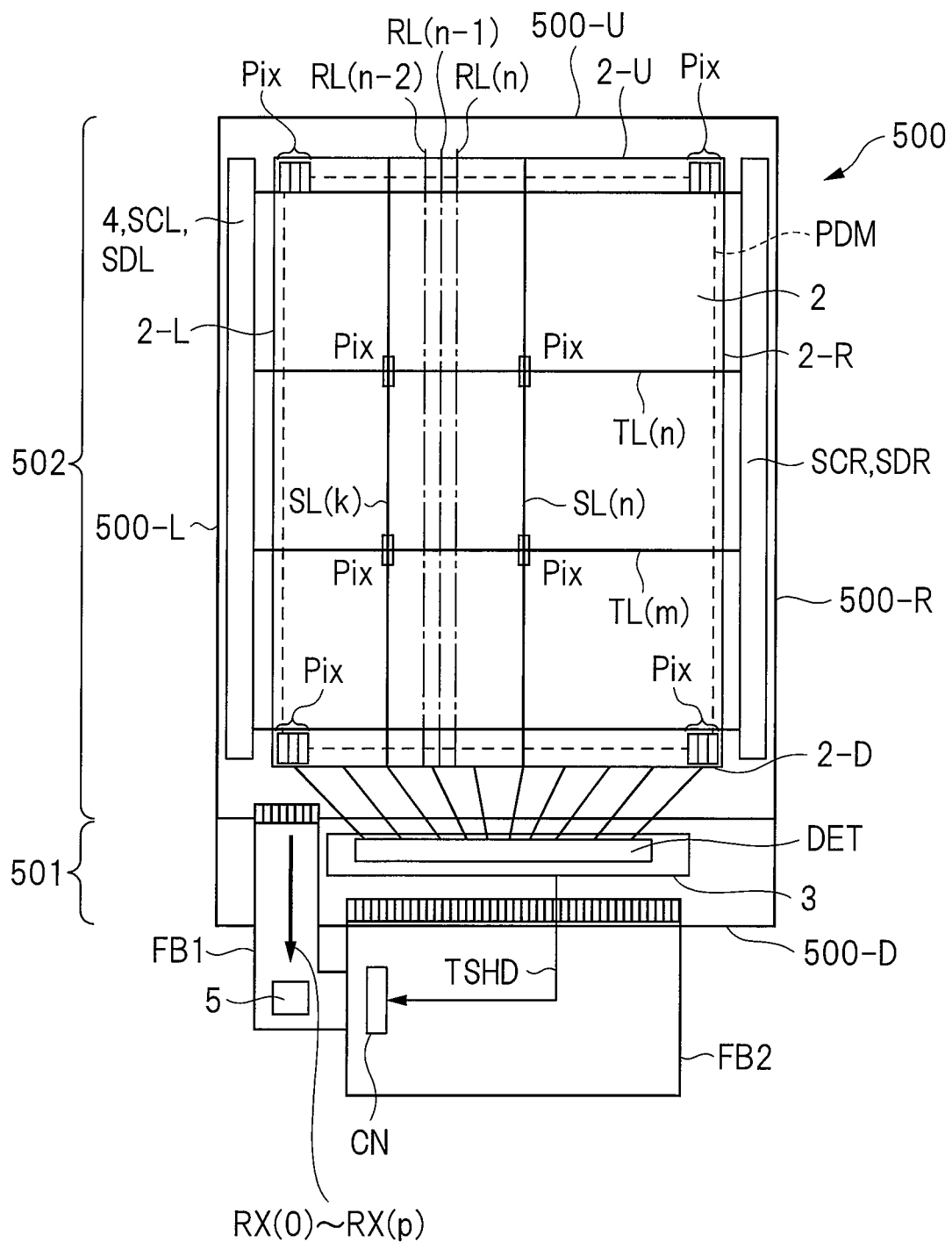
FIG. 5 is a plan view illustrating a configuration of a module according to the first embodiment.

FIG. 5 is a schematic plan view illustrating an entire configuration of a module 500 mounted with the display device 1. FIG. 5 schematically depicts the actual arrangement. In FIG. 5, reference numeral 501 denotes a region of the first substrate TGB illustrated in FIGS. 1A and 1B, and reference numeral 502 denotes a region where the first substrate TGB and the second substrate CGB are layered. In the module 500, the first substrate TGB in the region 501 and the first substrate TGB in the region 502 are integrated. In addition, in the region 502, the second substrate CGB is mounted over the first substrate TGB such that the first main surface TSF1 of the first substrate TGB faces the second main surface CSF2 of the second substrate CGB. In addition, in FIG. 5, reference characters 500-U and 500-D denote short sides of the module 500, and reference characters 500-L and 500-R denote long sides of the module 500.

The gate driver 4, the first scanner circuit SCL, and the first selection drive circuit SDL illustrated in FIG. 4 are arranged in the region between the side 2-L of the display region 2 and the side 500-L of the module 500, in the region 502. The second scanner circuit SCR and the second selection drive circuit SDR illustrated in FIG. 4 are arranged in the region between the side 2-R of the display region 2 and the side 500-R of the module 500. The detection circuit DET and the control device 3 illustrated in FIG. 4 are arranged in the region between the side 2-D of the display region 2 and the side 500-D of the module 500. The detection circuit DET is constituted by a wire and a component formed on the first main surface TSF1 of the first substrate TGB in the region 501. The control device 3 is mounted on the first substrate TGB such that the control device 3 covers the detection circuit DET in plan view. In addition, wires and components constituting the first scanner circuit SCL, the second scanner circuit SCR, the first selection drive circuit SDL, and the second selection drive circuit SDR are also formed on the first main surface TSF1 of the first substrate TGB, in the region 502.

The detection signals Rx(0) to Rx(p) described with reference to FIG. 4 are supplied to the touch control device 5 via a wire in a flexible cable FB1. A flexible cable FB2 is connected to the region 501. The touch control device 5 transmits and receives a signal to and from the control device 3 via a connector CN provided at the flexible cable FB2. Arrangements of the detection circuit DET and the touch control unit 5 are not limited this. For example, both of the detection circuit DET and the touch control unit 5 may be arranged on at least one of the flexible cable FB1, the flecible cable FB2, or the region 501. The display device may use a flexible substrate, for example, FPC, instead of the flexible cable.

As described above, the display region 2 includes the pixel array where the plurality of pixels are arranged in a matrix. The display region 2 includes the plurality of drive electrodes TL(0) to TL(p) and the plurality of scan lines arranged along the row of the pixel array, and the plurality of signal lines SL(0) to SL(p) and the plurality of detection electrodes RL(0) to RL(p) arranged along the column of the array. FIG. 5 illustrates two drive electrodes TL(n) and TL(m), two signal lines SL(k) and SL(n), and three detection electrodes RL(n−2) to RL(n) by way of example. Note that the scan lines are omitted in FIG. 5; however, the scan lines extend in parallel to the drive electrodes TL(n) and TL(m) illustrated as examples.

In addition, in FIG. 5, the pixel array is depicted by a dashed line PDM. Reference character Pix denotes each of the pixels arranged at four corners of the display region 2 and the pixels arranged at the intersections of the drive electrodes and the signal lines illustrated as examples among the plurality of pixels arranged in the pixel array PDM.

<Configurations of First Scanner Circuit SCL, Second Scanner Circuit SCR, First Selection Drive Circuit SDL, and Second Selection Drive Circuit SDR>

Figure 6:
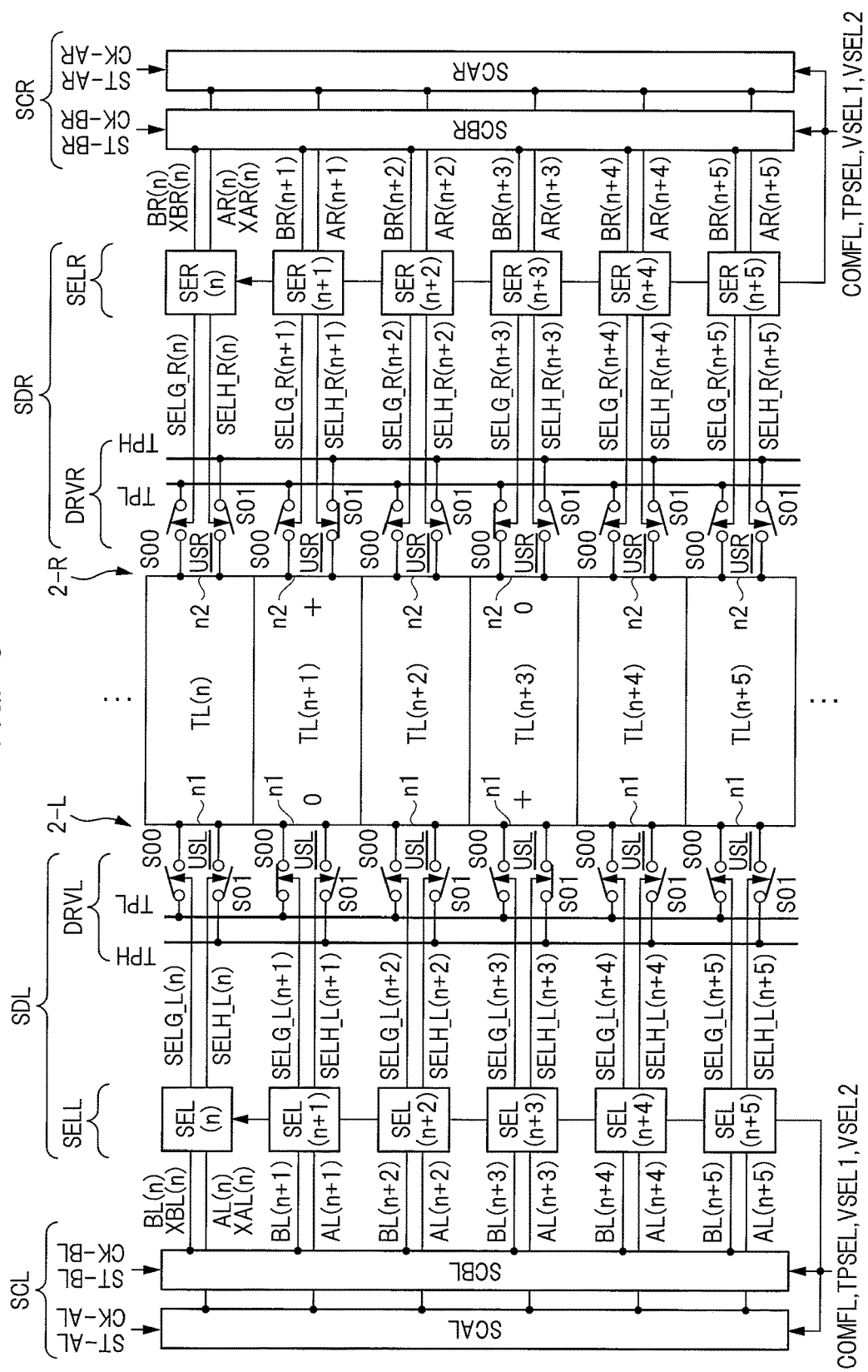
FIG. 6 is a block diagram illustrating each configuration of a first scanner circuit, a second scanner circuit, a first selection drive circuit, and a second selection drive circuit according to the first embodiment.

FIG. 6 is a block diagram illustrating each configuration of the first scanner circuit SCL, the second scanner circuit SCR, the first selection drive circuit SDL, and the second selection drive circuit SDR according to the first embodiment. In FIG. 6, in order to prevent the drawing from being complicated, only a portion of the first scanner circuit SCL, the second scanner circuit SCR, the first selection drive circuit SDL, and the second selection drive circuit SDR, the portion corresponding to the drive electrodes TL(n) to TL(n+5) from among the drive electrodes TL(0) to TL(p) arranged in the display region 2 is illustrated. The configurations corresponding to the drive electrodes TL(0) to TL(n−1) and the drive electrodes TL(n+6) to TL(p) are similar. Here, the portion illustrated in FIG. 6 will be described as a representative.

The first selection drive circuit SDL includes the selection circuit SELL and the drive circuit DRVL and is arranged along the side 2-L of the display region 2. The drive circuit DRVL includes the plurality of unit drive circuits USL corresponding to the drive electrodes TL(n) to TL(n+5), respectively. In addition, the selection circuit SELL also includes unit selection circuits SEL(n) to SEL(n+5) corresponding to the drive electrodes TL(n) to TL(n+5), respectively. In addition, each of the drive electrodes TL(n) to TL(n+5) includes a pair of the ends n1 and n2.

The unit drive circuits USL respectively correspond to the unit selection circuits SEL(n) to SEL(n+5) on a one-to-one basis. The unit drive circuit includes the first switch S01 and the second switch S00. The first switch S01 is connected between the one end n1 of the corresponding drive electrode and the signal wire TPH. The second switch S00 is connected between the one end n1 of the corresponding drive electrode and the signal wire TPL. Drive signals supplied to the signal wires TPH and TPL in the magnetic field generation period differ from drive signals supplied to the signal wires TPH and TPL in an electric field touch detection period. In the present embodiment, a magnetic field drive signal is supplied to the signal wire TPH in the magnetic field generation period, and an electric field drive signal is supplied to the signal wire TPH in the electric field touch detection period. A ground voltage is supplied to the signal wire TPL in the magnetic field generation period, and a predetermined DC voltage is supplied to the signal wire TPL in the electric field touch detection period. In the present embodiment, the magnetic field drive signal is preferably a DC voltage different in voltage value from the ground voltage. Switching of the first switch S01 is controlled by a first unit selection signal from the corresponding unit selection circuit. Switching of the second switch S00 is also controlled by a second unit selection signal from the corresponding unit selection circuit.

The drive electrode TL(n) will be described as an example. The unit selection circuit SEL(n) and the unit drive circuit USL connected to the unit selection circuit SEL(n) correspond to the drive electrode TL(n). The one end n1 of the drive electrode TL(n) is connected to the signal wire TPH via the first switch S01 switching of which is controlled by a first unit selection signal SELH_L(n) from the unit selection circuit SEL(n). In addition, the one end n1 of the drive electrode TL(n) is connected to the signal wire TPL via the second switch S00 switching of which is controlled by a second unit selection signal SELG_L(n) from the unit selection circuit SEL(n).

The one end n1 of each of the remaining drive electrodes TL(n+1) to TL(n+5) is connected to the signal wire TPH via each of the first switches S01 switching of which is controlled by each of first unit selection signals SELH_L(n+1) to SELH_L(n+5) from corresponding one of the unit selection circuits SEL(n+1) to SEL(n+5). In addition, the one end n1 of each of the remaining drive electrodes TL(n+1) to TL(n+5) is connected to the signal wire TPL via each of the second switches S00 switching of which is controlled by each of second unit selection signals SELG_L(n+1) to SELG_L(n+5) from corresponding one of the unit selection circuits SEL(n+1) to SEL(n+5).

In magnetic field touch detection or electric field touch detection, a selection signal is supplied from the first scanner circuit SCL to each of the unit selection circuits SEL(n) to SEL(n+5) constituting the selection circuit SELL. At this time, a first selection signal and a second selection signal are respectively supplied from a pair of the scanner circuits SCAL and SCBL constituting the first scanner circuit SCL. That is, the pair of scanner circuit SCAL and the scanner circuit SCBL supply the selection signals to a unit selection circuit corresponding to each drive electrode. In the first embodiment, the first selection signals are constituted by normal-phase first selection signals AL(n) to AL(n+5) and reversed-phase first selection signals XAL(n) to XAL(n+5). Here, the reversed-phase first selection signals XAL(n) to XAL(n+5) are selection signals inverted in phase from the normal-phase first selection signals AL(n) to AL(n+5). Similarly, the second selection signals are constituted by normal-phase second selection signals BL(n) to BL(n+5) and reversed-phase second selection signals XBL(n) to XBL(n+5) obtained by inverting the phases of the second selection signals BL(n) to BL(n+5).

In FIG. 6, in order to prevent the drawing from being complicated, with respect to the reversed-phase first selection signals, only the first selection signal XAL(n) inverted in phase from the normal-phase first selection signal AL(n) is illustrated. Similarly, with respect to the reversed-phase second selection signals, only the second selection signal XBL(n) inverted in phase from the normal-phase second selection signal BL(n) is illustrated. In the following description, the normal-phase first selection signal is referred to as a first selection signal, and the reversed-phase first selection signal is referred to as a first inverted selection signal. In addition, the normal-phase second selection signal is referred to as a second selection signal, and the reversed-phase second selection signal is referred to as a second inverted selection signal.

Each of the pair of scanner circuits SCAL and SCBL includes a shift register configured by connecting a plurality of shift stages in series. The shift clock signals CK-AL and CK-BL and the start signals ST-AL and ST-BL are supplied to each shift register.

FIG. 7A is a block diagram schematically illustrating a configuration of the scanner circuit SCAL according to the first embodiment, and FIG. 7B is a block diagram schematically illustrating a configuration of the scanner circuit SCBL according to the first embodiment. FIG. 7A illustrates the configuration of the scanner circuit SCAL, and FIG. 7B illustrates the configuration of the scanner circuit SCBL. Each of the scanner circuits SCAL and SCBL includes shift stages each corresponding to the drive electrodes TL(0) to TL(p) arranged in the display region 2, and these shift stages are connected in series, whereby the shift register is configured, even though there is no particular limitation. In FIGS. 7A and 7B, only shift stages FAL(n) to FAL(n+5) and FBL(n) to FBL(n+5) corresponding to the drive electrodes TL(n) to TL(n+5) illustrated in FIG. 6 are illustrated.

Each of the shift stages FAL(n) to FAL(n+5) includes a clock terminal CK, a data input terminal D, and a data output terminal Q, fetches data (information) supplied to the data input terminal D in synchronization with the change in the shift clock signal CK-AL supplied to the clock terminal CK, and outputs the data (information) from the data output terminal Q. The data output terminal Q of the shift stage FAL(n) is connected to the data input terminal D of the next shift stage FAL(n+1), and the data output terminal Q of the shift stage FAL(n+1) is connected to the data input terminal D of the next shift stage FAL(n+2). Subsequently, the data output terminal Q of a shift stage is connected to the data input terminal D of the next shift stage. Thus, the shift stages are connected in series. The shift clock signal CK-AL is supplied to the clock terminal CK of each of the shift stages FAL(n) to FAL(n+5). In addition, the start signal ST-AL is supplied to the data input terminal D of the shift stage FAL(n), which is the first stage, in FIG. 7A.

In magnetic field touch detection or electric field touch detection, selection information indicating selection of the drive electrode is supplied as the start signal ST-AL to the shift stage FAL(n). In addition, in magnetic field touch detection or electric field touch detection, the shift clock signal CK-AL periodically changes. Therefore, for example, the start signal ST-AL, which is the selection information, is fetched in the shift stage FAL(n), and the start signal ST-AL, which is the selection information, sequentially moves from the shift stage FAL(n) toward the shift stage FAL(n+5) every time the shift clock signal CK-AL changes. In the first embodiment, the selection information indicating selection becomes a high level, even though there is no particular limitation. Therefore, in the first embodiment, the high level moves from the shift stage FAL(n) toward the shift stage FAL(n+5).

Signals output from the data output terminals Q of the shift stages FAL(n) to FAL(n+5) are the first selection signals output from the scanner circuit SCAL. Since the shift stages FAL(n) to FAL(n+5) respectively correspond to the drive electrodes TL(n) to TL(n+5) on a one-to-one basis, a signal output from the data output terminal Q of the shift stage FAL(n) is the first selection signal AL(n) and the first inverted selection signal XAL(n). Similarly, signals output from the data output terminals Q of the shift stages FAL(n+1) to FAL(n+5) are the first selection signals AL(n+1) to AL(n+5) and the first inverted selection signal XAL(n+1) to XAL(n+5), respectively. Therefore, in magnetic field touch detection or electric field touch detection, the first selection signals become the high level one by one in order from the first selection signal AL(n) to the first selection signal AL(n+5), and the first inverted selection signals become a low level one by one in order from the first inverted selection signal XAL(n) to the first inverted selection signal XAL(n+5).

Although the shift stages FAL(n) to FAL(n+5) constituting the scanner circuit SCAL have been described by way of example, the same goes for the shift stages FBL(n) to FBL(n+5) constituting the scanner circuit SCBL. A shift clock signal CK-BL and a start signal ST-BL are supplied to each of the shift stages FBL(n) to FBL(n+5). The high-level start signal ST-BL indicating selection moves from the shift stage FBL(n) toward the shift stage FBL(n+5) in synchronization with the change in the shift clock signal CK-BL, and the second selection signals BL(n) to BL(n+5) and the second inverted selection signals XBL (n) to XBL (n+5) are output.

As described above, since the pair of scanner circuits SCAL and SCBL share the unit selection circuits SEL(n) to SEL(n+5), the control device 3 controls such that the first selection signal AL and the second selection signal BL do not simultaneously become the high level with respect to the identical unit selection circuit.

In magnetic field touch detection or electric field touch detection, the unit selection circuits SEL(n) to SEL(n+5) constituting the selection circuit SELL respectively generate the first unit selection signals SELH_L(n) to SELH_L(n+5) and the second unit selection signals SELG_L(n) to SELG_L(n+5) each causing the first switch S01 and the second switch S00 in the corresponding unit drive circuit USL to be turned on according to the state selection signals VSEL1 and VSEL2, when the corresponding first selection signal or the corresponding second selection signal indicates selection of the drive electrode.

The first scanner circuit SCL and the first selection drive circuit SDL have been described by way of example; however, the second scanner circuit SCR and the second selection drive circuit SDR also have similar circuit configurations. Therefore, the second scanner circuit SCR and the second selection drive circuit SDR will be briefly described.

The second scanner circuit SCR also includes a pair of the scanner circuits SCAR and SCBR. As illustrated in FIGS. 7C and 7D, the scanner circuit SCAR includes a shift register having a plurality of shift stages FAR(n) to FAR(n+5), and the scanner circuit SCBR includes a shift register having a plurality of shift stages FBR(n) to FBR(n+5). The high-level start signal ST-AR is supplied to the shift register of the scanner circuit SCAR and sequentially moves in synchronization with the change in the shift clock signal CK-AR. In addition, the high-level start signal ST-BR is supplied to the shift register of the scanner circuit SCBR and sequentially moves in synchronization with the change in the shift clock signal CK-BR. Here, moving directions of the high-level start signals ST-AR and ST-BR are the same as moving directions of the start signals ST-AL and ST-BL. In addition, the shift clock signals CK-AR and CK-BR have the same cycles as the cycles of the shift clock signals CK-AL and CK-BL.

Similarly to the scanner circuit SCAL, the scanner circuit SCAR outputs the first selection signals AR(n) to AR(n+5) and the first inverted selection signals XAR(n) to XAR(n+5) corresponding to the drive electrodes TL(n) to TL(n+5), respectively. Similarly to the scanner circuit SCBL, the scanner circuit SCBR outputs the second selection signals BR(n) to BR(n+5) and the second inverted selection signals XBR(n) to XBR(n+5) corresponding to the drive electrodes TL(n) to TL(n+5), respectively. Note that FIG. 6 illustrates only the first inverted selection signal XAR(n) and the second inverted selection signal XBR(n).

The selection circuit SELR includes unit selection circuits SER(n) to SER(n+5) corresponding to the drive electrodes TL(n) to TL(n+5), respectively. The pair of scanner circuits SCAR and SCBR share each of the unit selection circuits SER(n) to SER(n+5). The unit selection circuits SER(n) to SER(n+5) receive the corresponding first selection signals AR(n) to AR(n+5), respectively, the corresponding first inverted selection signals XAR(n) to XAR(n+5), respectively, the corresponding second selection signals BR(n) to BR(n+5), respectively, the corresponding second inverted selection signals XBR(n) to XBR(n+5), respectively, and the corresponding state selection signals VSEL1 and VSEL2, and generate first unit selection signals SELH_R(n) to SELH_R(n+5), respectively, and second unit selection signals SELG_R(n) to SELG_R(n+5), respectively.

The drive circuit DRVR arranged along the side 2-R of the display region 2 includes the plurality of unit drive circuits USR. The unit drive circuit USR includes the first switch S01 connected between the other end n2 of the corresponding drive electrode among the drive electrodes TL(n) to TL(n+5) and the signal wire TPH, and the second switch S00 connected between the other end n2 and the signal wire TPL. Switching of the first switch S01 in the unit drive circuit USR is controlled by one of the first unit selection signals SELH_R(n) to SELH_R(n+5) from the corresponding unit selection circuit among the unit selection circuits SER(n) to SER(n+5). Switching of the second switch S00 in the unit drive circuit USR is controlled by one of the second unit selection signals SELG_R(n) to SELG_R(n+5) from the corresponding unit selection circuit among the unit selection circuits SER(n) to SER(n+5).

Similarly to the selection circuit SELL, in magnetic field touch detection or electric field touch detection, the unit selection circuits SER(n) to SER(n+5) constituting the selection circuit SELR respectively generate the first unit selection signals SELH_R(n) to SELH_R(n+5) and the second unit selection signals SELG_R(n) to SELG_R(n+5) each causing the first switch S01 and the second switch S00 in the corresponding unit drive circuit USR to be turned on according to the state selection signals VSEL1 and VSEL2, when the corresponding first selection signal or the corresponding second selection signal indicates selection of the drive electrode.

<Configurations of First Selection Drive Circuit SDL and Second Selection Drive Circuit SDR>

The selection circuit SELL constituting the first selection drive circuit SDL includes the plurality of unit selection circuits SEL(0) to SEL(p) corresponding to the drive electrodes TL(0) to TL(p), respectively, and the drive circuit DRVL also includes the plurality of unit drive circuits USL corresponding to the drive electrodes. The unit selection circuits SEL(0) to SEL(p) have the same configuration, and the unit drive circuits USL also have the same configuration. Similarly, the selection circuit SELR constituting the second selection drive circuit SDR also includes the unit selection circuits SER(0) to SER(p) corresponding to the drive electrodes TL(0) to TL(p) and having the same configuration, and the drive circuit DRVR also includes the plurality of unit drive circuits USR having the same configuration.

Therefore, the first selection drive circuit SDL will be described here using the unit selection circuit SEL(n) and the unit drive circuit USL corresponding to the drive electrode TL(n) as examples, and the second selection drive circuit SDR will be described here using the unit selection circuit SER(n) and the unit drive circuit USR corresponding to the drive electrode TL(n) as examples.

Figure 8A:
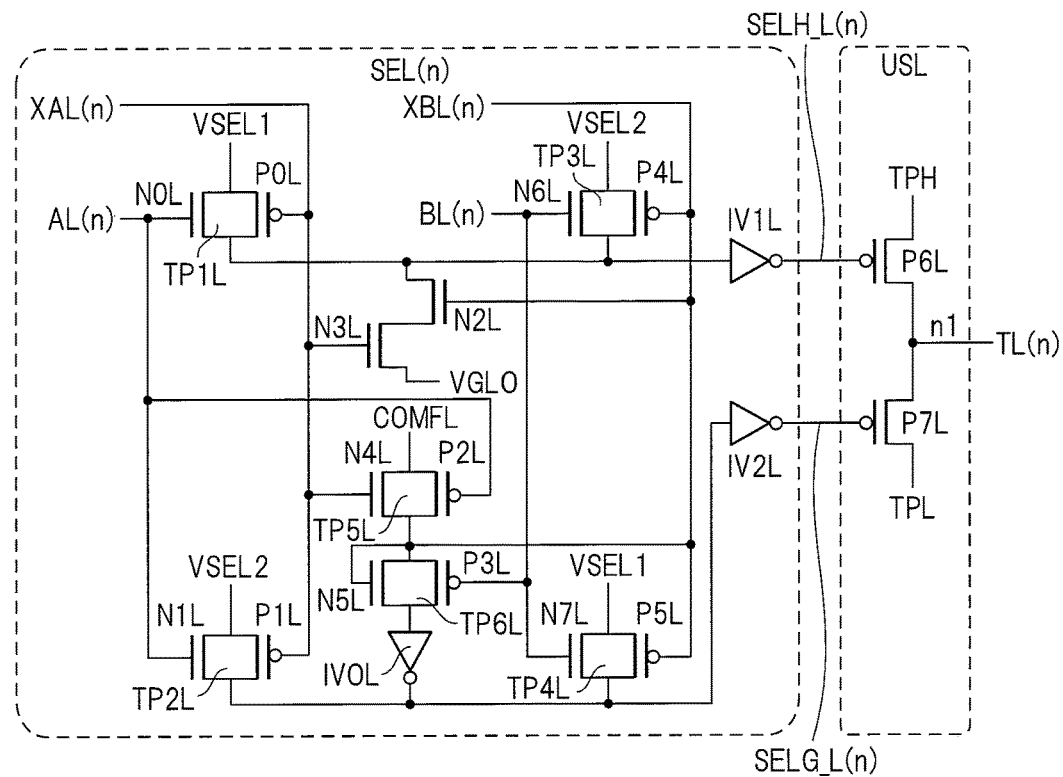
FIG. 8A is a circuit diagram illustrating a configuration of a first selection drive circuit according to the first embodiment.
Figure 8B:
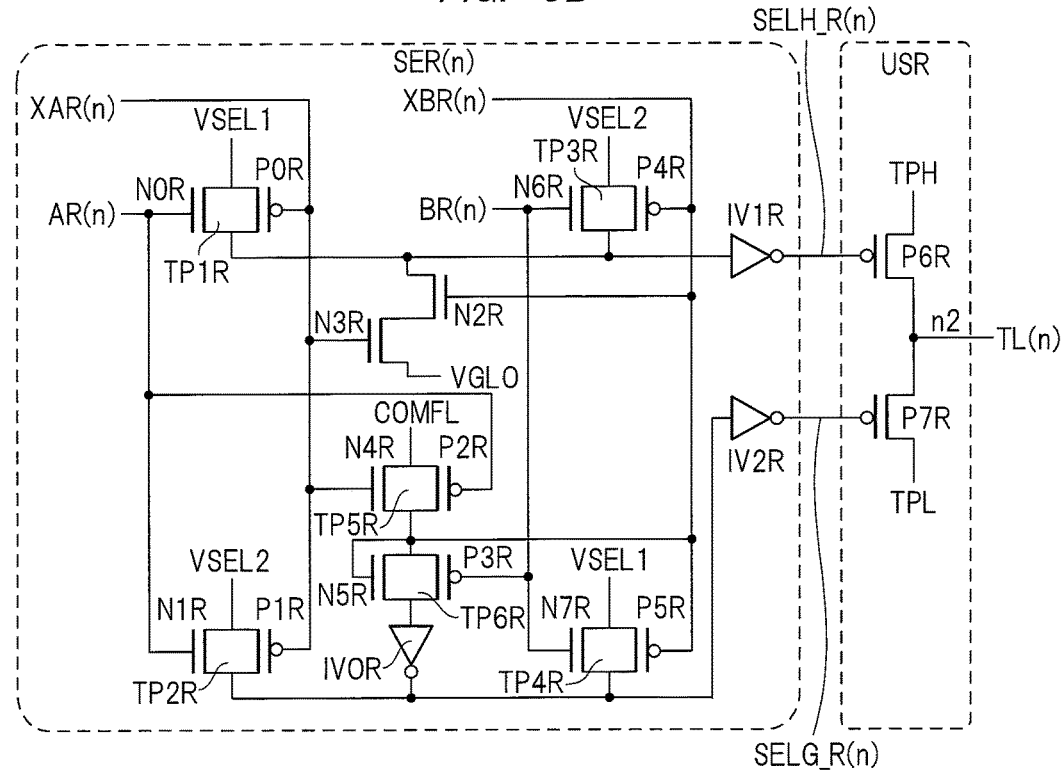
FIG. 8B is a circuit diagram illustrating a configuration of a second selection drive circuit according to the first embodiment.

FIG. 8A is a circuit diagram illustrating a configuration of the first selection drive circuit SDL according to the first embodiment. FIG. 8B is a circuit diagram illustrating a configuration of the second selection drive circuit SDR according to the first embodiment. Here, FIG. 8A illustrates each configuration of the unit selection circuit SEL(n) and the unit drive circuit USL constituting the first selection drive circuit SDL, and FIG. 8B illustrates each configuration of the unit selection circuit SER(n) and the unit drive circuit USR constituting the second selection drive circuit SDR.

The unit selection circuit SEL(n) includes N-type field effect transistors (hereinafter also referred to as N transistors) N0L to N7L, P-type field effect transistors (hereinafter also referred to as P transistors) P0L to P5L, and inverter circuits IV0L to IV2L. In the present specification, in order to discriminate the P transistor from the N transistor, a gate of the P transistor is depicted as a circle.

The sources and the drains of the N transistor N0L and the P transistor P0L are connected to each other such that source-drain paths of the N transistor and the P transistor are connected in parallel to each other. In addition, the first selection signal AL(n) is supplied to a gate of the N transistor N0L, and a first inverted selection signal XAL(n) is supplied to a gate of the P transistor P0L. Thus, a first transfer switch TP1L switching of which is controlled by the first selection signal AL(n) is constituted by the N transistor N0L and the P transistor P0L. Similarly, a second transfer switch TP2L switching of which is controlled by the first selection signal AL(n) is constituted by the N transistor N1L and the P transistor P1L.

Also, source-drain paths of the N transistor N6L and the P transistor P4L are connected in parallel to each other. The second selection signal BL(n) is supplied to a gate of the N transistor N6L, and a second inverted selection signal XBL(n) is supplied to a gate of the P transistor P4L. Thus, a third transfer switch TP3L switching of which is controlled by the second selection signal BL(n) is constituted by the N transistor N6L and the P transistor P4L. Similarly, a fourth transfer switch TP4L switching of which is controlled by the second selection signal BL(n) is constituted by the N transistor N7L and the P transistor P5L.

The state selection signal VSEL1 is supplied to one terminal of the first transfer switch TP1L, and the state selection signal VSEL2 is supplied to one terminal of the third transfer switch TP3L. In addition, the other terminals of the first transfer switch TP1L and the third transfer switch TP3L are interconnected and are connected to an input of the inverter circuit IV1L. Similarly, the state selection signal VSEL2 is supplied to one terminal of the second transfer switch TP2L, and the state selection signal VSEL1 is supplied to one terminal of the fourth transfer switch TP4L. In addition, the other terminals of the second transfer switch TP2L and the fourth transfer switch TP4L are interconnected and are connected to an input of the inverter circuit IV2L.

An output of the inverter circuit IV1L is supplied as the first unit selection signal SELH_L(n) to the corresponding unit drive circuit USL. An output of the inverter circuit IV2L is supplied as the second unit selection signal SELG_L(n) to the unit drive circuit USL. The unit drive circuit USL includes the P transistor P6L connected between the one end n1 of the drive electrode TL(n) and the signal wire TPH, and the P transistor P7L connected between the one end n1 of the drive electrode TL(n) and the signal wire TPL. The P transistor P6L is equivalent to the first switch S01 illustrated in FIG. 6, and the P transistor P7L is equivalent to the second switch S00 illustrated in FIG. 6. The first unit selection signal SELH_L(n) is supplied from the inverter circuit IV1L to a gate of the P transistor P6L, and switching of the P transistor P6L is controlled. In addition, the second unit selection signal SELG_L(n) is supplied from the inverter circuit IV2L to a gate of the P transistor P7L, and switching of the P transistor P7L is controlled.

The N transistors N2L and N3L are connected in series such that source-drain paths of the N transistors N2L and N3L are connected in series between the input of the inverter circuit IV1L and a predetermined voltage VGLO. The second inverted selection signal XBL(n) is supplied to a gate of the N transistor N2L, and the first inverted selection signal XAL(n) is supplied to a gate of the N transistor N3L. Thus, when the first selection signal AL(n) and the second selection signal BL(n) become the low level, that is, when the drive electrode TL(n) is not selected, the N transistor N2L and the N transistor N3L are turned on, and the predetermined voltage VGLO is supplied to the input of the inverter circuit IV1L. For example, the predetermined voltage VGLO is the ground voltage equivalent to the low level. Therefore, when the drive electrode TL(n) is not selected, the high-level first unit selection signal SELH_L(n) is supplied from the inverter circuit IV1L to the P transistor P6L, and the P transistor P6L is turned off.

Source-drain paths of the N transistor N4L and the P transistor P2L are connected in parallel to each other. The first inverted selection signal XAL(n) is supplied to a gate of the N transistor N4L, and the first selection signal AL(n) is supplied to a gate of the P transistor P2L. Thus, a fifth transfer switch TP5L switching of which is controlled by the first inverted selection signal XAL(n) is constituted by the N transistor N4L and the P transistor P2L. In addition, source-drain paths of the N transistor N5L and the P transistor P3L are connected in parallel to each other. The second inverted selection signal XBL(n) is supplied to a gate of the N transistor N5L, and the second selection signal BL(n) is supplied to a gate of the P transistor P3L. Thus, a sixth transfer switch TP6L switching of which is controlled by the second inverted selection signal XBL(n) is constituted by the N transistor N5L and the P transistor P3L.

The fifth transfer switch TP5L and the sixth transfer switch TP6L are connected in series, and the control signal COMFL is supplied to an input of the inverter circuit IV0L via the fifth transfer switch TP5L and the sixth transfer switch TP6L connected in series. An output of the inverter circuit IV0L is connected to the input of the inverter circuit IV2L. Thus, when the first inverted selection signal XAL(n) and the second inverted selection signal XBL(n) are at the high level, in other words, when the first selection signal AL(n) and the second selection signal BL(n) are at the low level, both the fifth transfer switch TP5L and the sixth transfer switch TP6L are turned on. Since both the first selection signal AL(n) and the second selection signal BL(n) are at the low level, the control signal COMFL is supplied to the inverter circuit IV2L via the fifth transfer switch TP5L, the sixth transfer switch TP6L, and the inverter circuit IV0L when the corresponding drive electrode TL(n) is not selected.

As a result, when the control signal COMFL is at the high level, the second unit selection signal SELG_L(n) becomes the high level, and when the control signal COMFL is at the low level, the second unit selection signal SELG_L(n) becomes the low level. For example, by setting the control signal COMFL at the high level in the magnetic field touch detection period and setting the control signal COMFL at the low level in the electric field touch detection period, the second unit selection signal SELG_L(n) in the magnetic field touch detection period becomes the high level.

Thus, when the drive electrode TL(n) is selected neither by the scanner circuit SCAL nor the scanner circuit SCBL in the magnetic field touch detection period, both the first unit selection signal SELH_L(n) and the second unit selection signal SELG_L(n) become the high level, and both the P transistors P6L and P7L constituting the unit drive circuit USL are turned off, so that the one end n1 of the corresponding drive electrode TL(n) is electrically isolated from the signal wires TPH and TPL.

In addition, when the drive electrode TL(n) is selected neither by the scanner circuit SCAL nor the scanner circuit SCBL in the electric field touch detection period, since the first unit selection signal SELH_L(n) becomes the high level and the second unit selection signal SELG_L(n) becomes the low level, the P transistor P7L constituting the unit drive circuit USL is turned on, and the one end n1 of the corresponding drive electrode TL(n) is connected to the signal wire TPL.

In contrast, when the first selection signal AL(n) or the second selection signal BL(n) is at the high level, that is, when the scanner circuit SCAL or the scanner circuit SCBL selects the corresponding drive electrode TL(n), the P transistor P6L or the P transistor P7L constituting the unit drive circuit USL is turned on according to the voltages of the state selection signals VSEL1 and VSEL2, and the one end n1 of the corresponding drive electrode TL(n) is electrically connected to the signal wire TPH or the signal wire TPL.

That is, in a case where the first selection signal AL(n) becomes the high level, the first transfer switch TP1L and the second transfer switch TP2L are turned on. Thus, the phase-inverted state selection signal VSEL1 is supplied as the first unit selection signal SELH_L(n) from the inverter circuit IV1L to the gate of the P transistor P6L, and the phase-inverted state selection signal VSEL2 is supplied as the second unit selection signal SELG_L(n) from the inverter circuit IV2L to the gate of the P transistor P7L.

Similarly, in a case where the second selection signal BL(n) becomes the high level, the third transfer switch TP3L and the fourth transfer switch TP4L are turned on. As a result, the phase-inverted state selection signal VSEL2 is supplied as the first unit selection signal SELH_L(n) from the inverter circuit IV1L to the gate of the P transistor P6L, and the phase-inverted state selection signal VSEL1 is supplied as the second unit selection signal SELG_L(n) from the inverter circuit IV2L to the gate of the P transistor P7L.

The state selection signals VSEL1 and VSEL2 are signals selecting a first drive state and a second drive state of the selected drive electrode in the magnetic field touch detection period. The control device 3 causes the state selection signals VSEL1 and VSEL2 to change complementarily a plurality of times such that the state selection signals do not overlap with each other in the magnetic field generation period of the magnetic field touch detection period.

For example, in a case where the high-level first selection signal AL(n) causes the first transfer switch TP1L and the second transfer switch TP2L to be turned on, the first unit selection signal SELH_L(n) and the second unit selection signal SELG_L(n) whose voltages periodically change are supplied to the P transistors P6L and P7L. At this time, since the state selection signals VSEL1 and VSEL2 change complementarily, the voltages of the first unit selection signal SELH_L(n) and the second unit selection signal SELG_L(n) also change complementarily. Thus, the P transistors P6L and P7L are alternately turned on and off in synchronization with changes of the state selection signals VSEL1 and VSEL2. As a result, the magnetic field drive signal and the ground voltage supplied to the signal wires TPH and TPL in the magnetic field generation period are temporally alternately supplied to the drive electrode TL(n) via the unit drive circuit USL.

Similarly, in a case where the high-level second selection signal BL(n) causes the third transfer switch TP3L and the fourth transfer switch TP4L to be turned on, the phase-inverted state selection signal VSEL2 is supplied as the first unit selection signal SELH_L(n) from the inverter circuit IV1L to the P transistor P6L, and the phase-inverted state selection signal VSEL1 is supplied as the second unit selection signal SELG_L(n) from the inverter circuit IV2L to the P transistor P7L. As a result, the magnetic field drive signal and the ground voltage supplied to the signal wires TPH and TPL are temporally alternately supplied to the drive electrode TL(n) via the unit drive circuit USL.

When the first selection signal AL(n) is at the high level, the phase-inverted state selection signal VSEL1 is supplied to the gate of the P transistor P6L, and the phase-inverted state selection signal VSEL2 is supplied to the gate of the P transistor P7L. In contrast, when the second selection signal BL(n) is at the high level, the phase-inverted state selection signal VSEL2 is supplied to the gate of the P transistor P6L, and the phase-inverted state selection signal VSEL1 is supplied to the gate of the P transistor P7L. That is, the signal wire connected to the end n1 of the drive electrode TL(n) when the scanner circuit SCAL selects the drive electrode TL(n) is opposite to the signal wire connected to the end n1 of the drive electrode TL(n) when the scanner circuit SCBL selects the drive electrode TL(n), according to the change of the state selection signals.

In the electric field touch detection period, the state selection signals VSEL1 and VSEL2 are set at values which do not overlap with each other. In the electric field touch detection period, the values of the state selection signals VSEL1 and VSEL2 do not change.

The unit selection circuit SEL(n) corresponding to the drive electrode TL(n) and the unit drive circuit USL corresponding to the unit selection circuit SEL(n) have been described by way of example; however, the remaining unit selection circuits in the selection circuit SELL and the remaining unit drive circuits in the drive circuit DRVL are similar.

Similarly to the selection circuit SELL and the drive circuit DRVL, the selection circuit SELR and the drive circuit DRVR in the second selection drive circuit SDR arranged along the side 2-R of the display region 2 (FIG. 4) are also constituted by the unit selection circuits SER(0) to SER(p) and the unit drive circuits USR corresponding to the drive electrodes TL(0) to TL(p). The unit selection circuits SER(0) to SER(p) have the same configuration, and the plurality of unit drive circuits USR also has the same configuration. Therefore, in FIG. 8B, the unit selection circuit SER(n) and the unit drive circuit USR corresponding to the unit selection circuit SER(n) are illustrated as representatives.

The unit selection circuit SER(n) has the same configuration as the unit selection circuit SEL(n) illustrated in FIG. 8A. The unit drive circuit USR has the same configuration as the unit drive circuit USL illustrated in FIG. 8A. In addition, an operation of the unit selection circuit SER(n) and an operation of the unit drive circuit USR are the same as an operation of the unit selection circuit SEL(n) and an operation of the unit drive circuit USL, respectively. Therefore, only the correspondence relations with the unit selection circuit SEL(n) and the unit drive circuit USL will be described, and the configurations and the operation of the unit selection circuit SER(n) and the unit drive circuit USR will not be described in detail.

The unit selection circuit SER(n) includes N transistors N0R to N7R, P transistors P0R to P5R, and inverter circuits IV0R to IV2R. Here, the N transistors N0R to N7R correspond to the N transistors N0L to N7L described with reference to FIG. 8A, respectively. The P transistors P0R to P5R correspond to the P transistors P0L to P5L described with reference to FIG. 8A, respectively. The inverter circuits IV0R to IV2R correspond to the inverter circuits IV0L to IV2L described with reference to FIG. 8A, respectively. Also, reference characters TP1R to TP6R denote first to sixth transfer switches and correspond to the first to the sixth transfer switches TP1L to TP6L described with reference to FIG. 8A, respectively. Also, the unit drive circuit USR includes P transistors P6R and P7R corresponding to the P transistors P6L and P7L described with reference to FIG. 8A, respectively.

The first selection signal AR(n) and the first inverted selection signal XAR(n) are supplied to the unit selection circuit SER(n) from the scanner circuit SCAR in the second scanner circuit SCR arranged along the side 2-R of the display region 2, and the second selection signal BR(n) and the second inverted selection signal XBR(n) are supplied to the unit selection circuit SER(n) from the scanner circuit SCBR in the second scanner circuit SCR. In addition, the state selection signals VSEL1 and VSEL2, the control signal COMFL, and the predetermined voltage VGLO are supplied to the unit selection circuit SER(n). Similarly to the unit selection circuit SEL(n) described with reference to FIG. 8A, the unit selection circuit SER(n) generates the first unit selection signal SELH_R(n) and the second unit selection signal SELG_R(n).

The P transistor P6R in the unit drive circuit USR is connected between the other end n2 of the corresponding drive electrode TL(n) and the signal wire TPH, and the P transistor P7R in the unit drive circuit USR is connected between the other end n2 of the corresponding drive electrode TL(n) and the signal wire TPL. Similarly to the unit drive circuit USL described with reference to FIG. 8A, switchings of the P transistors P6R and P7R are controlled by the first unit selection signal SELH_R(n) and the second unit selection signal SELG_R(n), respectively.

<Basic Operation of Magnetic Field Touch Detection>

Figure 9A:
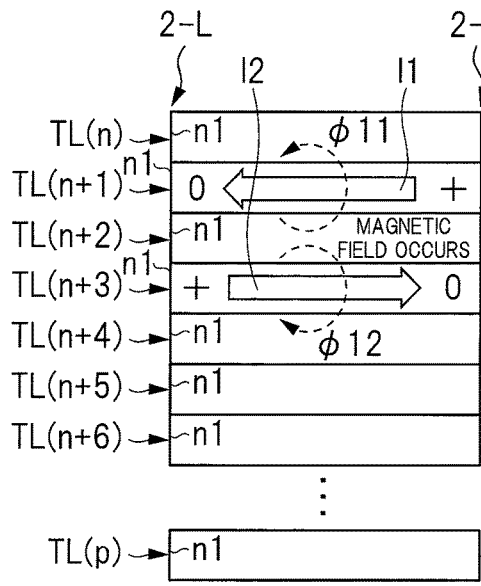
FIG. 9A is an explanatory diagram illustrating an operation of magnetic field touch detection according to the first embodiment.
Figure 9B:
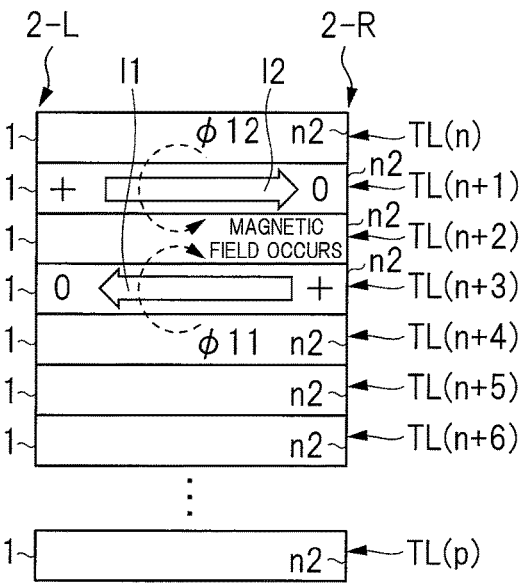
FIG. 9B is an explanatory diagram illustrating an operation of magnetic field touch detection according to the first embodiment.

Before an entire operation of the magnetic field touch detection and the electric field touch detection according to the first embodiment is described, a basic operation of the magnetic field touch detection will be described. FIG. 9A is an explanatory diagram illustrating an operation of the magnetic field touch detection according to the first embodiment, and FIG. 9B is an explanatory diagram illustrating the operation of the magnetic field touch detection according to the first embodiment. The description given here corresponds to the operation in the magnetic field generation period described with reference to FIGS. 2A and 2C.

In order to describe the principles of the magnetic field detection, FIGS. 2A and 2C illustrate an example where the drive electrodes arranged in parallel to each other are electrically connected in series, and thus, the magnetic field generation coils GX(n−1) to GX(n+3) are configured. In the first embodiment, in the pair of drive electrodes arranged in parallel to each other in plan view, currents are caused to flow through the drive electrodes in opposite directions, whereby a magnetic field is generated at each drive electrode, and the generated magnetic fields overlap in the region interposed by the pair of drive electrodes, so that a strong magnetic field is generated. In this case, it can be considered that a pair of drive electrodes which is arranged in parallel to each other and through which currents flow in opposite directions constitutes the magnetic field generation coil (for example, GX(n)), even though the pair of drive electrodes is not connected in series.

The number of drive electrodes constituting the magnetic field generation coil may be one; however, since magnetic field intensity of the magnetic field generation coil is increased when the magnetic field generation coil is configured such that currents flow through the pair of drive electrodes in opposite directions, detection sensitivity of the input detection device can be improved.

Due to such a configuration of the magnetic field generation coil, electrodes, metal wires, and the like of capacitive sensing touch panel configuration can be used for touch detection using an electromagnetic induction method.

Hereinafter, an outline of an operation in the magnetic field generation period in magnetic field touch detection will be described with reference to FIG. 4 and FIGS. 6 to 9B.

In the following description, among a pair of drive electrodes simultaneously selected in FIGS. 9A and 9B, the drive electrode TL(n+3) is referred to as a first drive electrode, and the drive electrode TL(n+1) is referred to as a second drive electrode.

Each of the first drive electrode TL(n+3) and the second drive electrode TL(n+1) is constituted by one drive electrode. In other words, since each of the first drive electrode TL(n+3) and the second drive electrode TL(n+1) includes one adjacent drive electrode, the number m of drive electrode bundled together is 1. In addition, since the first drive electrode TL(n+3) and the second drive electrode TL(n+1) are arranged to be separated from each other across one drive electrode TL(n+2), the separation quantity n at this time is 1.

The control device 3 causes the scanner circuit SCAL and the scanner circuit SCBL to simultaneously select the ends n1 of the first drive electrode TL(n+3) and the second drive electrode TL(n+1), respectively. In addition, the control device 3 causes the scanner circuit SCAR and the scanner circuit SCBR to simultaneously select the ends n2 of the first drive electrode TL(n+3) and the second drive electrode TL(n+1), respectively. That is, both ends of the selected drive electrode are simultaneously connected to different signal wires.

At this time, the control device 3 causes the scanner circuit SCAL to select the first drive electrode TL(n+3) which is m+n drive electrodes ahead of the drive electrode selected by the scanner circuit SCBL and causes the scanner circuit SCBR to select the first drive electrode TL(n+3) which is m+n drive electrodes ahead of the drive electrode selected by the scanner circuit SCAR.

First, the value representing 1 (n=1) is set as the separation quantity in the separation quantity register S-REG illustrated in FIG. 4. In addition, 1 (m=1) is set as the number of drive electrodes bundled together in the bundle register C-REG.

Therefore, the control device 3 changes the shift clock signal CK-AL twice (m+n, wherein m denotes the number of drive electrodes bundled together and n denotes the separation quantity) before changing the shift clock signal CK-BL. At this time, during a period in which the shift clock signal CK-AL has changed once (m times) for the first time, the control device 3 sets the start signal ST-AL at the high level. After that, during a period in which the shift clock signal CK-AL has changed once (n times), the control device 3 sets the start signal ST-AL at the low level. In addition, the control device 3 changes the shift clock signal CK-BR m+n times (twice) before changing the shift clock signal CK-AR. Also at this time, during a period in which the shift clock signal CK-BR has changed once (m times) for the first time, the control device 3 sets the start signal ST-BR at the high level. After that, during a period in which the shift clock signal has changed once (n times), the control device 3 sets the start signal ST-BR at the low level. That is, the shift clock signal CK-AL and the shift clock signal CK-BR simultaneously change m+n times before the shift clock signal CK-BL and the shift clock signal CK-AR change, respectively.

After the control device 3 has changed the shift clock signals CK-AL and CK-BR m+n times, the control device 3 changes the shift clock signals CK-AL, CK-BL, CK-AR, and CK-BR in an identical cycle. In addition, the control device 3 sets the start signals ST-BL and ST-AR at the high level indicating selection of a drive electrode when the control device 3 changes the shift clock signals CK-BL and CK-AR for the first time.

Therefore, in the shift register of the scanner circuit SCAL, the high-level start signal (selection information) moves further ahead by two shift stages than the high-level start signal in the shift register of the scanner circuit SCBL. Similarly, in the shift register of the scanner circuit SCBR, the high-level start signal (selection information) moves further ahead by two shift stages than the high-level start signal in the shift register of the scanner circuit SCAR. That is, in the scanner circuits SCAL and SCBL, a position of the shift stage in which the selection information is stored in the scanner circuit SCAL is apart from a position of the shift stage in which the selection information is stored in the scanner circuit SCBL, and the selection information moves in each of the shift registers while keeping the state in which the positions are apart. Similarly, also in each of the scanner circuits SCAR and SCBR, a position of the shift stage in which the selection information is stored in the scanner circuit SCAR is apart from a position of the shift stage in which the selection information is stored in the scanner circuit SCBR, and the selection information moves in each of the shift registers while keeping the state in which the positions are apart. A quantity (shift quantity) by which the positions of the shift stages are apart is determined by information stored in the separation quantity register S-REG.

For example, when the shift stage FBL(n) of the scanner circuit SCBL illustrated in FIG. 7B holds the high-level start signal, the shift stage FAL(n+2) holds the high-level start signal in the scanner circuit SCAL illustrated in FIG. 7A. At this time, the shift stage FAR(n) holds the high-level start signal in the scanner circuit SCAR illustrated in FIG. 7C, and the shift stage FBR(n+2) holds the high-level start signal in the scanner circuit SCBR illustrated in FIG. 7D. If the shift clock signals CK-AL, CK-BL, CK-AR, and CK-BR change in this state, the high-level start signals stored in the shift registers move, and the state changes into a state where each of the shift stages FAL(n+3), FBL(n+1), FAR(n+1), and FBR(n+3) holds the high-level start signal.

When the former state has been changed into this state, the scanner circuit SCAL sets the first selection signal AL(n+3) at the high level and sets the first selection signals AL(n) to AL(n+2) and AL(n+4) to AL(n+5) at the low level. Similarly, the scanner circuit SCBL sets the second selection signal BL(n+1) at the high level and sets the second selection signals BL(n) and BL(n+2) to BL(n+5) at the low level. In addition, the scanner circuit SCAR sets the first selection signal AR(n+1) at the high level and sets the first selection signals AR(n) and AR(n+2) to AR(n+5) at the low level. Similarly, the scanner circuit SCBR sets the second selection signal BR(n+3) at the high level and sets the second selection signals BR(n) to BR(n+2) and BR(n+4) to BR(n+5) at the low level.

As a result, the unit drive circuit USL corresponding to the unit selection circuit SEL(n+3) to which the high-level first selection signal AL(n+3) is supplied causes the one end n1 of the first drive electrode TL(n+3) to be connected to the signal wire TPH or TPL according to the state selection signals VSEL1 and VSEL2. Similarly, the unit drive circuit USL corresponding to the unit selection circuit SEL(n+1) to which the high-level second selection signal BL(n+1) is supplied causes the one end n1 of the corresponding drive electrode TL(n+1) to be connected to the signal wire TPH or TPL according to the state selection signals VSEL1 and VSEL2. At this time, the unit drive circuit USR corresponding to the unit selection circuit SER(n+3) to which the high-level second selection signal BR(n+3) is supplied causes the other end n2 of the corresponding drive electrode TL(n+3) to be connected to the signal wire TPL or TPH according to the state selection signals VSEL1 and VSEL2. Similarly, the unit drive circuit USR corresponding to the unit selection circuit SER(n+1) to which the high-level first selection signal AR(n+1) is supplied causes the other end n2 of the corresponding drive electrode TL(n+1) to the signal wire TPL or TPH according to the state selection signals VSEL1 and VSEL2.

Since the state selection signals VSEL1 and VSEL2 change complementarily a plurality of times, when one of the signals is at the high level, the other becomes the low level. For example, when the state selection signal VSEL1 is at the high level and the state selection signal VSEL2 is at the low level, the second unit selection signals SELG_L(n+3) and SELG_R(n+1) respectively output from the unit selection circuit SEL(n+3) and the unit selection circuit SER(n+1) become the high level, and the first unit selection signals SELH_L(n+3) and SELH_R(n+1) respectively output from the unit selection circuit SEL(n+3) and the unit selection circuit SER(n+1) become the low level. Thus, in the unit drive circuits USL and USR respectively corresponding to the unit selection circuits SEL(n+3) and SER(n+1), the P transistors P6L and P6R (first switches S01) are turned on, and the P transistors P7L and P7R (second switches S00) are turned off.

In contrast, the second unit selection signals SELG_L(n+1) and SELG_R(n+3) respectively output from the unit selection circuit SEL(n+1) and the unit selection circuit SER(n+3) become the low level, and the first unit selection signals SELH_L(n+1) and SELH_R(n+3) respectively output from the unit selection circuit SEL(n+1) and the unit selection circuit SER(n+3) become the high level. Thus, in the unit drive circuits USL and USR respectively corresponding to the unit selection circuits SEL(n+1) and SER(n+3), the P transistors P6L and P6R (first switches S01) are turned off, and the P transistors P7L and P7R (second switches S00) are turned on.

FIG. 6 illustrates the state at this time. That is, the one end n1 of the first drive electrode TL(n+3) and the other end n2 of the second drive electrode TL(n+1) are connected to the signal wires TPH via the P transistors P6L and P6R (first switches S01) in the unit drive circuits USL and USR corresponding to the unit selection circuits SEL(n+3) and SER(n+1), respectively. The magnetic field drive signal depicted as + in FIGS. 9A and 9B is supplied to each of the one end n1 of the first drive electrode TL(n+3) and the other end n2 of the second drive electrode TL(n+1). In addition, the other end n2 of the first drive electrode TL(n+3) and the one end n1 of the second drive electrode TL(n+1) are connected to the signal wires TPL via the P transistors P7L and P7R (second switches S00) in the unit drive circuits USR and USL corresponding to the unit selection circuits SER(n+3) and SEL(n+1), respectively. The ground voltage depicted as 0 in FIGS. 9A and 9B is supplied to each of the other end n2 of the first drive electrode TL(n+3) and the one end n1 of the second drive electrode TL(n+1).

At this time, when the magnetic field drive signal depicted as + in FIGS. 9A and 9B is referred to as a first drive voltage and the ground voltage depicted as 0 in FIGS. 9A and 9B is referred to as a second drive voltage, the first drive electrode TL(n+3) is in the first drive state where the first drive voltage is supplied to the first drive electrode TL(n+3) through the one end n1 and the second drive voltage is supplied to the first drive electrode TL(n+3) through the other end n2. Simultaneously, the second drive electrode TL(n+1) is in the second drive state where the second drive voltage is supplied to the second drive electrode TL(n+1) through the one end n1 and the first drive voltage is supplied to the second drive electrode TL(n+1) through the other end n2.

Next, when the state selection signal VSEL1 becomes the low level and the state selection signal VSEL2 becomes the high level, the second unit selection signals SELG_L(n+3) and SELG_R(n+1) respectively output from the unit selection circuit SEL(n+3) and the unit selection circuit SER(n+1) become the low level, and the first unit selection signals SELH_L(n+3) and SELH_R(n+1) respectively output from the unit selection circuit SEL(n+3) and the unit selection circuit SER(n+1) become the high level. Thus, in the unit drive circuits USL and USR respectively corresponding to the unit selection circuits SEL(n+3) and SER(n+1), the P transistors P6L and P6R (first switches S01) are turned off, and the P transistors P7L and P7R (second switches S00) are turned on.

At this time, the second unit selection signals SELG_L(n+1) and SELG_R(n+3) respectively output from the unit selection circuit SEL(n+1) and the unit selection circuit SER(n+3) become the high level, and the first unit selection signals SELH_L(n+1) and SELH_R(n+3) respectively output from the unit selection circuit SEL(n+1) and the unit selection circuit SER(n+3) become the low level. Thus, in the unit drive circuits USL and USR respectively corresponding to the unit selection circuits SEL(n+1) and SER(n+3), the P transistors P6L and P6R (first switches S01) are turned on, and the P transistors P7L and P7R (second switches S00) are turned off.

As a result, the ground voltage depicted as 0 in FIGS. 9A and 9B is supplied to each of the one end n1 of the first drive electrode TL(n+3) and the other end n2 of the second drive electrode TL(n+1) from the signal wire TPL, and the magnetic field drive signal depicted as + in FIGS. 9A and 9B is supplied to each of the other end n2 of the first drive electrode TL(n+3) and the one end n1 of the second drive electrode TL(n+1) from the signal wire TPH.

At this time, the first drive electrode TL(n+3) is in the second drive state where the second drive voltage is supplied to the first drive electrode TL(n+3) through the one end n1 and the first drive voltage is supplied to the first drive electrode TL(n+3) through the other end n2. Simultaneously, the second drive electrode TL(n+1) is in the first drive state where the first drive voltage is supplied to the second drive electrode TL(n+1) through the one end n1 and the second drive voltage is supplied to the second drive electrode TL(n+1) through the other end n2.

FIG. 9A illustrates the relation of the drive voltages supplied to the selected drive electrodes TL(n+3) and TL(n+1) when the state selection signal VSEL1 is set at the high level and the state selection signal VSEL2 is set at the low level. In contrast, FIG. 9B illustrates the relation of the drive voltages supplied to the selected drive electrodes TL(n+3) and TL(n+1) when the state selection signal VSEL1 is set at the low level and the state selection signal VSEL2 is set at the high level.

In FIG. 9A, the first drive electrode TL(n+3) is in the first drive state where the first drive voltage depicted as + is supplied to the first drive electrode TL(n+3) through the one end n1 and the second drive voltage depicted as 0 is supplied to the first drive electrode TL(n+3) through the other end n2. Simultaneously, the second drive electrode TL(n+1) is in the second drive state where the second drive voltage depicted as 0 is supplied to the second drive electrode TL(n+1) through the one end n1 and the first drive voltage depicted as + is supplied to the second drive electrode TL(n+1) through the other end n2. At this time, since a current I2 flows in a direction from the one end n1 (side 2-L side) toward the other end n2 (side 2-R side) of the first drive electrode TL(n+3) and a current I1 flows in a direction from the other end n2 (side 2-R side) toward the one end n1 (side 2-L side) of the second drive electrode TL(n+1), the currents I2 and I1 flow in opposite directions. Magnetic fields $\varphi12$ and $\varphi11$ respectively generated by the currents I2 and I1 overlap in the region of the drive electrode TL(n+2).

In contrast, In FIG. 9B, the first drive electrode TL(n+3) is in the second drive state where the second drive voltage is supplied to the first drive electrode TL(n+3) through the one end n1 and the first drive voltage is supplied to the first drive electrode TL(n+3) through the other end n2. Simultaneously, the second drive electrode TL(n+1) is in the first drive state where the first drive voltage is supplied to the second drive electrode TL(n+1) through the one end n1 and the second drive voltage is supplied to the second drive electrode TL(n+1) through the other end n2. At this time, the current I1 flows in a direction from the other end n2 (side 2-R side) toward the one end n1 (side 2-L side) of the first drive electrode TL(n+3), and the current I2 flows in a direction from the one end n1 (side 2-L side) toward the other end n2 (side 2-R side) in the second drive electrode TL(n+1). That is, the driven states of the first drive electrodes TL(n+3) and the second drive electrode TL(n+1) in FIG. 9B are opposite to the drive states in FIG. 9A.

In the present specification, the state where the first drive voltage is supplied to the one end n1 of the selected drive electrode and the second drive voltage is supplied to the other end n2 of the selected drive electrode in the magnetic field touch period is defined as the first drive state, and the state where the second drive voltage is supplied to the one end n1 of the selected drive electrode and the first drive voltage is supplied to the other end n2 of the selected drive electrode in the magnetic field touch period is defined as the second drive state. That is, the state where a current flows in the direction from the end n1 toward the end n2 of the selected drive electrode is referred to as the first drive state, and the state where a current flows from the end n2 toward the end n1 is referred to as the second drive state. In the present specification, the first drive voltage may be any as long as the first drive voltage is greater in voltage value than the second drive voltage. For example, the first drive voltage is a voltage Vd higher in voltage value than the ground voltage Vs. For example, the second drive voltage is the ground voltage Vs.

In the first embodiment, by complementarily changing the values of the state selection signals VSEL1 and VSEL2, the drive state of the selected drive electrode can be alternately switched over between the first drive state and the second drive state for each predetermined time period according to the cycle of the change of the state selection signals. That is, in the first drive electrode TL(n+3), the first drive state illustrated in FIG. 9A and the second drive state illustrated in FIG. 9B alternately occur according to the change of the state selection signals. Simultaneously, in the second drive electrode TL(n+1), the second drive state illustrated in FIG. 9A and the first drive state illustrated in FIG. 9B alternately occur according to the change of the state selection signals. Note that an operation of transition from the first drive state to the second drive state with respect to the first drive electrode has been described with reference to FIG. 6 and FIGS. 9A and 9B; however, the state may transition from the second drive state to the first drive state. The transition order can be adjusted by the values of the state selection signals.

As described above, by driving the selected drive electrode such that the first drive state and the second drive state temporally alternately occur in the selected drive electrode, it is possible to continuously keep generating a strong magnetic field for a desired time period.

Figure 10A:
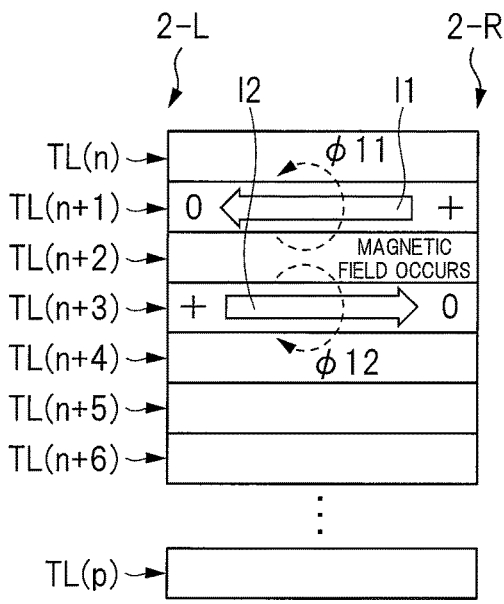
FIG. 10A is an explanatory diagram for explaining driving of selected drive electrodes.
Figure 10B:
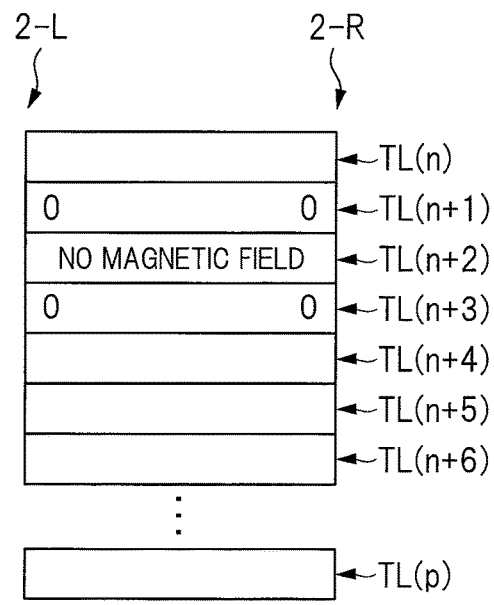
FIG. 10B is an explanatory diagram for explaining driving of selected drive electrodes.

A comparative example where the drive state of the drive electrode is not alternately reversed will be described with reference to FIGS. 10A and 10B. Similarly to FIG. 9A, FIG. 10A illustrates a state where the first drive electrode TL(n+3) is in the first drive state and the second drive electrode TL(n+1) is in the second drive state. As time passes, change amounts of the currents I2 and I1 respectively flowing through the first drive electrode TL(n+3) and the second drive electrode TL(n+1) become gradually smaller. After a predetermined time period has passed, the change amounts of the currents reach a steady state, and as a result, no current flows. Accordingly, the generated magnetic fields φ11 and φ12 become gradually weak. Therefore, the capacitance of the coil inside the pen may not be charged sufficiently or it may take time to charge the capacitance only with the state illustrated in FIG. 10A. In addition, when no current flows, a reset state period for supplying, for example, the ground voltage to the end n1 and the end n2 of each of the first drive electrode TL(n+3) and the second drive electrode TL(n+1) has to be provided for a predetermined time period, as illustrated in FIG. 10B. After the reset state period illustrated in FIG. 10B, by bringing the state back to the drive state illustrated in FIG. 10A, the currents I2 and I1 start to flow again, and the magnetic fields φ11 and φ12 are generated. However, since the reset state period is a time period which does not contribute to magnetic field generation, there is a problem that performance of reset operation makes the magnetic field touch detection period longer.

In the present embodiment, the first drive state and the second drive state where the current flowing directions, that is, the directions of the generated magnetic field are reversed, alternately and continuously occur when the magnetic field is generated at the selected drive electrode. Therefore, it is possible to keep generating a strong magnetic field continuously, and the capacitance inside the pen can be sufficiently charged even in a short time period. Therefore, since the magnetic field φ2 generated by the pen Pen in the magnetic field detection period becomes strong, the detection sensitivity of the input detection device can be improved. In addition, since different voltages are constantly supplied to both ends of the drive electrode and the reset state period in which no magnetic field is generated is not included, the magnetic field generation period in magnetic field touch detection can be shortened. Alternatively, since the magnetic field φ2 becomes strong, the magnetic field generation period and/or the magnetic field detection period can be shortened, and time taken for touch detection can be shortened. Shortening of the time taken for touch detection enables enlargement of the display region 2 and/or improvement of definition of the display region 2.

In the magnetic field generation period, the state selection signals VSEL1 and VSEL2 change, and therefore, each of the first drive electrode and the second drive electrode is driven into the first drive state and the second driven state at least once. In each of the first drive electrode and the second drive electrode, a timing at which the drive state is changed from the first drive state (or the second drive state) to the second drive state (or the first drive state) is a timing at which the change amount of the current (current change amount) flowing through the first drive electrode and/or the second drive electrode becomes less than a predetermined value or a timing at which the current becomes temporally steady. However, the timing at which the drive state is changed is not limited to this. The timing at which the drive state is changed can be changed by controlling the timing at which the state selection signals VSEL1 and VSEL2 are changed.

The number of times that the drive state is changed from the first drive state (or the second drive state) to the second drive state (or the first drive state) is not particularly limited as long as the capacitance inside the pen can be sufficiently charged, and the drive state may be changed at least once in a predetermined period.

In addition, in the present embodiment, the first drive voltage which is a DC voltage is preferably supplied to the signal wire TPH, and a second drive voltage which is a DC voltage is preferably supplied to the signal wire TPL in the magnetic field generation period.

<Entire Operation of Magnetic Field Touch Detection>

Next, an entire operation of the magnetic field touch detection in the display device 1 according to the first embodiment will be described. An operation of the display device 1 according to the first embodiment will be described with reference to a waveform diagram; however, in order to prevent a drawing from being complicated, the waveform diagram is divided into FIGS. 11 and 12.

FIG. 11 illustrates the waveforms of the control signal COMFL, the detection timing signal TPSEL, the state selection signals VSEL1 and VSEL2, and the drive signals TPH and TPL supplied in common to the first scanner circuit SCL, the second scanner circuit SCR, the first selection drive circuit SDL, and the second selection drive circuit SDR illustrated in FIG. 4, and the waveforms of the shift clock signals CK-AL and CK-BL and the start signals ST-AL and ST-BL supplied to the first scanner circuit SCL. In addition, FIG. 11 illustrates the waveforms of the first unit selection signals SELH_L(n) to SELH_L(n+5) and the second unit selection signals SELG_L(n) to SELG_L(n+5) respectively output from the unit selection circuits SEL(n) to SEL(n+5) illustrated in FIG. 6.

Figure 12:
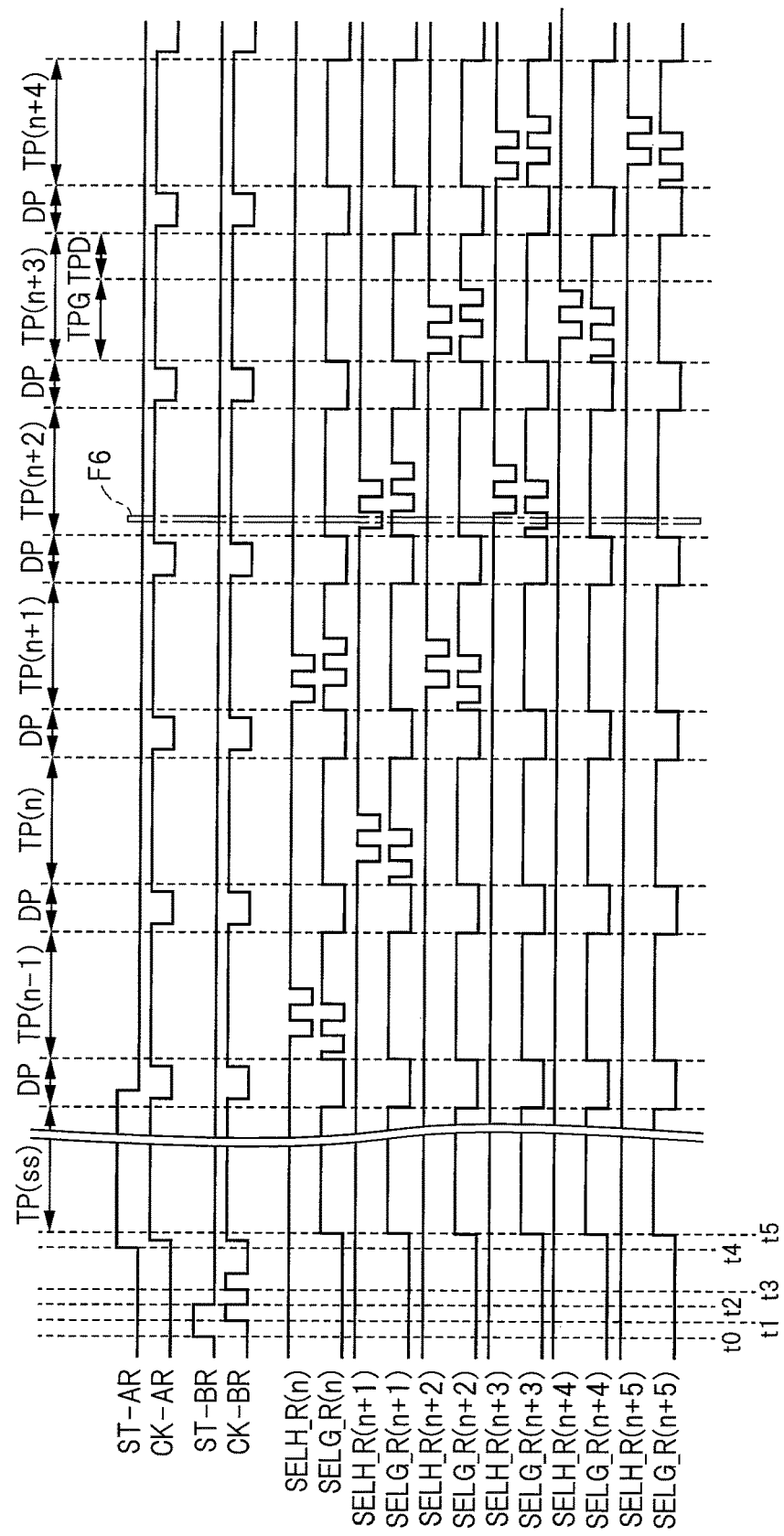
FIG. 12 is a waveform diagram illustrating the entire operation of the magnetic field touch detection according to the first embodiment.

In contrast, FIG. 12 illustrates the waveforms of the shift clock signals CK-AR and CK-BR and the start signals ST-AR and ST-BR supplied to the second scanner circuit SCR, and the waveforms of the first unit selection signals SELH_R(n) to SELH_R(n+5) and the second unit selection signals SELG_R(n) to SELG_R(n+5) respectively output from the unit selection circuits SER(n) to SER(n+5) illustrated in FIG. 6. The waveform diagram illustrating the operation of the display device 1 is completed by arranging FIG. 12 on the lower side of FIG. 11.

In FIGS. 11 and 12, reference character DP denotes the display period in which an image is displayed in the display region 2. In addition, each of reference characters TP(n−1) to TP(n+4) denotes the magnetic field detection period (hereinafter also referred to as the magnetic field touch detection period). In addition, reference character TP(ss) denotes a start period in which magnetic field touch detection is started. In the first embodiment, as described with reference to FIGS. 2A to 2C, each of the magnetic field touch detection periods TP(n−1) to TP(n+4) is constituted by the magnetic field generation period and the magnetic field detection period. In FIG. 11, the magnetic field generation period constituting the magnetic field touch detection period TP(n+3) is denoted by reference character TPG, and the magnetic field detection period constituting the magnetic field touch detection period TP(n+3) is denoted by reference character TPD by way of example. Similarly, each of the other magnetic field touch detection periods is constituted by the magnetic field generation period TPG and the magnetic field detection period TPD subsequent to the magnetic field generation period TPG.

In the first embodiment, the control device 3 causes the magnetic field touch detection period and the display period DP to alternately occur after the start period TP(ss), even though the turn of the magnetic field touch detection period and the display period DP is not limited to this. In addition, the control device 3 causes a magnetic field to be generated in a region of one drive electrode in one magnetic field touch detection period. In the first embodiment, the control device 3 causes a magnetic field to be sequentially generated in the regions of the drive electrodes TL(0) to TL(p). In the magnetic field generation period in the magnetic field touch detection period TP(n−1) illustrated in FIGS. 11 and 12, the control device 3 causes a magnetic field to be generated in the region of the drive electrode TL(n−1). Similarly, in the magnetic field generation periods in the magnetic field touch detection periods TP(n) to TP(n+4), the control device 3 causes a magnetic field to be generated in the regions of the drive electrodes TL(n) to TL(n+4), respectively.

In the first embodiment, the control device 3 causes the first scanner circuit SCL, the second scanner circuit SCR, and the like to grasp the magnetic field touch detection period TP and the display period DP by using the control signal COMFL. In addition, the control device 3 causes the first scanner circuit SCL, the second scanner circuit SCR, and the like to grasp the magnetic field generation period TPG by using the detection timing signal TPSEL. That is, the control device 3 sets the control signal COMFL at the high level in the magnetic field touch detection period TP and sets the control signal COMFL at the low level in the display period DP. In addition, the control device 3 sets the detection timing signal TPSEL at the high level in the magnetic field generation period TPG. The first scanner circuit SCL and the second scanner circuit SCR output the above first selection signal and the above second selection signal when the detection timing signal TPSEL is at the high level. In addition, the detection circuit DET illustrated in FIG. 4 operates when the control signal COMFL is at the high level and the detection timing signal TPSEL is at the low level. The control device 3 supplies image signals to the signal lines SL(0) to SL(p) and performs display in the display period DP in which the control signal COMFL and the detection timing signal TPSEL are at the low level.

The control device 3 periodically changes the voltages of the state selection signals VSEL1 and VSEL2 a plurality of times in each magnetic field generation period TPG. In addition, the control device 3 supplies the ground voltage Vs to the signal wire TPL and supplies the DC voltage Vd higher in voltage value than the ground voltage Vs to the signal wire TPH in the magnetic field generation period TPG. The control device 3 supplies a display drive voltage VCOMDC to the signal wire TPL in the display period DP. Reference character VCOMDC is a predetermined DC voltage equivalent to a common electrode potential in the display period. In the present embodiment, the voltage VCOMDC is a negative DC voltage lower in potential than the ground voltage; however, the voltage VCOMDC is not limited to this and may be set to any value.

The control device 3 starts to change the shift clock signals CK-BL and CK-AR when the start period TP(ss) is initiated at time t5. The control device 3 changes the shift clock signals CK-AL and CK-BR before time t5 by the number of times corresponding to the sum of the separation quantity n stored in the separation quantity register S-REG and the number m of drive electrodes bundled together, the number being stored in the bundle register C-REG. FIGS. 11 and 12 illustrate a case where 1 is stored as the separation quantity in the separation quantity register S-REG, and 1 is stored as the number m of drive electrodes bundled together, the number being stored in the bundle register C-REG. Therefore, the control device 3 changes the shift clock signals CK-AL and CK-BR at time t1 and time t3 before time t5, twice in total. In addition, in the period from time t0 to time t2, that is, in the period in which the shift clock signals CK-AL and CK-BR are changed by the number of drive electrodes bundled together, that is, changed once, the control device 3 sets the start signals ST-AL and ST-BR at the high level indicating selection of a drive electrode and then sets at the low level.

Then, at time t4, the control device 3 sets the start signals ST-BL and ST-AR at the high level indicating selection of a drive electrode. At time t5, the control device 3 changes the shift clock signals CK-AL, CK-BL, CK-AR, and CK-BR, and subsequently changes the shift clock signals CK-AL, CK-BL, CK-AR, and CK-BR in each of the magnetic field touch detection period. At this time, the control device 3 changes the shift clock signals CK-AL, CK-BL, CK-AR, and CK-BR such that the shift clock signals have the same cycle.

Thus, the shift stage in which the high-level start signal ST-AL indicating selection of a drive electrode is stored in the shift register of the scanner circuit SCAL is two stages ahead of the shift stage in which the high-level start signal ST-BL is stored in the shift register of the scanner circuit SCBL. Similarly, the shift stage in which the high-level start signal ST-BR indicating selection of a drive electrode is stored in the shift register of the scanner circuit SCBR is two stages ahead of the shift stage in which the high-level start signal ST-AR is stored in the shift register of the scanner circuit SCAR. That is, each of the scanner circuits SCAL and SCBR selects the drive electrode which is ahead of the drive electrode selected by each of the scanner circuits SCBL and SCAR by two, which corresponds to the sum of the separation quantity n and the number m of drive electrodes bundled together.

When the shift clock signals CK-AL, CK-BL, CK-AR, and CK-BR periodically change and the magnetic field touch detection period TP(n−1) has been reached, the shift stage FAL(n) (see FIG. 7A) of the scanner circuit SCAL holds the high-level start signal and outputs the high-level first selection signal AL(n). In the magnetic field touch detection period TP(n−1), the state selection signals VSEL1 and VSEL2 change, and accordingly, as illustrated in FIG. 11, the first unit selection signal SELH_L(n) and the second unit selection signal SELG_L(n) which change in synchronization with the changes of the state selection signals VSEL1 and VSEL2 are output from the unit selection circuit SEL(n) corresponding to the shift stage FAL(n).

At this time, since the high-level start signal is also held in the shift stage FBR(n) (see FIG. 7D) of the scanner circuit SCBR, the shift stage FBT(n) outputs the high-level second selection signal BR(n). Therefore, as illustrated in FIG. 12, in the magnetic field touch detection period TP(n−1), the first unit selection signal SELH_R(n) and the second unit selection signal SELL_R(n) in synchronization with the changes of the state selection signals VSEL1 and VSEL2 are output from the corresponding unit selection circuit SER(n).

At this time, in the period in which the state selection signal VSEL1 is at the high level and the state selection signal VSEL2 is at the low level, the drive electrode TL(n) is brought into the first drive state where the first drive voltage is supplied to the end n1 of the drive electrode TL(n) via the signal wire TPH and the second drive voltage is supplied to the end n2 of the drive electrode TL(n) via the signal wire TPL. In addition, in the period in which the state selection signal VSEL1 is at the low level and the state selection signal VSEL2 is at the high level, the drive electrode TL(n) is brought into the second drive state where the second drive voltage is supplied to the end n1 of the drive electrode TL(n) via the signal wire TPL and the first drive voltage is supplied to the end n2 of the drive electrode TL(n) via the signal wire TPH. In the magnetic field generation period TPG of the magnetic field touch detection period TP(n−1), since the values of the state selection signals VSEL1 and VSEL2 alternately change four times each, the drive electrode TL(n) is alternately changed into the first drive state, the second drive state, the first drive state, and the second drive state, that is, the drive state alternately changes four times.

When the shift clock signals CK-AL, CK-BL, CK-AR, and CK-BR change and the magnetic field touch detection period TP(n+1) has been reached, the high-level start signal moves from the shift stage FAL(n+1) to the shift stage FAL(n+2) and is stored in the shift stage FAL(n+2). Similarly, the high-level start signal moves from the shift stage FBR(n+1) to the shift stage FBR(n+2) and is stored in the shift stage FBR(n+2).

At this time, the high-level start signal fetched in the shift register of the scanner circuit SCBL at time t5 moves from the previous shift stage to the shift stage FBL(n) (see FIG. 7B) of the shift register of the scanner circuit SCBL and is stored in the shift stage FBL(n). Similarly, at this time, the high-level start signal fetched in the shift register of the scanner circuit SCAR at time t5 moves from the previous shift stage to the shift stage FAR(n) (see FIG. 7C) of the shift register of the scanner circuit SCAR and is stored in the shift stage FAR(n).

Therefore, in the magnetic field generation period TPG of the magnetic field touch detection period TP(n+1), the first unit selection signal and the second unit selection signal in synchronization with periodical changes of the state selection signals VSEL1 and VSEL2 are output not only from the unit selection circuits SEL(n+2) and SER(n+2) corresponding to the shift stages FAL(n+2) and FBR(n+2), respectively, but also from the unit selection circuits SEL(n) and SER(n) corresponding to the shift stages FAL(n) and FBR(n), respectively. That is, as illustrated in FIGS. 11 and 12, the periodically changing first unit selection signals SELH_L (n+2) and SELH_R(n+2) and the periodically changing second unit selection signals SELG_L(n+2) and SELG_R (n+2) are output from the unit selection circuits SEL(n+2) and SER(n+2), respectively, and the periodically changing first unit selection signals SELH_L(n) and SELH_R(n) and the periodically changing second unit selection signals SELG_L(n) and SELG_R(n) are output from the unit selection circuits SEL(n) and SER(n), respectively.

Thus, in the magnetic field generation period TPG of the magnetic field touch detection period TP(n+1), each of the drive electrodes TL(n) and TL(n+2) arranged across the drive electrode TL(n+1) are alternately changed into the first drive state and the second drive state according to the periodical changes of the state selection signals VSEL1 and VSEL2.

That is, in the period in which the state selection signal VSEL1 is at the high level and the state selection signal VSEL2 is at the low level, the drive electrode TL(n+2) is brought into the first drive state where the first drive voltage is supplied to the end n1 of the drive electrode TL(n+2) and the second drive voltage is supplied to the end n2 of the drive electrode TL(n+2), and at the same time, the drive electrode TL(n) is brought into the second drive state where the second drive voltage is supplied to the end n1 of the drive electrode TL(n) and the first drive voltage is supplied to the end n2 of the drive electrode TL(n). In addition, in the period in which the state selection signal VSEL1 is at the low level and the state selection signal VSEL2 is at the high level, the drive electrode TL(n+2) is brought into the second drive state where the second drive voltage is supplied to the end n1 of the drive electrode TL(n+2) via the signal wire TPL and the first drive voltage is supplied to the end n2 of the drive electrode TL(n+2) via the signal wire TPH, and the drive electrode TL(n) is brought into the first drive state where the first drive voltage is supplied to the end n1 of the drive electrode TL(n) and the second drive voltage is supplied to the end n2 of the drive electrode TL(n). In the magnetic field generation period TPG of the magnetic field touch detection period TP(n−1), since the values of the state selection signals VSEL1 and VSEL2 alternately change four times each, the drive states of the drive electrode TL(n+2) and the drive electrode TL(n) alternately change four times each.

Each operation in the magnetic field touch detection periods TP(n+2) to TP(n+4) is identical to the operation in the magnetic field touch detection period TP(n+1) except that the high-level start signal moves and therefore the first selection signal and the second selection signal which change in synchronization with periodical changes of the state selection signals VSEL1 and VSEL2 sequentially move. Therefore, the operation in each of the magnetic field touch detection periods TP(n+2) to TP(n+4) will not be described.

Note that the connection state illustrated in FIG. 6 corresponds to the state at the timing encircled by an alternate long and short dash line F6 in FIGS. 11 and 12.

In the first embodiment, the shift registers of the scanner circuits SCAL and SCBR fetch the high-level start signals at time t1 illustrated in FIGS. 11 and 12 and then fetch the low-level indicating non-selection of the drive electrode in synchronization with the changes of the shift clock signals CK-AL and CK-BR. Similarly, the shift registers of the scanner circuits SCBL and SCAR fetch the high-level start signals at time t5 illustrated in FIGS. 11 and 12 and then fetch the low-level indicating non-selection of the drive electrode in synchronization with the changes of the shift clock signals CK-BL and CK-AR.

Thus, the shift stages excluding the shift stages holding the high-level start signals each output the low-level first selection signal and the low-level second selection signal in the magnetic field touch detection period. For example, in the magnetic field touch detection period TP(n+1) illustrated in FIGS. 11 and 12, the shift stages FAL(n) to FAL(n+1), FAL(n+3) to FAL(n+5), FBL(n+1) to FBL(n+5), FAR(n+1) to FAR(n+5), FBR(n) to FBR(n+1), and FBR(n+3) to FBR (n+5) hold the low level indicating non-selection.

The drive electrodes TL(n+1) and TL(n+3) corresponding to the shift stages FAL(n+1), FAL(n+3) to FAL(n+5), FBL(n+1), FBL(n+5), FAR(n+1), FAR(n+3) to FAR(n+5), FBR (n+1), and FBR(n+3) to FBR (n+5) which each hold the low-level first selection signal and the low-level second selection signal have floating potentials, which means that the ends n1 and n2 are separated from both the signal wires TPH and TPL as described with reference to FIGS. 8A and 8B. Thus, the parasitic capacitance between a non-selected drive electrode and a selected drive electrode can be reduced, and detection speed of the input detection device can be improved.

In addition, in the first embodiment, the control device 3 controls the gate driver 4 illustrated in FIG. 4 such that the gate driver 4 causes all the scan lines GL(0) to GL(p) to be in a floating state in the magnetic field touch detection period. Furthermore, in the magnetic field touch detection period, the control device 3 causes all the signal lines SL(0) to SL(p) to be in a floating state. Therefore, when the voltage of the selected drive electrode is changed, it is possible to reduce charging and discharging of the parasitic capacitance between the scan line or the signal line and the selected drive electrode, and it is possible to increase the speed of changing the voltage of the selected drive electrode.

In the magnetic field touch detection period, in the magnetic field detection period TPD subsequent to the magnetic field generation period TPG, a magnetic field from the pen Pen is detected. The operation in the magnetic field detection period TPD is the same as the operation described with reference to in FIG. 2B. That is, magnetic field detection coils such as DY(n−2) to DY(n+1) are constituted by the detection electrodes RL(0) to RL(p) formed on the second substrate CGB, and the magnetic field from the pen Pen is detected. Since the operation in the magnetic field detection period TPD is the same as the operation described with reference to FIG. 2B, the operation in the magnetic field detection period TPD will not be described.

<Operation of Electric Field Touch Detection>

The display device 1 according to the first embodiment can perform both magnetic field touch detection and electric field touch detection. Next, the operation performed in the case of electric field touch detection will be described.

The configuration of the display device 1 is the same also in the case of electric field touch detection. The waveforms of signals generated by the control device 3 differ from the waveforms in the case of magnetic field touch detection. The operation in electric field touch detection will be described with reference to a waveform diagram. In order to prevent a drawing from being complicated, the waveform diagram is divided into FIG. 13 and FIG. 14 here. The waveform diagram is completed by arranging FIG. 14 on the lower side of FIG. 13. Since the FIGS. 13 and 14 are similar to FIGS. 11 and 12, points of difference will be mainly described here.

As described above, in magnetic field touch detection, the detection timing signal TPSEL is used in order to discriminate the magnetic field generation period and the magnetic field detection period. In contrast, in electric field touch detection, as described with reference to FIGS. 3A to 3C, an electric field is generated by the drive electrode, the change in electric field at this time is detected by the detection electrode, and thus, touch is detected. Therefore, it is not required to discriminate a period in which an electric field is generated from a period in which the electric field is detected, and the detection timing signal TPSEL is not used, so that the detection timing signal TPSEL is not illustrated in FIGS. 13 and 14. In addition, in magnetic field touch detection, the control signal COMFL becomes the high level in the touch period. However, in electric field touch detection, the control signal COMFL is always maintained at the low level. That is, whether it is magnetic field touch detection or electric field touch detection is discriminated based on whether the control signal COMFL is at the high level or the low level.

In the first embodiment, similarly to magnetic field touch detection, the control device 3 causes a display period and an electric field touch detection period to alternately occur. In FIGS. 13 and 14, reference character DP denotes the display period, and reference characters TC(n) to TC(n+5) denote electric field touch detection periods in which electric field touch detection is performed in the regions of the drive electrodes TL(n) to TL(n+5), respectively. In addition, reference character TC(ss) denotes a start period in which electric field touch detection is started.

Figure 13:
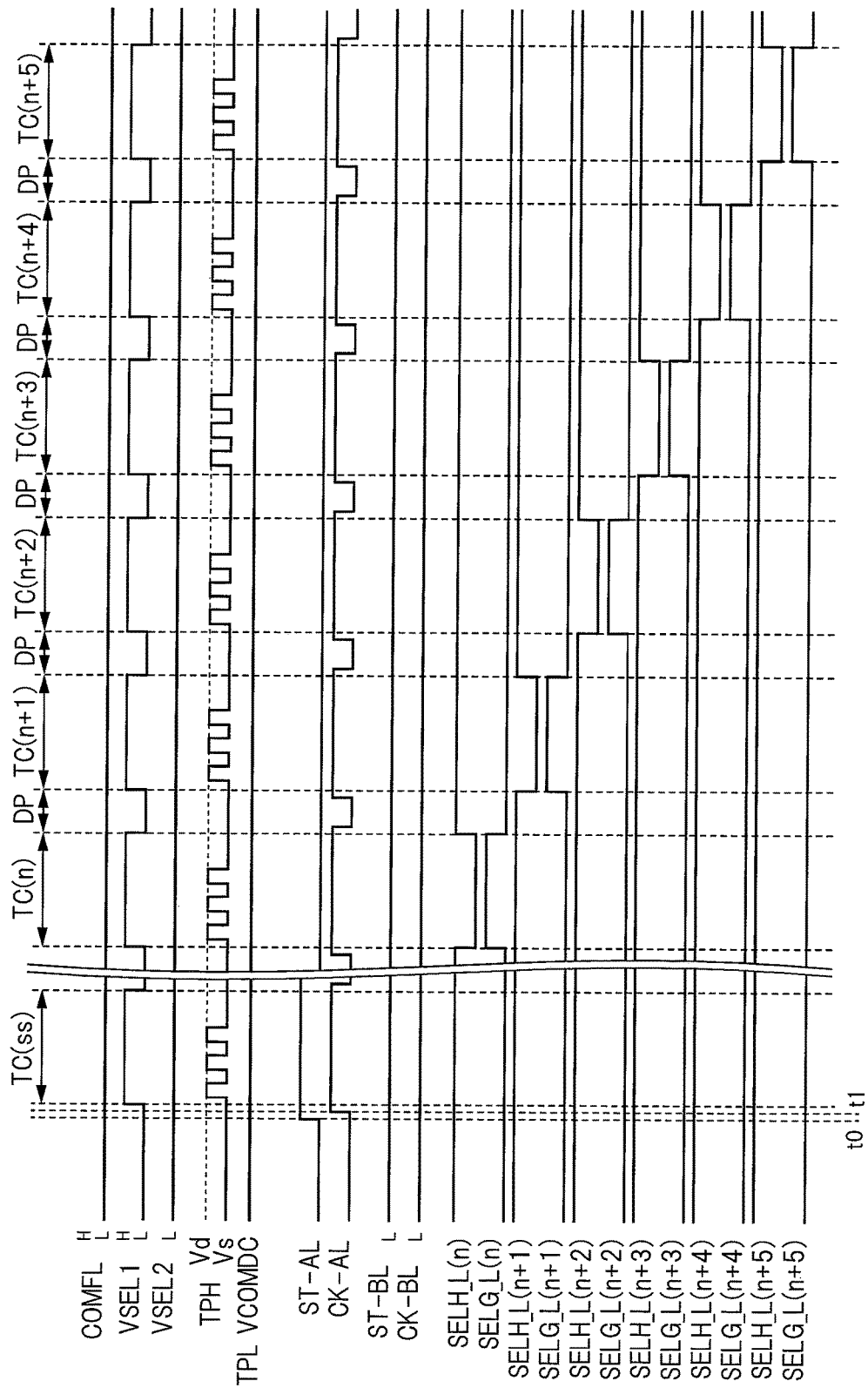
FIG. 13 is a waveform diagram illustrating an operation of electric field touch detection according to the first embodiment.
Figure 14:
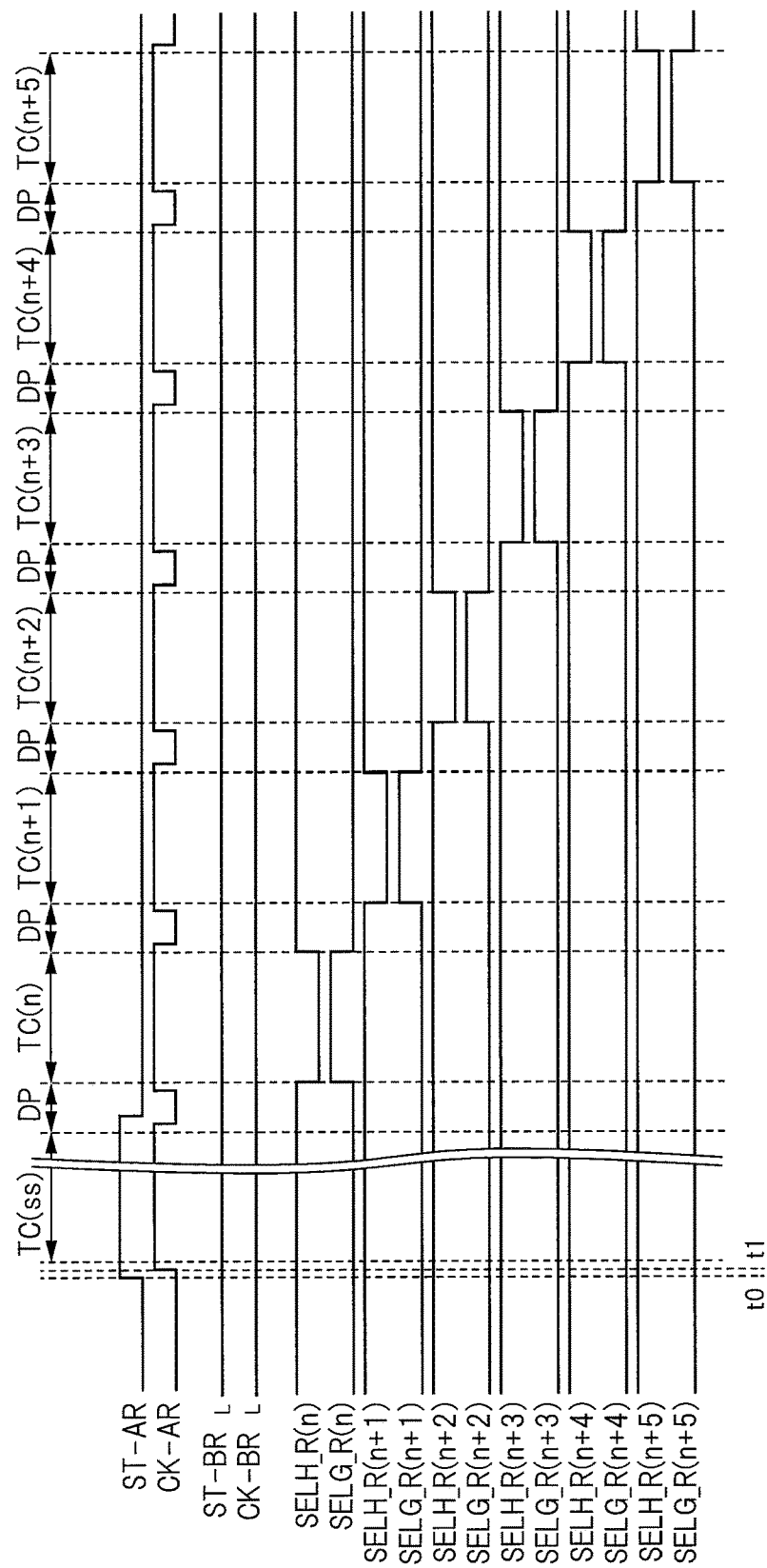
FIG. 14 is a waveform diagram illustrating the operation of the electric field touch detection according to the first embodiment.

In electric field touch detection, as illustrated in FIG. 13, the control device 3 sets the control signal COMFL at the low level L and sets the drive signal TPL at the display drive voltage VCOMDC. In addition, the control device 3 periodically changes the voltage of the drive signal TPH between the ground voltage Vs and the voltage Vd higher in voltage value than the ground voltage in the start period TC(ss) and the electric field touch detection periods (TC(n) to TC(n+5) in FIGS. 13 and 14). This periodically changing AC signal is equivalent to the electric field drive signal. Furthermore, the control device 3 sets the state selection signal VSEL2 at the low level L in the electric field touch detection period and changes the state selection signal VSEL1 from the low level L to the high level H in the start period TC(ss) and the electric field touch detection period.

In magnetic field touch detection, the control device 3 generates the shift clock signals and the start signals by using the separation quantity stored in the separation quantity register S-REG. However, in electric field touch detection, the control device 3 generates the shift clock signals and the start signals without using the separation quantity. That is, as illustrated in FIGS. 13 and 14, in the case of electric field touch detection, at time t0, the control device 3 changes the start signals ST-AL and ST-AR from the low level to the high level indicating selection of a drive electrode once according to m=1 (m denotes the number of drive electrodes bundled together). In addition, the control device 3 changes the shift clock signals CK-AL and CK-AR from the low level to the high level in each of the start period TC(ss) and the electric field touch detection periods. That is, the control device 3 periodically changes the shift clock signals CK-AL and CK-AR. In contrast, in electric field touch detection, as illustrated in FIGS. 13 and 14, the control device 3 maintains the start signals ST-BL and ST-BR at the low level L and maintains the shift clock signals CK-BL and CK-BR at the low level L. That is, the control device 3 does not change the shift clock signals CK-BL and CK-BR in electric field touch detection. That is, in electric field touch detection, only the scanner circuits SCAL and the scanner circuit SCAR select a drive electrode, and the scanner circuits SCBL and the scanner circuit SCBR do not select a drive electrode.

At time t0, the shift clock signals CK-AL and CK-AR change, and accordingly, the shift registers of the scanner circuits SCAL and SCAR fetch the high-level start signals ST-AL and ST-AR indicating selection of a drive electrode. In contrast, since the shift clock signals CK-BL and CK-BR do not change, the shift registers of the scanner circuits SCBL and SCBR do not fetch the start signals ST-BL and ST-BR and output the previous states. The shift registers of the scanner circuits SCBL and SCBR are reset before time t0, and all the second selection signals output from the scanner circuits SCBL and SCBR become the low level, even though the reset timing of each of the shift registers of the scanner circuits SCBL and SCBR is not limited to this.

Every time the electric field touch detection period is repeated, the shift clock signals CK-AL and CK-AR change. When the electric field touch detection period TC(n) has been reached, the shift stages FAL(n) and FAR(n) illustrated in FIGS. 7A and 7C fetch and hold the high-level start signals ST-AL and ST-AR respectively output from previous shift stages, the high-level start signals indicating selection, in synchronization with the changes of the shift clock signals CK-AL and CK-AR. As a result, the first selection signal AL(n) and the third selection signal AR(n) respectively output from the shift stages FAL(n) and FAR(n) change from the low level to the high level. Thus, the first transfer switches TP1L and TP1R and the second transfer switches TP2L and TP2R are turned on in the unit selection circuits SEL(n) and SER(n) illustrated in FIGS. 8A and 8B, respectively.

At this time, since the state selection signal VSEL1 becomes the high level H and the state selection signal VSEL2 becomes the low level L, as illustrated in FIGS. 13 and 14, the second unit selection signals SELG_L(n) and SELL_R(n) become the high level, and the first unit selection signals SELH_L(n) and SELH_R(n) become the low level. Thus, the P transistors P6L and P6R are turned on and the P transistors P7L and P7R are turned off in the unit drive circuits USL and USR corresponding to the unit selection circuits SEL(n) and SER(n), respectively. As a result, the one end n1 of the drive electrode TL(n) corresponding to the shift stages FAL(n) and FAR(n) is connected to the signal wire TPH via the P transistor P6L, and the other end n2 of the drive electrode TL(n) is connected to the signal wire TPH via the P transistor P6R.

In the electric field touch detection period TC(n), the periodically changing AC electric field drive signal is supplied to both ends n1 and n2 of the drive electrode TL(n). At this time, the detection electrode RL outputs the detection signal according to the electric field drive signal.

Note that, since each of the scanner circuits SCBL and SCBR consecutively outputs the low-level second selection signal in electric field touch detection, the drive electrode not selected by the scanner circuits SCAL and SCAR is selected by none of the scanner circuits.

As described with reference to FIGS. 8A and 8B, differently from the control signal COMFL in the magnetic field touch detection period, the control signal COMFL becomes the low level in the electric field touch detection period. Therefore, when the first selection signal and the second selection signal supplied to the unit selection circuits SEL(n) and SER(n), respectively, are at the low level, the low-level second unit selection signals SELG_L and SELL_R are output from the inverter circuits IV2L and IV2R, respectively, and the ends n1 and n2 of the non-selected drive electrode are connected to the signal wires TPL.

In the electric field touch detection period TC(n), the high-level first unit selection signals SELH_L(n+1) to SELH_L(n+5) and SELH_R(n+1) to SELH_R(n+5) and the low-level second unit selection signals SELG_L(n+1) to SELG_L(n+5) and SELG_R(n+1) to SELG_R(n+5) are respectively output from the unit selection circuits SEL(n) to SEL(n+5) and SER(n) to SER(n+5) corresponding to the drive electrodes TL(n+1) to TL(n+5) selected by neither the scanner circuit SCAL nor the scanner circuit SCAR, the ends n1 and n2 of the drive electrodes TL(n+1) to TL(n+5) are connected to the signal wires TPL, and the display drive voltage VCOMDC is supplied to the ends n1 and n2. By supplying the DC display drive voltage VCOMDC to both ends of the non-selected drive electrode, noise from the non-selected drive electrode affecting the detection electrode can be reduced.

Figure 15:
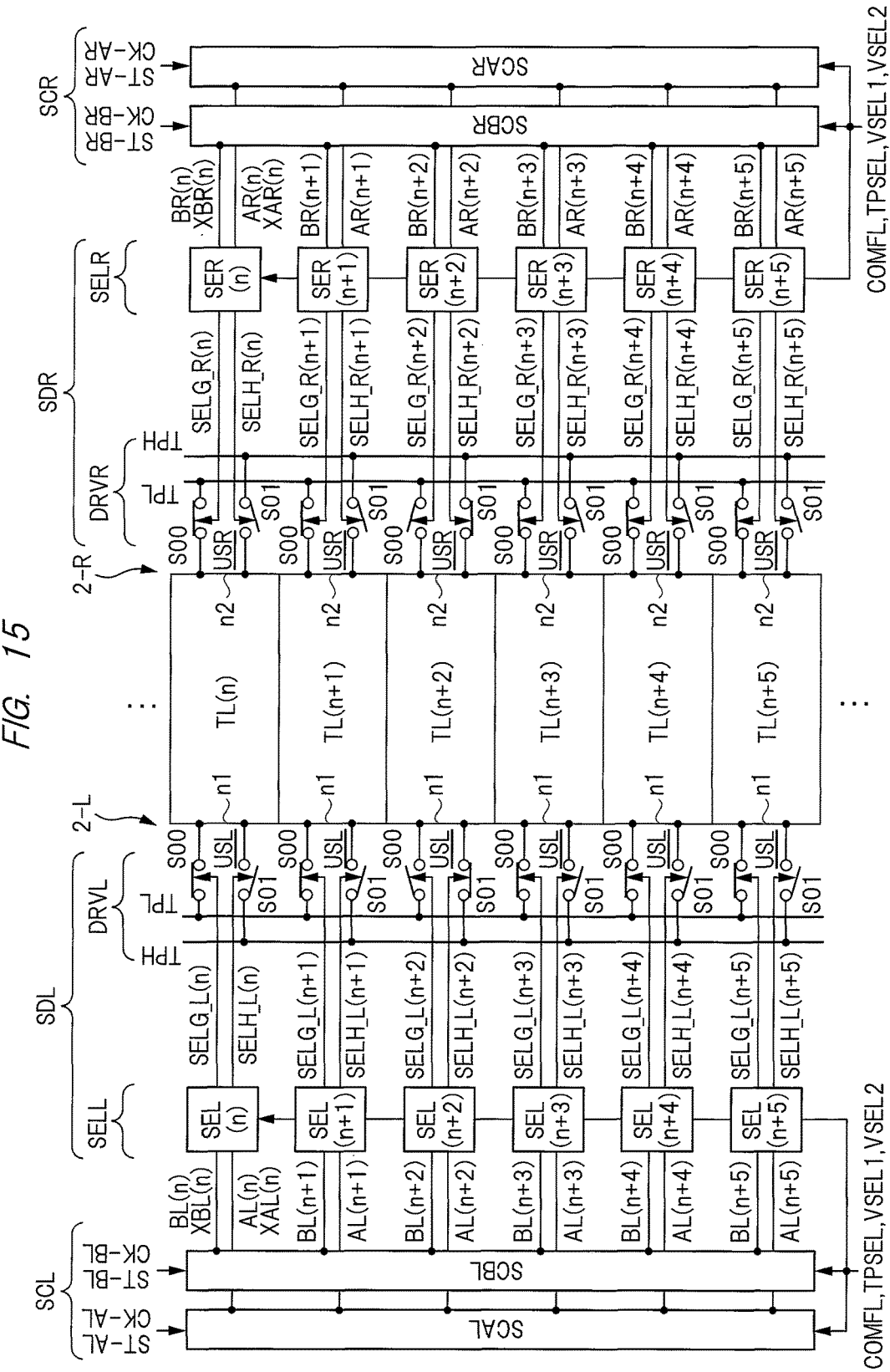
FIG. 15 is a block diagram illustrating the operation of the electric field touch detection according to the first embodiment.

The electric field touch detection period TC(n) has been described by way of example. Similarly, also in the electric field touch detection periods TC(n+1) to TC(n+5), the high level indicating selection of the drive electrode moves from one shift stage to another shift stage, and thus, an electric field is generated at the selected drive electrodes TL(n+1) to TL(n+5). For example, in FIGS. 13 and 14, at the timing which is the electric field touch detection period TC(n+2), the shift stages FAL(n+2) and FAR(n+2) hold the high level indicating selection of the drive electrode TL(n+2). Thus, the second unit selection signals SELG_L(n) to SELG_L(n+5) and SELG_R(n) to SELG_R(n+5), and the first unit selection signals SELH_L(n) to SELH_L(n+5) and SELH_R(n) to SELH_R(n+5) illustrated in FIGS. 13 and 14 are output, and the second switches S00 (P7L and P7R) and the first switches S01 (P6L and P6R) are brought into the state illustrated in FIG. 15. In this state, the drive electrode TL(n+2) is selected, the signal wires TPH are connected to both ends n1 and n2 of the drive electrode TL(n+2), and an electric field according to the electric field drive signal is generated at the drive electrode TL(n+2). Note that the block diagram illustrated in FIG. 15 is identical to the block diagram illustrated in FIG. 6 except connection of the first switch S01 and connection of the second switch S00. Therefore, the block diagram illustrated in FIG. 15 will not be described.

In each of the electric field touch detection periods TC(n) to TC(n+5), a change in electric field is detected as described with reference to FIGS. 3A to 3C by using the detection electrodes RL(0) to RL(p) formed on the second substrate. Detection of the change in electric field performed by using the detection electrodes is similar to the detection described with reference to FIGS. 3A to 3C and therefore will not be described.

In addition, in the display period DP, since the control signal COMFL and the detection timing signal COMSEL are at the low level and no scanner circuits select any drive electrode, according to the operation of the circuits illustrated in FIGS. 8A and 8B, the high-level first unit selection signals SELH_L and the low-level second unit selection signals SELG_L are output to all the unit selection circuits SEL, the high-level first unit selection signals SELH_R and the low-level second unit selection signals SELG_R are output to all the unit selection circuits SER, all the drive electrodes are connected to the signal wires TPL, and the display drive signal VCOMDC is supplied to all the drive electrodes. At this time, the drive electrodes TL function as a common electrode of the display device.

Second Embodiment

Figure 16:
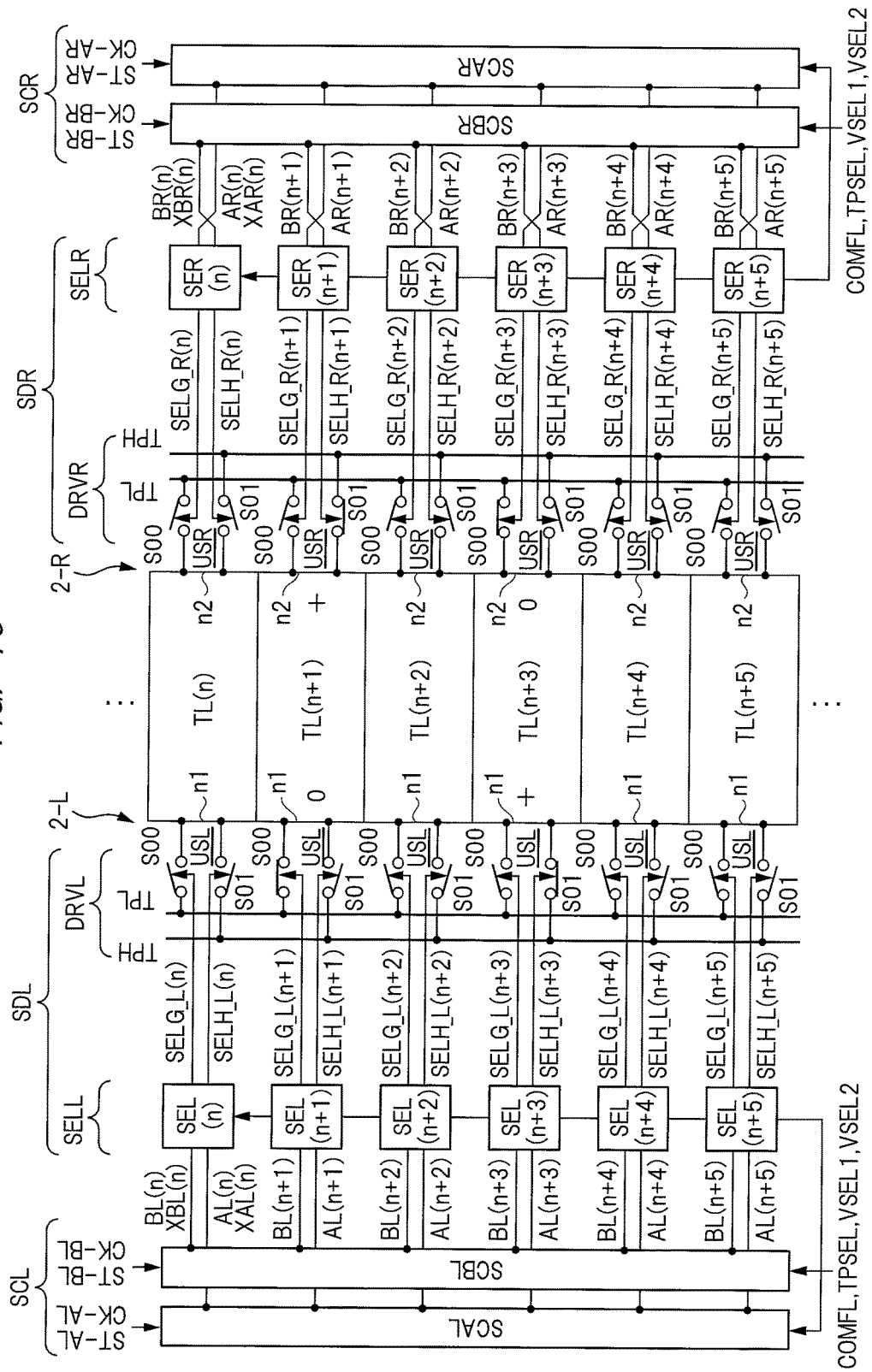
FIG. 16 is a block diagram illustrating each configuration of a first scanner circuit, a second scanner circuit, a first selection drive circuit, and a second selection drive circuit according to a second embodiment.

FIG. 16 is a block diagram illustrating each configuration of a first scanner circuit SCL, a second scanner circuit SCR, a first selection drive circuit SDL, and a second selection drive circuit SDR according to a second embodiment. FIG. 16 is similar to the above-described FIG. 6, and therefore, a point of difference will be mainly described. The point of difference between FIG. 16 and FIG. 6 is that connection destinations of the selection signals output from the scanner circuits SCAR and SCBR to the second selection drive circuit SDR are different. That is, connection destinations of the first selection signals AR(n) to AR(n+5) and the first inverted selection signals XAR(n) to XAR(n+5) supplied to the unit selection circuits SER(n) to SER(n+5) constituting the second selection drive circuit SDR, and connection destinations of the second selection signals BR(n) to BR(n+5) and the second inverted selection signals XBR(n) to XBR(n+5) supplied to the unit selection circuits SER(n) to SER(n+5) are switched. FIG. 16 and FIG. 6 are identical to each other except this point of difference.

Figure 17:
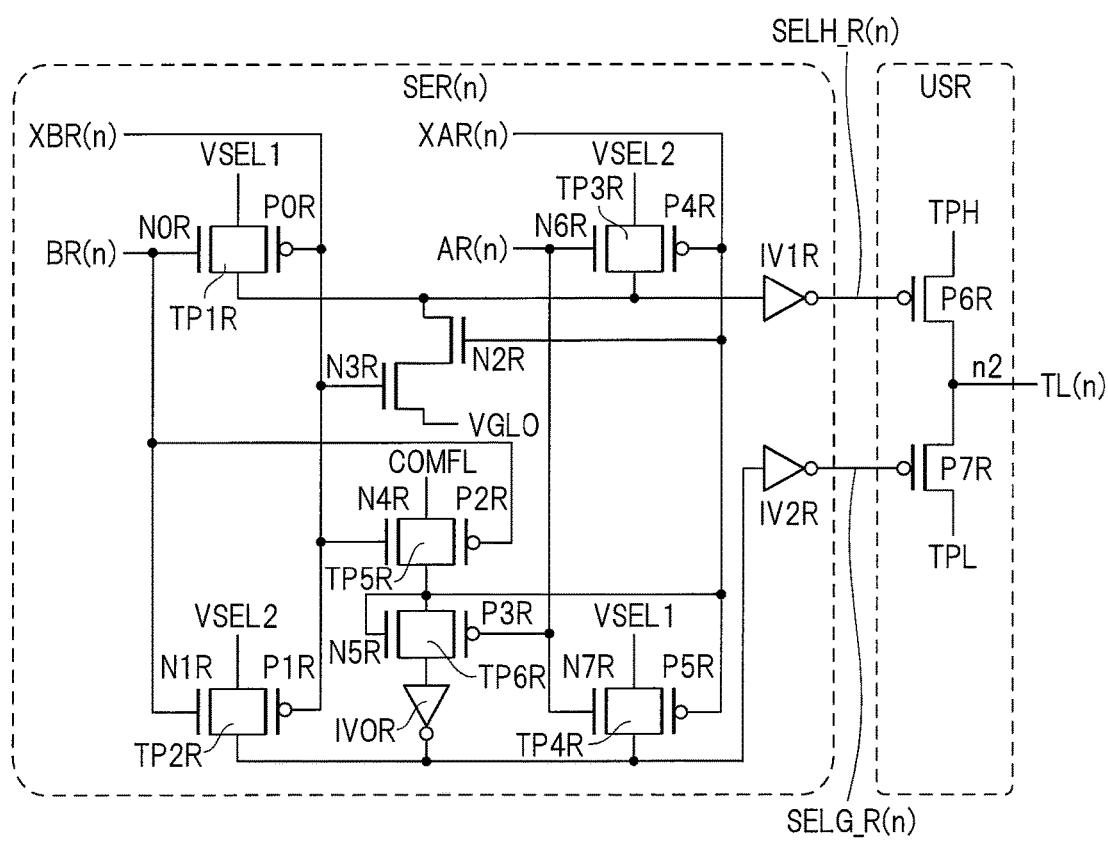
FIG. 17 is a circuit diagram illustrating a configuration of a second selection drive circuit according to the second embodiment.

FIG. 17 is a circuit diagram illustrating a configuration of the second selection drive circuit SDR according to the second embodiment. FIG. 17 illustrates only configurations of a unit selection circuit SER(n) and a unit drive circuit USR corresponding to the unit selection circuit SER(n) among a plurality of unit selection circuits constituting the second selection drive circuit SDR. Configurations of unit selection circuits SEL(n) to SEL(n+5) and corresponding drive circuits USL constituting the first selection drive circuit SDL according to the second embodiment are identical to those in the first embodiment. For example, the unit selection circuit SEL(n) and the unit drive circuit USL corresponding to the unit selection circuit SEL(n) illustrated in FIG. 16 have the configurations illustrated in FIG. 8A. The unit selection circuits SEL(n+1) to SEL(n+5) and the unit drive circuits USL corresponding to the unit selection circuit SEL(n+1) to SEL(n+5) illustrated in FIG. 16 have the configurations illustrated in FIG. 8A.

Similarly to the unit selection circuit illustrated in FIG. 8B, the unit selection circuit SER(n) illustrated in FIG. 17 includes a first transfer switch TP1R to a sixth transfer switch TP6R, N transistors N2R and N3R, and inverter circuits IV0R to IV2R. Mutual connections of the first transfer switch TP1R to the sixth transfer switch TP6R, the N transistors N2R and N3R, and the inverter circuits IV0R to IV2R are identical to those illustrated in FIG. 8B. In addition, the configuration of the unit drive circuit USR corresponding to the unit selection circuit SER(n) is identical to the configuration of the unit drive circuit illustrated in FIG. 8B.

In the unit selection circuit illustrated in FIG. 8B, switchings of the first transfer switch TP1R, the second transfer switch TP2R, and the fifth transfer switch TP5R are controlled by the first selection signal AR(n) and the first inverted selection signal XAR(n) from the scanner circuit SCAR, and switching of the N transistor N3R is controlled by the first inverted selection signal XAR(n). In addition, in the unit selection circuit illustrated in FIG. 8B, switchings of the third transfer switch TP3R, the fourth transfer switch TP4R, and the sixth transfer switch TP6R are controlled by the second selection signal BR(n) and the second inverted selection signal XBR(n) from the scanner circuit SCBR, and switching of the N transistor N2R is controlled by the second inverted selection signal XBR(n).

In contrast, in the unit selection circuit SER(n) illustrated in FIG. 17, switchings of the first transfer switch TP1R, the second transfer switch TP2R, and the fifth transfer switch TP5R are controlled by the second selection signal BR(n) and the second inverted selection signal XBR(n) from the scanner circuit SCBR, and switching of the N transistor N3R is controlled by the second inverted selection signal XBR(n). In addition, in the unit selection circuit illustrated in FIG. 17, switchings of the third transfer switch TP3R, the fourth transfer switch TP4R, and the sixth transfer switch TP6R are controlled by the first selection signal AR(n) and the first inverted selection signal XAR(n) from the scanner circuit SCAR, and switching of the N transistor N2R is controlled by the first inverted selection signal XAR(n). Here, the unit selection circuit SER(n) has been described by way of example; however, other unit selection circuits SER(n+1) to SER(n+5) are also similar. Thus, in the second embodiment, an operation performed when the first selection signal AR(n) is at the high level and an operation performed when the second selection signal BR(n) is at the high level are switched compared to operation in the first embodiment.

<Entire Operation of Magnetic Field Touch Detection>

Next, an entire operation of magnetic field touch detection in the display device 1 according to the second embodiment will be described with reference to a waveform diagram. Also here, in order to prevent a drawing from being complicated, the waveform diagram is divided into FIG. 18 and FIG. 19. The waveform diagram illustrating an operation of the display device 1 is completed by arranging FIG. 19 on the lower side of FIG. 18. Since FIGS. 18 and 19 are similar to FIGS. 11 and 12, points of difference will be mainly described here.

Similarly to the first embodiment, also in the second embodiment, the control device 3 generates the start signals ST-AR, ST-BR, ST-AL, and ST-BL, and the shift clock signals CK-AL, CK-BL, CK-AR, and CK-BR, based on information of a separation quantity stored in the separation quantity register S-REG and the number of drive electrodes bundled together, the number being stored in the bundle register C-REG. In the first embodiment, the control device 3 changes the shift clock signals CK-AL and CK-BR the number of times based on the separation quantity and the number of drive electrodes bundled together before the start period TP(ss) and supplies the high-level start signals ST-AL and ST-BR indicating selection of the drive electrode to the scanner circuits SCAL and SCBR, respectively, when the shift clock signals CK-AL and CK-BR are changed for the first time. In contrast, in the second embodiment, the control device 3 changes the shift clock signals CK-AL and CK-AR supplied to the scanner circuits SCAL and SCAR, respectively, the number of times based on the sum of the separation quantity and the number of drive electrodes bundled together before the start period TP(ss) and supplies the high-level start signals ST-AL and ST-AR indicating selection of the drive electrode to the scanner circuits SCAL and SCAR, respectively, when the shift clock signals CK-AL and CK-AR are changed m times (m is the number of bundled drive electrodes) for the first time.

Figure 18:
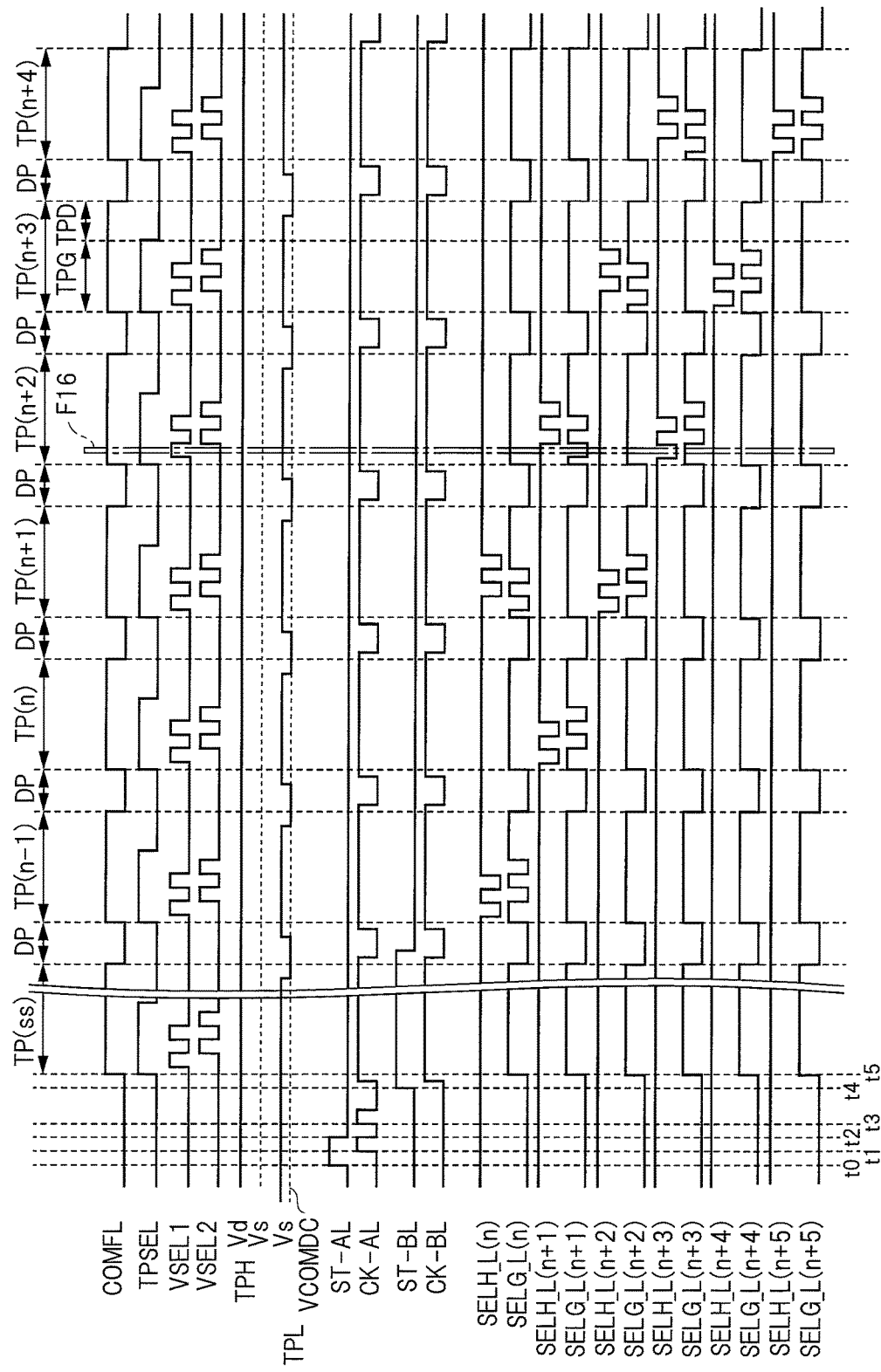
FIG. 18 is a waveform diagram illustrating an entire operation of magnetic field touch detection according to the second embodiment.
Figure 19:
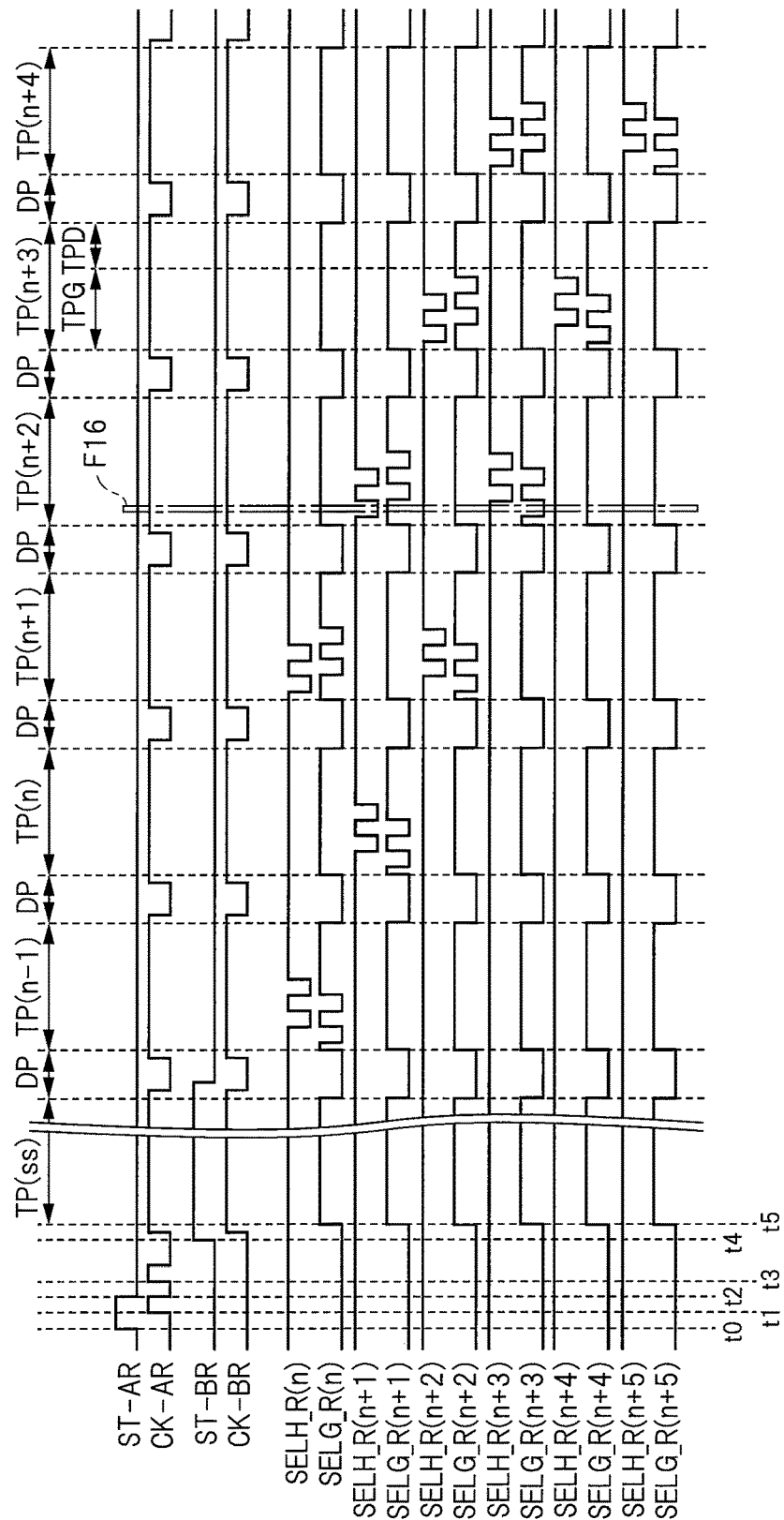
FIG. 19 is a waveform diagram illustrating the entire operation of the magnetic field touch detection according to the second embodiment.

That is, in FIGS. 18 and 19, the control device 3 changes the shift clock signals CK-AL and CK-AR at time t1 before time t5 when the start period TP(ss) starts. Also in the second embodiment, the number based on the separation quantity and the number of drive electrodes bundled together is twice, which is the same as the number in the first embodiment. Therefore, the control device 3 changes the shift clock signals CK-AL and CK-AR at time t1 and time t3 before time t5. In addition, from time t0 to time t2, the control device 3 sets the start signals ST-AL and ST-AR at the high level indicating selection of a drive electrode. Then, at time t4, the control device 3 sets the start signals ST-BL and ST-BR at the high-level indicating selection of a drive electrode. Subsequently, the control device 3 changes the shift clock signals CK-AL, CK-BL, CK-AR, and CK-BR in each of the magnetic field touch detection periods (for example, TP(n) to TP(n+5)). At this time, the control device 3 changes the shift clock signals CK-AL, CK-BL, CK-AR, and CK-BR such that these shift clock signals have the same cycle.

Thus, the scanner circuits SCAL and SCAR each output the first selection signal specifying the drive electrode closer to the drive electrode TL(p) by two drive electrodes than the drive electrode specified by the second selection signal output from each of the scanner circuits SCBL and SCBR.

When the shift clock signals CK-AL, CK-BL, CK-AR, and CK-BR change, and for example, the magnetic field touch detection period TP(n−1) has been reached, the shift stages FAL(n) and FAR(n) (see FIGS. 7A to 7D) fetch and hold the high-level start signals ST-AL and ST-AR from previous shift stages in the scanner circuits SCAL and SCAR, respectively. As a result, the first selection signals AL(n) and AR(n) become the high-level. Since the first selection signal AL(n) becomes the high-level, the first transfer switch TP1L and the second transfer switch TP2L are turned on in the unit selection circuit SEL(n) illustrated in FIG. 8A. As illustrated in FIG. 18, the unit selection circuit SEL(n) outputs the first unit selection signal SELH_L(n) and the second unit selection signal SELG_L(n) which change according to the state selection signals VSEL1 and VSEL2. In contrast, since the first selection signal AR(n) becomes the high-level, the third transfer switch TP3R and the fourth transfer switch TP4R are turned on in the unit selection circuit SER(n) illustrated in FIG. 17. As a result, as illustrated in FIG. 19, the unit selection circuit SER(n) outputs the first unit selection signal SELH_R(n) and the second unit selection signal SELG_R(n) which change according to the state selection signals VSEL1 and VSEL2.

At this time, since the connection relation of the first selection signal AR(n) and the second selection signal BR(n) in the unit selection circuit SER(n) and the connection relation of those in the unit selection circuit SEL(n) are switched, values of the first unit selection signal SELH_R(n) and the second unit selection signal SELG_R(n) output according to the values of the state selection signal VSEL1 and the state selection signal VSEL2 are opposite to those in the first embodiment.

Thus, when the state selection signal VSEL1 is at the high level and the state selection signal VSEL2 is at the low level, a drive electrode TL(n) is brought into the first drive state where the first drive voltage is supplied from a signal wire TPH to an end n1 of the drive electrode TL(n) and the second drive voltage is supplied to an end n2 of the drive electrode TL(n) from a signal wire TPL. In addition, when the state selection signal VSEL1 is at the low level and the state selection signal VSEL2 is at the high level, the drive electrode TL(n) is brought into the second drive state where the second drive voltage is supplied from the signal wire TPL to the end n1 of the drive electrode TL(n) and the first drive voltage is supplied to the end n2 of the drive electrode TL(n) from the signal wire TPH.

Next, when the shift clock signals CK-AL, CK-BL, CK-AR, and CK-BR change and for example, a magnetic field touch detection period TP(n+1) has been reached, the high-level start signals move in the shift registers of the scanner circuits SCAL, SCBL, SCAR, and SCBR and reach the shift stages FAL(n+2), FAR(n+2), FBL(n), and FBR(n). Therefore, the scanner circuits SCAL and SCAR set the first selection signals AL(n+2) and AR(n+2) to the high level such that the drive electrode TL(n+2) is selected, and the scanner circuits SCBL and SCBR set the second selection signals BL(n) and BR(n) to the high level such that the drive electrode TL(n) is selected.

Since the first selection signals AL(n+2) and AR(n+2) become the high level, first unit selection signals SELH_L(n+2) and SELH_R(n+2), and second unit selection signals SELG_L(n+2) and SELG_R(n+2) change as illustrated in FIGS. 18 and 19, according to the state selection signals VSEL1 and VSEL2. As a result, the drive electrode TL(n+2) is alternately brought into the first drive state and the second drive state, and a magnetic field is generated.

Also, since the second selection signals BL(n) and BR(n) become the high level, the third transfer switch TP3L and the fourth transfer switch TP4L illustrated in FIG. 8A are turned on, and a first transfer switch TP1R and the second transfer switch TP2L illustrated in FIG. 17 are turned on. Therefore, the first unit selection signals SELH_L(n) and SELH_R(n) and the second unit selection signals SELG_L(n) and SELG_R(n) change according to the state selection signals VSEL1 and VSEL2 as illustrated in FIGS. 18 and 19. As a result, the drive electrode TL(n) is alternately brought into the second drive state and the first drive state, and a magnetic field is generated.

The magnetic field generated by the drive electrode TL(n) and the magnetic field generated by the drive electrode TL(n+2) overlap in the region of the drive electrode TL(n+1). Each magnetic field is generated by repeating the first drive state and the second drive state. Therefore, the generated magnetic field can change more times.

Subsequently, in each of the magnetic field touch detection periods TP(n+2) to TP(n+5), magnetic fields generate similarly. Note that the connection state illustrated in FIG. 16 corresponds to the state at the timing encircled by an alternate long and short dash line F16 in FIGS. 18 and 19.

Also in the second embodiment, in the magnetic field touch detection period, the non-selected drive electrodes are in a floating state. In addition, in the magnetic field touch detection period, the scan lines and the signal lines are in a floating state.

<Operation of Electric Field Touch Detection>

Figure 20:
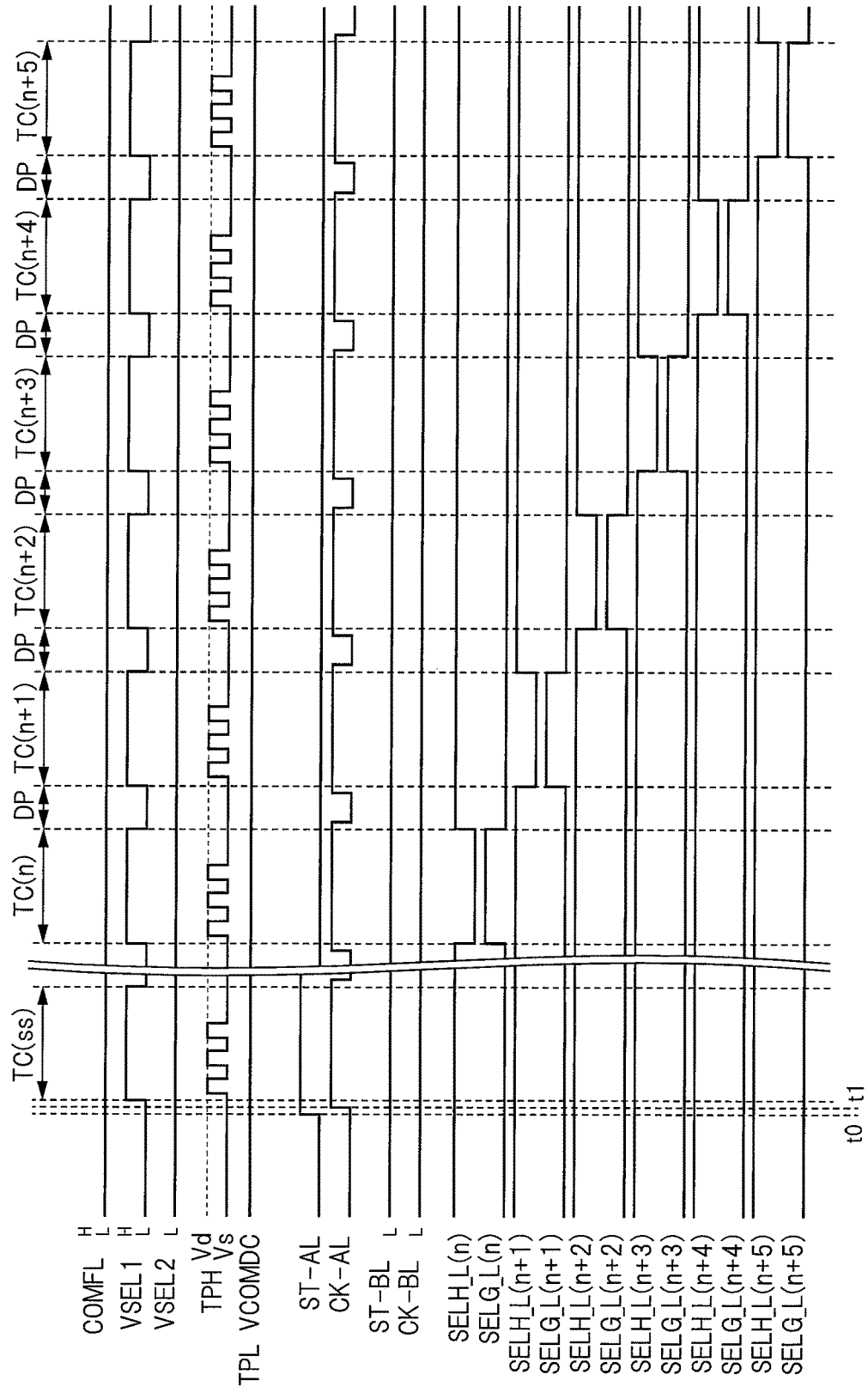
FIG. 20 is a waveform diagram illustrating an operation of electric field touch detection according to the second embodiment.
Figure 21:
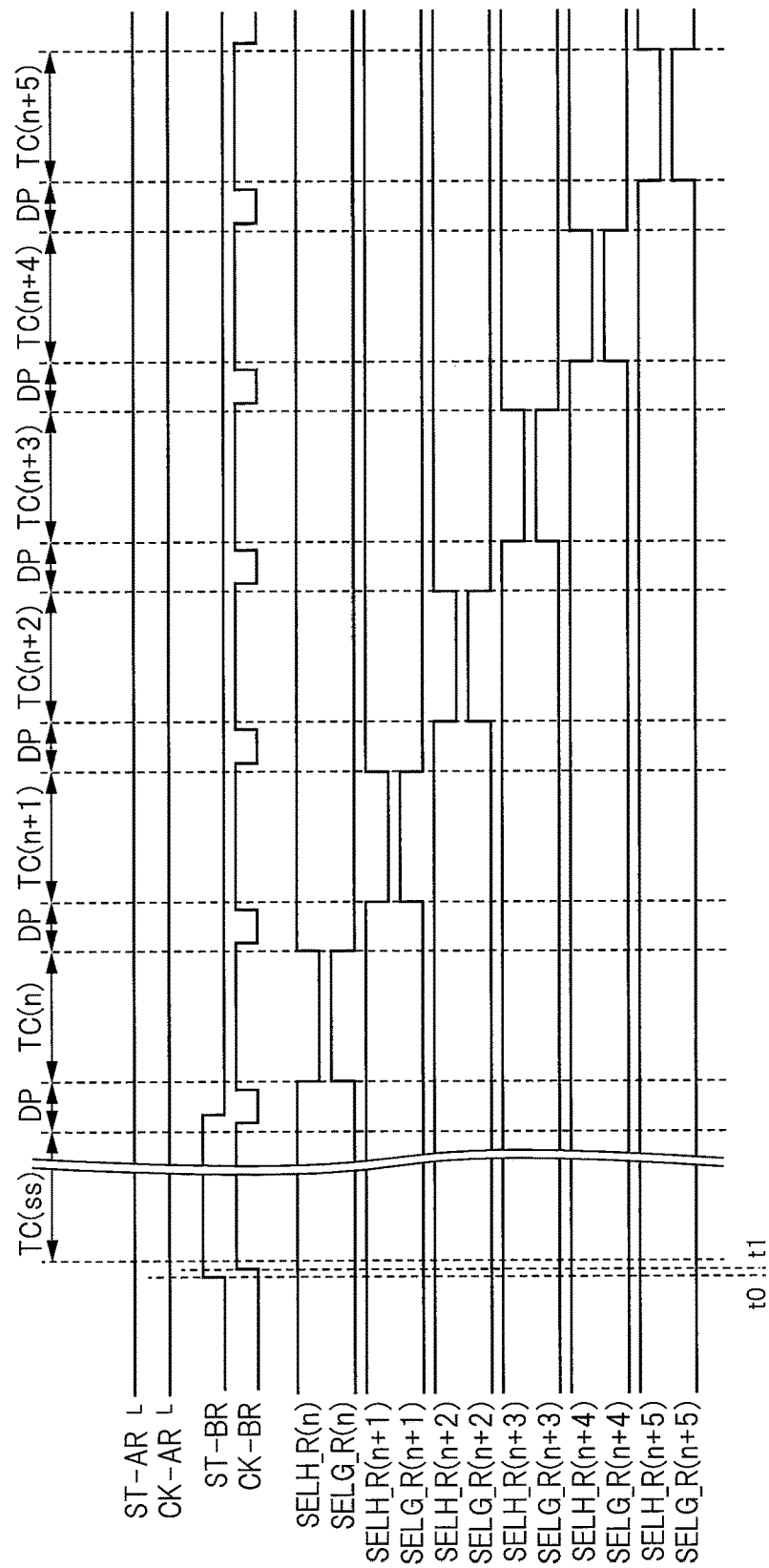
FIG. 21 is a waveform diagram illustrating the operation of the electric field touch detection according to the second embodiment.

Similarly to the first embodiment, electric field touch detection is enabled also in the second embodiment. Next, an operation in electric field touch detection will be described with reference to a waveform diagram. In order to prevent a drawing from being complicated, the waveform diagram is divided into FIG. 20 and FIG. 21 here. The waveform diagram is completed by arranging FIG. 21 on the lower side of FIG. 20. Since the FIGS. 20 and 21 are similar to FIGS. 13 and 14, points of difference will be mainly described.

Similarly to the first embodiment, also in the second embodiment, in electric field touch detection, the control device 3 generates the shift clock signals and the start signals without using the separation quantity. However, the second embodiment differs from the first embodiment in that, as illustrated in FIGS. 20 and 21, the control device 3 changes the start signal ST-BR from the low-level to the high-level indicating selection at time t0 instead of the start signal ST-AR since the operation is switched when the first selection signal AR(n) and the second selection signal BR(n) are at the high level. In addition, the control device 3 changes the shift clock signals CK-AL and CK-BR from the low-level to the high-level in each of the start period TC(ss) and the electric field touch detection periods. That is, the control device 3 periodically changes the shift clock signals CK-AL and CK-BR. In addition, as illustrated in FIGS. 20 and 21, the control device 3 maintains the start signals ST-BL and ST-AR at the low level L and maintains the shift clock signals CK-BL and CK-AR at the low level L. That is, in electric field touch detection, the shift clock signals CK-BL and CK-AR do not change.

When the shift clock signals CK-AL and CK-BR change and the high-level start signals ST-AL and ST-BR indicating selection of a drive electrode are held in the shift stages FAL(n) and FBR(n) (see FIGS. 7A to 7D), the electric field touch detection period TC(n) has been reached. Since the shift stages FAL(n) and FBR(n) store the high-level start signals ST-AL and ST-BL, the first selection signal AL(n)

and the second selection signal BR(n) become the high level. Thus, the first transfer switch TP1L and the second transfer switch TP2L illustrated in FIG. 8A and the first transfer switch TP1R and the second transfer switch TP2R illustrated in FIG. 17 are turned on. In the electric field touch detection period TC(n), as illustrated in FIGS. 20 and 21, since the state selection signal VSEL1 becomes the high level and the state selection signal VSEL2 becomes the low level, the first unit selection signals SELH_L(n) and SELH_R(n) become the high level, and the second unit selection signals SELG_L(n) and SELL_R(n) become the low level.

As a result, the one end n1 of the drive electrode TL(n) is connected to the signal wire TPH via the P transistor P6L in the unit drive circuit USL, and the other end n2 is connected to the signal wire TPH via the P transistor P6R in the unit drive circuit USR. Thus, in the electric field touch detection period TC(n), the periodically changing electric field drive signal supplied to the signal wire TPH is supplied through both ends of the drive electrode TL(n), and the drive electrode TL(n) generates an electric field.

Although the electric field touch detection period TC(n) has been described by way of example, the same goes for the other electric field touch detection periods. In addition, also in the second embodiment, since the control signal COMFL becomes the low level in the electric field touch detection period, the display drive voltage VCOMDC is supplied to the non-selected drive electrodes. Therefore, noise can be reduced. In addition, in the display period DP, no drive electrodes are selected, and the display drive voltage VCOMDC is supplied from the signal wire TPL to all the non-selected drive electrodes.

In the magnetic field touch detection period, as described with reference to FIGS. 2A to 2C, a magnetic field from the pen Pen is detected by detection electrodes RL(0) to RL(p) formed on a second substrate. In the electric field touch detection period, as described with reference to FIGS. 3A to 3C, a change in electric field is also detected by the detection electrodes RL(0) to RL(p).

Third Embodiment

In a third embodiment, each of a first drive electrode and a second drive electrode includes a plurality of adjacent drive electrodes, and the adjacent drive electrodes simultaneously change into the first drive state and the second drive state. That is, the plurality of adjacent drive electrodes are brought into the first drive state substantially simultaneously, and at the next timing, the plurality of adjacent drive electrodes are brought into the second drive state substantially simultaneously. When each of the first drive electrode and the second drive electrode includes a plurality of adjacent drive electrodes, it is possible to make a generated magnetic field strong. In addition, since the first drive state and the second drive state occur temporally alternately, the magnetic field can change many times.

Furthermore, in the third embodiment, two drive electrode bundles are arranged to be separated from each other across one drive electrode in plan view, and each of the drive electrode bundles is driven such that magnetic fields generated at the drive electrode bundles overlap with each other in the region of the drive electrode interposed between the drive electrode bundles. Thus, a stronger magnetic field can be generated in the region of the interposed drive electrode (hereinafter also referred to as a third drive electrode).

Figure 22A:
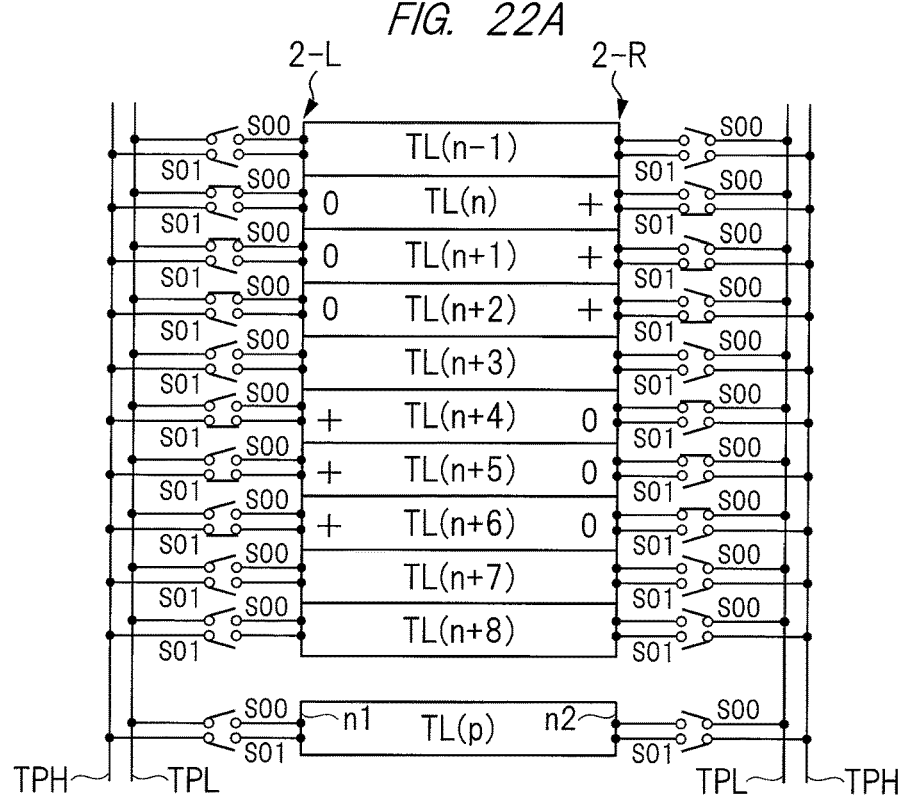
FIG. 22A is a schematic plan view illustrating a state of drive electrodes according to a third embodiment.
Figure 22B:
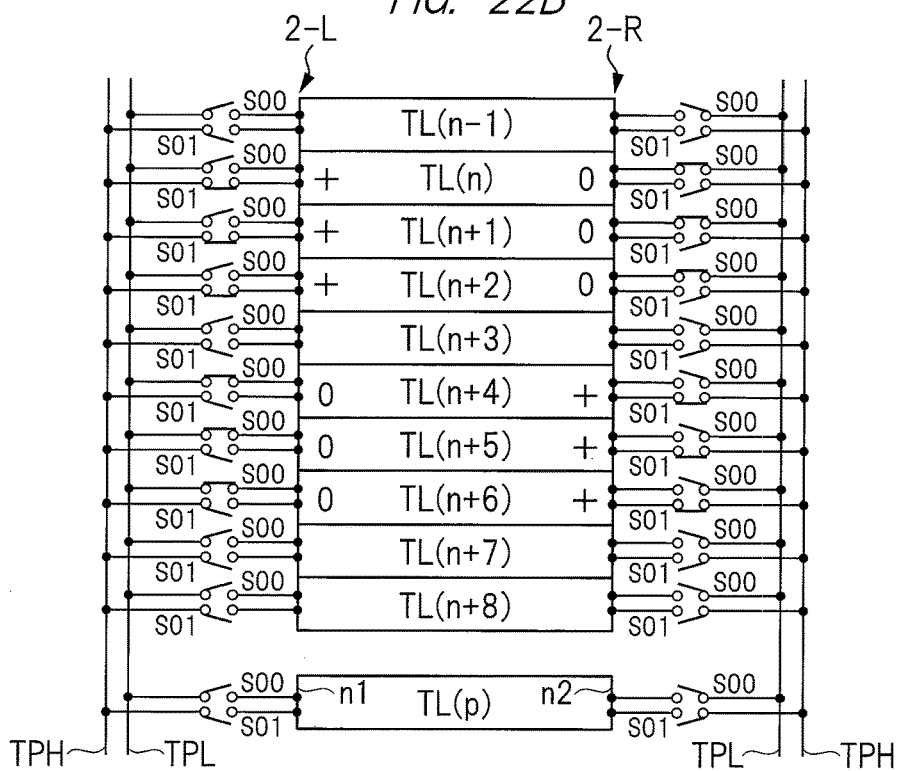
FIG. 22B is a schematic plan view illustrating another state of the drive electrodes according to the third embodiment.

The configuration of a display device 1 according to the third embodiment is similar to that in the first embodiment. The configuration of the display device 1 according to the third embodiment can be realized by making start signals and shift clock signals supplied to the first scanner circuit SCL and the second scanner circuit SCR different from those in the first embodiment. First, an outline of an operation of magnetic field touch detection according to the third embodiment will be described with reference to FIGS. 22A and 22B. FIGS. 22A and 22B are schematic plan views illustrating states of drive electrodes according to the third embodiment.

In FIGS. 22A and 22B, reference characters TL(n−1) to TL(p) denote drive electrodes arranged on the first substrate TGB. As described with reference to FIGS. 1A and 1B and the like, the drive electrodes TL(0) to TL(p) are arranged to be parallel to one another in plan view on the first substrate TGB. In FIGS. 22A and 22B, the drive electrodes TL(n−1) to TL(n+8) and TL(p) are illustrated from among the drive electrodes TL(n−1) to TL(p). In addition, in FIGS. 22A and 22B, reference characters S01 and S00 denote the first switch and the second switch described with reference to FIG. 6, respectively, and reference characters TPH and TPL denote the signal wires described with reference to FIG. 6.

FIGS. 22A and 22B illustrate a case where adjacent three drive electrodes are used as a drive electrode bundle in a magnetic field touch detection period. As a matter of course, the number of drive electrodes configuring the drive electrode bundle is not limited to this. One end n1 of each of the drive electrodes TL(n−1) to TL(p) is connected to the signal wire TPH via the first switch S01 and is connected to the signal wire TPL via the second switch S00. Also, the other end n2 of each of the drive electrodes TL(n−1) to TL(p) is connected to the signal wire TPH via the first switch S01 and is connected to the signal wire TPL via the second switch S00. Note that, in FIGS. 22A and 22B, reference characters n1 and n2 are given only to the drive electrode TL(p).

The first switch S01 and the second switch S00 connected to the one end n1 of each of the drive electrodes TL(n−1) to TL(p) constitute the unit drive circuit USL described in the first embodiment, and switchings of the first switch S01 and the second switch S00 are respectively controlled by the first unit selection signal and the second unit selection signal from the selection circuit SELL (FIG. 6). In addition, the first switch S01 and the second switch S00 connected to the other end n2 of each of the drive electrodes TL(n−1) to TL(p) constitute the unit drive circuit USR described in the first embodiment, and switchings of the first switch S01 and the second switch S00 are controlled by the first unit selection signal and the second unit selection signal from the selection circuit SELR (FIG. 6).

In the magnetic field touch detection period, the first switches S01 and the second switches S00 are controlled such that the one end n1 of each of the drive electrodes TL(n) to TL(n+2) is connected to the signal wire TPL according to the first unit selection signal and the second unit selection signal from the selection circuit SELL. At this time, the first switches S01 and the second switches S00 are controlled such that the other ends n2 of the drive electrodes TL(n) to TL(n+2) are connected to the signal wire TPH according to the first unit selection signal and the second unit selection signal from the selection circuit SELR. In the magnetic field touch detection period, as described in the first embodiment, the ground voltage Vs is supplied to the signal wire TPL, and the voltage Vd higher than the ground voltage Vs is supplied to the signal wire TPH. In FIGS. 22A and 22B, the ground voltage Vs is depicted as 0, and the voltage Vd is depicted as +.

At this time, the first switches S01 and the second switches S00 are controlled such that the one ends n1 of the drive electrodes TL(n+4) to TL(n+6) are connected to the signal wire TPH according to the first unit selection signal and the second unit selection signal from the selection circuit SELL. In addition, the first switches S01 and the second switches S00 are controlled such that the other ends n2 of the drive electrodes TL(n+4) to TL(n+6) are connected to the signal wire TPL according to the first unit selection signal and the second unit selection signal from the selection circuit SELR.

Thus, as illustrated in FIG. 22A, the drive electrodes TL(n+4) to TL(n+6) are brought into the first drive state as a drive electrode bundle, and the drive electrodes TL(n) to TL(n+2) are brought into the second drive state as a drive electrode bundle. In the drive electrode bundle brought into the first drive state, a current flows from the one end n1 toward the other end n2. Conversely, in the drive electrode bundle brought into the second drive state, a current flows from the other end n2 toward the one end n1. Thus, a magnetic field is generated at each of the plurality of drive electrodes constituting each drive electrode bundle, and the magnetic fields overlap in the region of the drive electrode TL(n+3) (the third drive electrode) interposed between the drive electrode bundles. At this time, the drive electrodes TL(n+4) to TL(n+6) can be considered as the first drive electrode, and the drive electrodes TL(n) to TL(n+2) can be considered as the second drive electrode.

At the temporally next timing, the first unit selection signal and the second unit selection signal from the selection circuit SELL cause the second voltage Vd(+) to be supplied to the one end n1 of each of the drive electrodes TL(n) to TL(n+2), and the first unit selection signal and the second unit selection signal from the selection circuit SELR cause the first voltage Vs(0) to be supplied to the other end n2 of each of the drive electrodes TL(n) to TL(n+2). At this time, the first unit selection signal and the second unit selection signal from the selection circuit SELL cause the first voltage Vs(0) to be supplied to the one end n1 of each of the drive electrodes TL(n+4) to TL(n+6), and the first unit selection signal and the second unit selection signal from the selection circuit SELR cause the second voltage Vd(+) to be supplied to the other end n2 of each of the drive electrodes TL(n+4) to TL(n+6).

Thus, at the above-described next timing, as illustrated in FIG. 22B, the drive electrode bundle constituted by the drive electrodes TL(n) to TL(n+2) is changed from the second drive state into the first drive state, and the drive electrode bundle constituted by the drive electrodes TL(n+4) to TL(n+6) is changed from the first drive state into the second drive state. Also in the case of FIG. 22B, since directions of currents flowing through the drive electrode bundles are opposite, magnetic fields generated by the drive electrode bundles overlap in the region of the drive electrode TL(n+3) arranged between the drive electrode bundles.

<Entire Operation of Magnetic Field Touch Detection>

Figure 23:
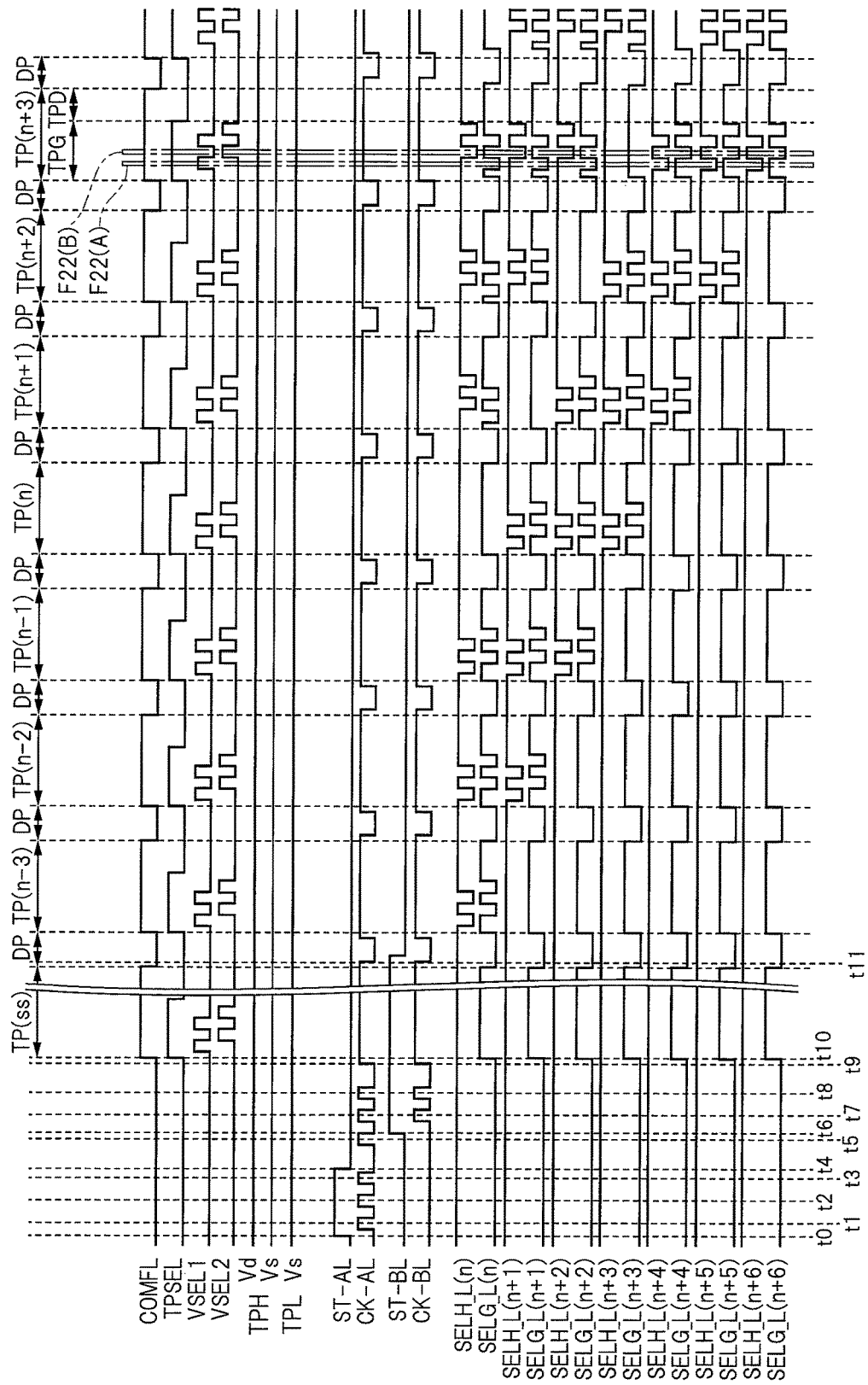
FIG. 23 is a waveform diagram illustrating an entire operation of magnetic field touch detection according to the third embodiment.
Figure 24:
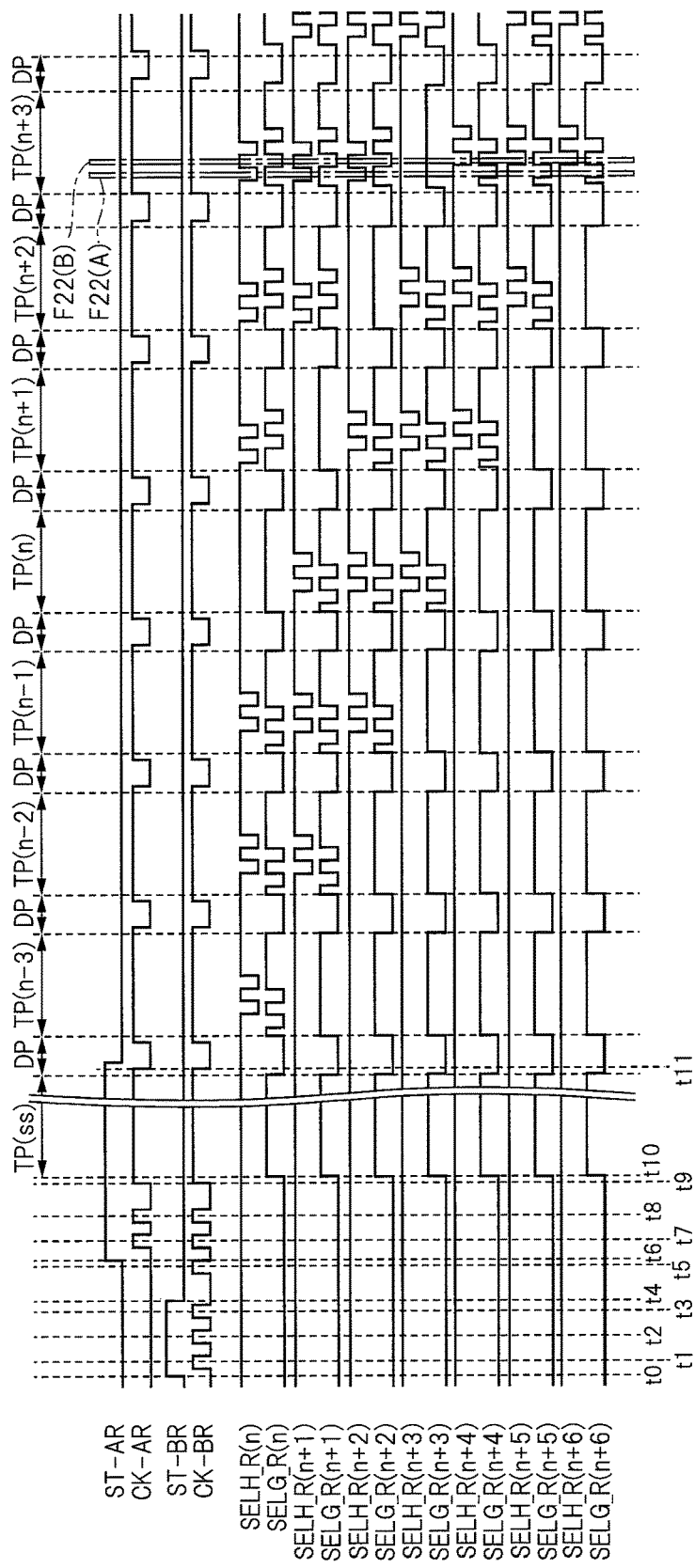
FIG. 24 is a waveform diagram illustrating the entire operation of the magnetic field touch detection according to the third embodiment.

Next, an entire operation of the magnetic field touch detection in the display device 1 according to the third embodiment will be described with reference to a waveform diagram. Also here, in order to prevent a drawing from being complicated, the waveform diagram is divided into FIG. 23 and FIG. 24. The waveform diagram is completed by arranging FIG. 24 on the lower side of FIG. 23. Since FIG. 23 and FIG. 24 are similar to FIGS. 11 and 12, points of difference will be mainly described. For example, waveforms of a control signal COMFL, a detection timing signal TPSEL, state selection signals VSEL1 and VSEL2, and drive signals TPH and TPL are identical to those illustrated in FIG. 11 and therefore will not be described.

Also in the third embodiment, the control device 3 controls such that a display period DP and the magnetic field touch detection period alternately occur. In FIGS. 23 and 24, magnetic field touch detection periods TP(n−3) to TP(n+4) in which overlapped magnetic fields are generated in the regions of the drive electrodes TL(n−3) to TL(n+4) are illustrated as the magnetic field touch detection periods.

In the third embodiment, the control device 3 generates start signals ST-AL, ST-BL, ST-AR, and ST-BR, and shift clock signals CK-AL, CK-BL, CK-AR, and CK-BR, based on information of the number m of drive electrodes bundled together (the number of drive electrodes constituting the drive electrode bundle), stored in the bundle register C-REG, and information of the separation quantity n stored in a separation quantity register S-REG. That is, by using the start signals ST-AL and ST-BL and the clock signals CK-AL and CK-BL, the control device 3 controls such that the shift registers of the scanner circuits SCAL and SCBL sequentially store the high-level start signals indicating selection of a drive electrode the number of times according to the information of the number m of drive electrodes bundled together. In addition, by using the start signals ST-AL and ST-BL and the clock signals CK-AL and CK-BL, the control device 3 controls such that a difference of stages is generated between the shift stage which stores the start signal in the shift register of the scanner circuit SCAL and the shift stage which stores the start signal in the shift register of the scanner circuit SCBL by the number of stages according to the information m+n.

Similarly, by using the start signals ST-AR and ST-BR and the clock signals CK-AR and CK-BR, the control device 3 controls such that the shift registers of the scanner circuits SCAR and SCBR sequentially store a given number of high-level start signals indicating selection of a drive electrode, the number according to the information of the number m of drive electrodes bundled together. In addition, by using the start signals ST-AR and ST-BR and the clock signals CK-AR and CK-BR, the control device 3 controls such that a difference of stages is generated between the shift stage which stores the start signal in the shift register of the scanner circuit SCAR and the shift stage which stores the start signal in the shift register of the scanner circuit SCBR by the number of stages according to the information m+n.

Here, a description will be given assuming that the number m of drive electrodes configuring the drive electrode bundle is 3 (m=3) as illustrated in FIGS. 22A and 22B, and one drive electrode is interposed between the drive electrode bundles (separation quantity n=1).

As illustrated in FIGS. 23 and 24, at time t0 before time t10 when a start period TP(ss) starts, the control device 3 changes the start signals ST-AL and ST-BR into the high level indicating selection of a drive electrode and maintains the start signals at the high level until time t4. Next, the control device 3 changes the shift clock signals CK-AL and CK-BR m times, that is, three times, at time t1, t2, and t3. Thus, the shift registers of the scanner circuits SCAL and SCBR sequentially fetch the high-level start signals ST-AL and ST-BR and store the signals in three consecutive shift stages. Then, at time t4, the control device 3 sets the start signals ST-AL and ST-BR at the low level.

Next, at time t5, the control device 3 changes the shift clock signals CK-AL and CK-BR n times according to the separation quantity, that is, once. Therefore, when the shift clock signals CK-AL and CK-BR change at time t5, the shift registers of the scanner circuits SCAL and SCBR fetch and hold the low-level start signals. Thus, three consecutive high-level start signals and one low-level start signal are stored in the shift register of each of the scanner circuits SCAL and SCBR. At this point, shift clock signals for the scanner circuits SCAL and SCBR have changed m+n times more (corresponding to four stages) than the shift clock signals for the scanner circuits SCBL and SCAR.

Next, at time t6, the control device 3 changes the start signals ST-BL and ST-AR to the high level and maintains the signals at the high level until time t11. In addition, the control device 3 changes the shift clock signals CK-AL, CK-BL, CK-AR, and CK-BR m times, that is, three times, at time t7, t8, and t9. Subsequently, the control device 3 changes the shift clock signals CK-AL, CK-BL, CK-AR, and CK-BR in each magnetic field touch detection period. Note that, as illustrated in FIGS. 23 and 24, the control device 3 does not change the shift clock signals CK-BL and CK-AR at time t1, t2, t3, and t5.

In order to maintain the difference of stages between the shift stages, the shift clock signals CK-AL and CK-BR also change the identical number of times that the shift clock signals CK-BL and CK-AR change at time t7, t8, and t9. However, since the start signals ST-AL and ST-BR are maintained at the low level, the shift registers of the scanner circuits SCAL and SCBR fetch the low-level start signals at time t7, t8, and t9. In contrast, since the start signals ST-BL and ST-AR become the high level indicating selection of a drive electrode at time t7, t8, and t9, the shift registers of the scanner circuits SCBL and SCAR fetch the high-level start signals at time t7, t8, and t9.

Each state where the shift registers of the scanner circuits SCAL, SCBR, SCBL, and SCAR store the start signals at the timing of the start period TP(ss) starting from time t10 is as follows. That is, each of the shift registers of the scanner circuits SCAL and SCBR stores the three high-level start signals, and then stores the four low-level start signals. In contrast, each of the shift registers of the scanner circuits SCBL and SCAR stores the three high-level start signals. That is, each scanner circuit sequentially stores m high-level start signals, and the scanner circuits SCAL and SCBR are ahead of the scanner circuits SCBL and SCAR by m+n shift stages.

Subsequently, every time the control device 3 changes the shift clock signals CK-AL, CK-BL, CK-AR, and CK-BR in each magnetic field touch detection period, the high-level start signals move within each of the shift registers while the above-described state is maintained.

When the shift clock signals CK-AL, CK-BL, CK-AR, and CK-BR repeatedly change and the magnetic field touch detection period TP(n+3) is reached, the shift stages FAL (n+4) to FAL(n+6) store the high-level start signals in the shift register of the scanner circuit SCAL, and the shift stages FBR(n+4) to FBR(n+6) store the high-level start signals in the shift register of the scanner circuit SCBR.

At this time, the shift stages FBL(n) to FBL(n+2) store the high-level start signals in the shift register of the scanner circuit SCBL, and the shift stages FAR(n) to FAR(n+2) store the high-level start signals in the shift register of the scanner circuit SCAR. The above-described shift stages FAL(n) to FAL(n+5), FBL(n) to FBL(n+5), FAR(n) to FAR(n+5), and FBR(n) to FBR(n+5) are illustrated in FIGS. 7A to 7D.

Note that, even though the above-described shift stages FAL(n+6), FBL(n+6), FAR(n+6), and FBR(n+6) are not illustrated in FIGS. 7A to 7D, the shift stages FAL(n+6), FBL(n+6), FAR(n+6), and FBR(n+6) are subsequent to the shift stages FAL(n+5), FBL(n+5), FAR(n+5), and FBR(n+5), respectively.

The shift stages FAL(n+4) to FAL(n+6) and FAR(n) to FAR(n+2) store the high-level start signals, and thus, the first selection signals AL(n+4) to AL(n+6) and AR(n) to AR(n+2) become the high level. In addition, the shift stages FBL(n+4) to FBL(n+6) and FBR(n) to FBR(n+2) store the high-level start signals, and thus, the second selection signals BL(n+4) to BL(n+6) and BR(n) to BR(n+2) become the high level. Since the high-level first selection signal or the high-level second selection signal is supplied to the unit selection circuits corresponding to these shift stages, the first transfer switch and the second transfer switch or the third transfer switch and the fourth transfer switch are turned on as described in the first embodiment.

Thus, as illustrated in FIGS. 23 and 24, first unit selection signals SELH_L(n) to SELH_L(n+2) and SELH_L(n+4) to SELH_L(n+6), and SELH_R(n) to SELH_R(n+2) and SELH_R(n+4) to SELH_R(n+6) change according to the changes of the state selection signals VSEL1 and VSEL2. Similarly, the second unit selection signals SELG_L(n) to SELG_L(n+2) and SELG_L(n+4) to SELG_L(n+6), and SELG_R(n) to SELG_R(n+2) and SELG_R(n+4) to SELG_R(n+6) change according to the changes of the state selection signals VSEL1 and VSEL2.

According to the changes of the above-described first unit selection signals and the second unit selection signals, the one end n1 of each of the drive electrodes TL(n) to TL(n+2) is connected to the signal wire TPH or TPL, and the other end n2 of each of the drive electrodes is connected to the signal wire TPL or TPH. Similarly, the one end n1 of each of the drive electrodes TL(n+4) to TL(n+6) is connected to the signal wire TPL or TPH, and the other end n2 of each of the drive electrodes is connected to the signal wire TPH or TPL. Thus, each of the drive electrodes TL(n) to TL(n+2) and TL(n+4) to TL(n+6) generates a magnetic field. Since directions of currents flowing through the drive electrodes TL(n) to TL(n+2) constituting a drive electrode bundle are identical to one another, directions of generated magnetic fields are identical to one another, and the magnetic fields overlap with one another. Similarly, since directions of currents flowing through the drive electrodes TL(n+4) to TL(n+6) constituting a drive electrode bundle are identical to one another, directions of generated magnetic fields are also identical to one another, and the magnetic fields overlap with one another. As a result, the magnetic fields generated by the two drive electrode bundles overlap in the region of the drive electrode TL(n+3) interposed between the two drive electrode bundles.

In FIGS. 23 and 24, the drive state illustrated in FIG. 22A is brought about by a waveform at the timing indicated by an alternate long and short dash line F22A, and the drive state illustrated in FIG. 22B is brought about by a waveform at the timing indicated by an alternate long and short dash line F22B.

That is, at the timing indicated by the line F22A, the state selection signal VSEL1 is at the high level and the state selection signal VSEL2 is at the low level. At this time, each of the first drive electrodes TL(n+4) to TL(n+6) is brought into the first drive state where the first drive voltage is supplied through the end n1 thereof and the second drive voltage is supplied through the end n2 thereof, and at the same time, each of the second drive electrodes TL(n) to TL(n+2) is brought into the second drive state where the second drive voltage is supplied through the end n1 thereof and the first drive voltage is supplied through the end n2 thereof. At the next timing indicated by the line F22B, the state selection signal VSEL1 is at the low level and the state selection signal VSEL2 is at the high level. At this time, each of the first drive electrodes TL(n+4) to TL(n+6) is brought into the second drive state where the second drive voltage is supplied through the end n1 thereof and the first drive voltage is supplied through the end n2 thereof, and at the same time, each of the second drive electrodes TL(n) to TL(n+2) is brought into the first drive state where the first drive voltage is supplied through the end n1 thereof and the second drive voltage is supplied through the end n2 thereof. As described, in the one magnetic field touch detection period TP(n+3), the drive state illustrated in FIG. 22A and the drive state illustrated in FIG. 22B alternately occur according to the number of times that the state selection signals change complementarily.

Here, the magnetic field touch detection period TP(n+3) has been described by way of example; however, the same goes for the other magnetic field touch detection periods. Note that operation in a magnetic field detection period TPD is identical to operation described with reference to FIGS. 2A to 2C and therefore will not be described.

In the third embodiment, in the magnetic field touch detection period, since each of the first drive electrode and the second drive electrode is a drive electrode bundle including a plurality of adjacent drive electrodes, it becomes possible to make a generated magnetic field strong. In addition, since each of the first drive electrode and the second drive electrode which constitutes a drive electrode bundle is temporally alternately brought into the first drive state and the second drive state, the magnetic field can change many times. As a result, the electric charge quantity stored in the capacitive element C (FIGS. 2A to 2C) of the pen Pen can be increased more, and detection sensitivity can be improved.

Figure 25:
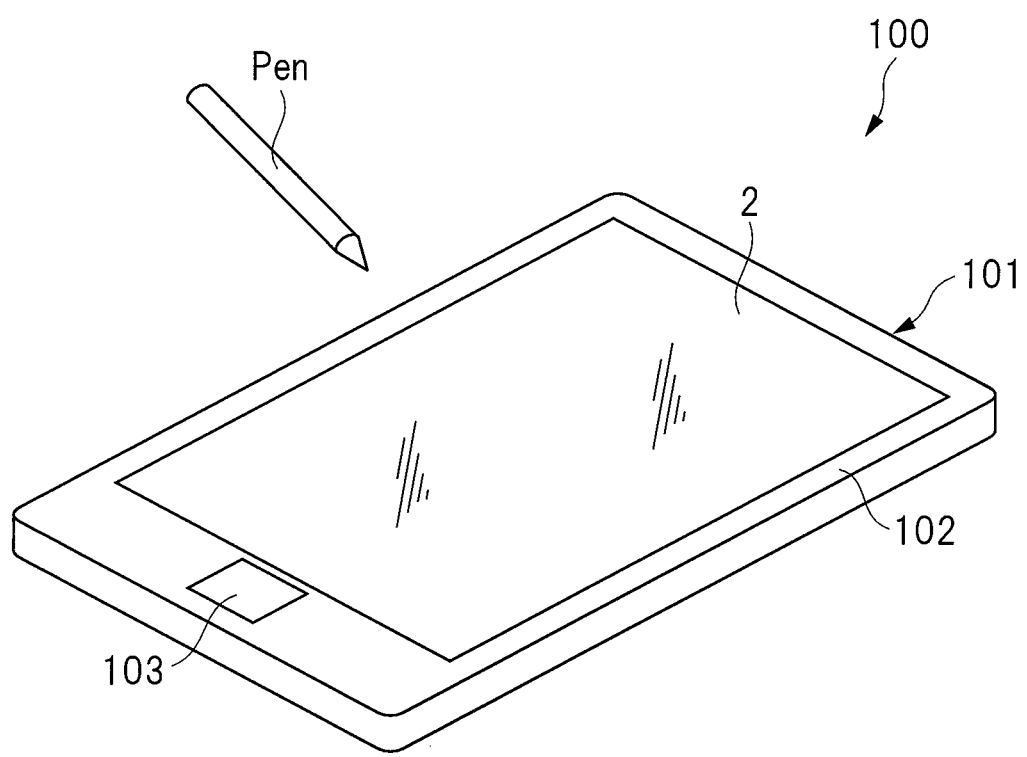
FIG. 25 is a perspective view illustrating an electronic device according to the first to the third embodiments.

FIG. 25 is a perspective view illustrating a configuration of an electronic device 100 including the display device 1 described in the first to the third embodiments. The electronic device 100 includes a tablet computer 101 including the display device 1, and the pen Pen. In FIG. 25, reference numeral 2 denotes the above-described display region, and reference numeral 102 denotes a frame arranged to surround the display region 2. In addition, reference numeral 103 denotes a button of the computer 101. The computer 101 may be a laptop or a desktop computer. The electronic device 100 may not include the pen Pen, and the computer 101 may be the electronic device 100.

The computer 101 displays an image on the display region 2 in the display period DP. The computer 101 detects whether or not the pen Pen is in proximity to or is brought into contact with the display region 2 and detects the coordinates of the pen Pen in the magnetic field touch detection periods TP(n) to TP(n+5). Also, the computer 101 detects whether or not a finger is in proximity to or is brought into contact with the display region 2 and detects the coordinates of the finger in the electric field touch detection periods TC(n) to TC(n+5). According to the detection results, the computer 101 performs processing.

Fourth Embodiment

Figure 26A:
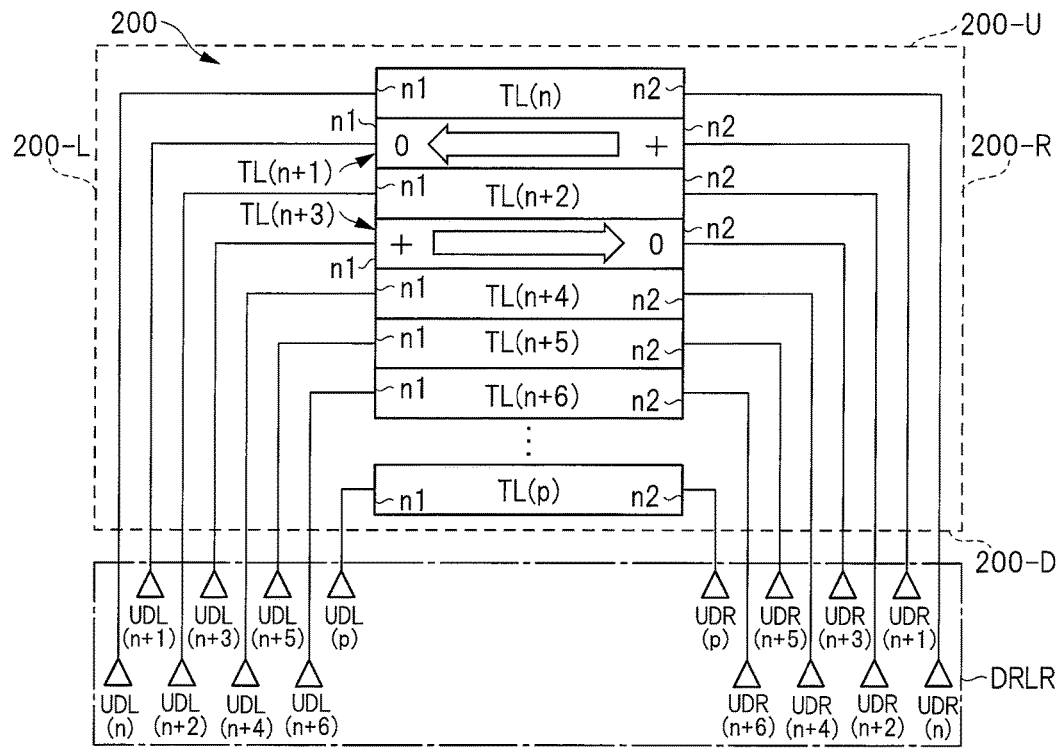
FIG. 26A is a plan view illustrating a configuration of a touch panel according to a fourth embodiment.
Figure 26B:
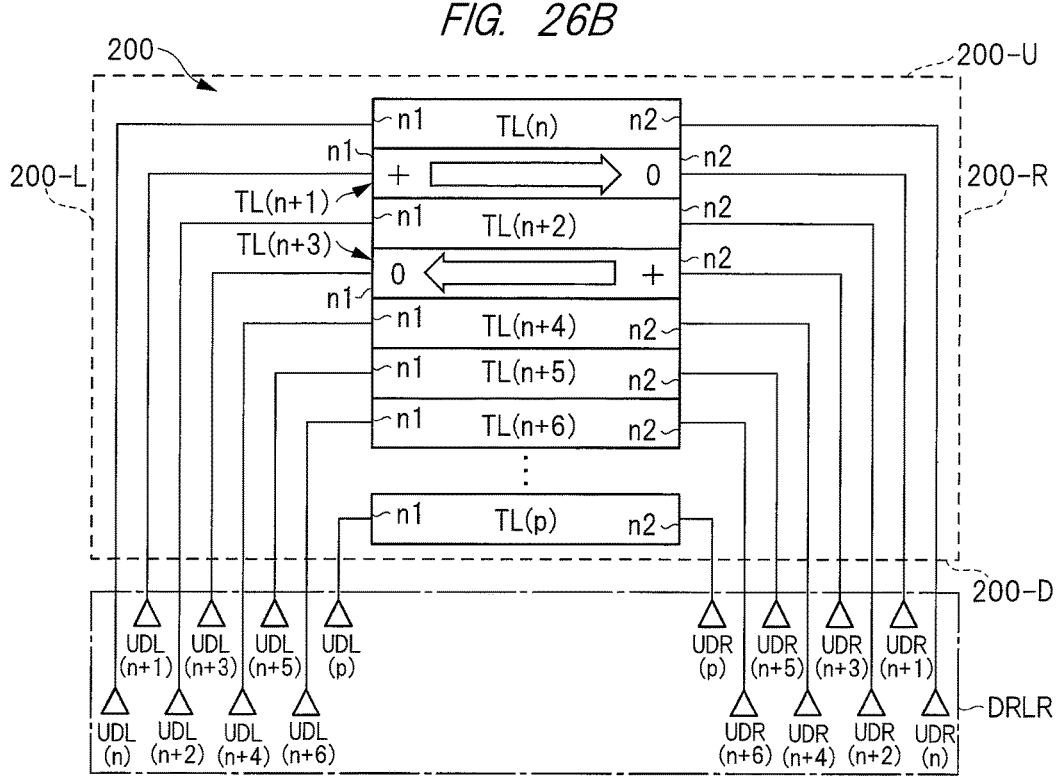
FIG. 26B is a plan view illustrating the configuration of the touch panel according to the fourth embodiment.

In the first to the third embodiments, the input detection device integrated with the display device 1 has been described. In addition, an example of the electronic device including the display device 1 has been described with reference to FIG. 25. In a fourth embodiment, a touch panel will be described as the input detection device. In this case, the touch panel can be considered as the input detection device and the electronic device. FIG. 26A is a schematic plan view illustrating a configuration of the touch panel 200 according to the fourth embodiment, and FIG. 26B is a schematic plan view illustrating the configuration of the touch panel 200 according to the fourth embodiment.

The touch panel according to the fourth embodiment does not have a display function. A touch panel 200 includes a plurality of drive electrodes TL(0) to TL(p) extending in the lateral direction and arranged in parallel to one another in the longitudinal direction in plan view, and a plurality of detection electrodes extending in the longitudinal direction and arranged in parallel to one another in the lateral direction in plan view. In FIGS. 26A and 26B, the drive electrodes TL(n) to TL(p) among the drive electrodes TL(0) to TL(p) are illustrated as examples. Even though the detection electrodes are not illustrated in FIGS. 26A and 26B, the detection electrodes are arranged such that the detection electrodes cross the drive electrodes TL(0) to TL(p) in plan view. For example, as illustrated in FIGS. 1A and 1B, the drive electrodes TL(n) to TL(p) are formed on the first substrate TGB, and as illustrated in FIGS. 1A and 1B, the detection electrodes are formed on the second substrate CGB. Thus, the drive electrodes and the detection electrodes are electrically isolated from each other.

The drive electrodes TL(n) to TL(p) generate magnetic fields in a magnetic field generation period. If a pen Pen, not illustrated, is in proximity to the drive electrode in the magnetic field generation period, a capacitive element C inside the pen Pen is charged, and a coil L1 inside the pen Pen generates a magnetic field in a magnetic field detection period. In the magnetic field detection period, the magnetic field from the pen Pen is detected by a magnetic field detection coil constituted by the detection electrodes.

One ends n1 of the drive electrodes TL(n) to TL(p) are connected to a selection drive circuit DRLR via signal wires arranged between the one ends of the drive electrodes and a side 2-L of the touch panel 200. The other ends n2 of the drive electrodes TL(n) to TL(p) are connected to the selection drive circuit DRLR via signal wires arranged between the other ends of the drive electrodes and a side 2-R of the touch panel 200.

The selection drive circuit DRLR includes unit selection drive circuits UDL(n) to UDL(p) connected to the one ends n1 of the corresponding drive electrodes TL(n) to TL(p) via the signal wires, and unit selection drive circuits UDR(n) to UDR(p) connected to the other ends n2 of the corresponding drive electrodes TL(n) to TL(p) via the signal wires.

Each of the unit selection drive circuits UDL(n) to UDL(p) selects the drive electrode and supplies a ground voltage Vs or a voltage Vd higher in voltage value than the ground voltage Vs to the one end n1 of the selected drive electrode in the magnetic field generation period. Similarly, each of the unit selection drive circuits UDR(n) to UDR(p) selects the drive electrode and supplies the voltage Vd or the ground voltage Vs to the other end n2 of the selected drive electrode in the magnetic field generation period. That is, in the present embodiment, a scanner circuit is not used, and the ground voltage Vs and the voltage Vd are selectively supplied from the selection drive circuit DRLR to each drive electrode via the corresponding signal wire.

The unit selection drive circuits UDL(n) to UDL(p) and the unit selection drive circuits UDR(n) to UDR(p) operate in synchronization with each other and select the same drive electrode in the magnetic field generation period. In addition, the unit selection drive circuits UDL(n) to UDL(p) and the unit selection drive circuits UDR(n) to UDR(p) supply a first drive voltage and a second drive voltage, which are different from each other, to the selected drive electrode. In the present embodiment, the voltage Vd is referred to as the first drive voltage, and the ground voltage Vs is referred to as the second drive voltage. However, the first drive voltage and the second drive voltage may be any values as long as the first drive voltage is higher in voltage value than the second drive voltage. Each of the first drive voltage and the second drive voltage may be an AC voltage or a DC voltage.

In FIG. 26A, the drive electrodes TL(n+1) and TL(n+3) are selected. The ground voltage Vs depicted as 0 is supplied to the one end n1 of the selected drive electrode TL(n+1) from the unit selection drive circuit UDL(n+1), and the voltage Vd depicted as + is supplied to the other end n2 of the selected drive electrode TL(n+1) from the unit selection drive circuit UDR(n+1). In addition, the voltage Vd is supplied to the one end n1 of the selected drive electrode TL(n+3) from the unit selection drive circuit UDL(n+3), and the ground voltage Vs is supplied to the other end n2 of the selected drive electrode TL(n+3) from the unit selection drive circuit UDR(n+3).

In the same magnetic field generation period, at the next timing, as illustrated in FIG. 26B, the ground voltage Vs is supplied to the one end n1 of the selected drive electrode TL(n+1) from the unit selection drive circuit UDL(n+1), and the voltage Vd is supplied to the other end n2 of the selected drive electrode TL(n+1) from the unit selection drive circuit UDR(n+1). In addition, the voltage Vd is supplied to the one end n1 of the selected drive electrode TL(n+3) from the unit selection drive circuit UDL(n+3), and the ground voltage Vs is supplied to the other end n2 of the selected drive electrode TL(n+3) from the unit selection drive circuit UDR(n+3).

Thus, in FIG. 26A, the drive electrode TL(n+3) is brought into the first drive state, and the drive electrode TL(n+1) is brought into the second drive state. In addition, at the next timing, the drive electrode TL(n+1) is brought into the first drive state, and the drive electrode TL(n+3) is brought into the second drive state (FIG. 26B). Thus, in each of the selected drive electrodes, the magnetic field can change many times.

As a result, in the region of the drive electrode TL(n+2) interposed between the selected drive electrodes TL(n+1) and TL(n+3), the overlapped magnetic fields can change many times, and detection sensitivity can be improved. In the same magnetic field generation period, the number of times that each of the state illustrated in FIG. 26A and the state illustrated in FIG. 26B occurs is not limited to one, and the state illustrated in FIG. 26A and the state illustrated in FIG. 26B repeatedly occur a plurality of times. FIGS. 26A and 26B illustrate a case where the selection drive circuit DRLR is separated from the touch panel 200; however, the arrangement of the selection drive circuit DRLR is not limited to this. For example, the selection drive circuit DRLR may be mounted on the touch panel 200. For example, the selection drive circuit DRLR may be arranged on a flexible substrate and may be connected to a glass substrate on which the drive electrodes TL(0) to TL(p) are arranged.

In the first to the fourth embodiments, currents flow through the drive electrodes arranged in parallel to each other in plan view in directions different from each other, and thus, a strong magnetic field is generated in the region interposed by the drive electrodes in the magnetic field generation period. From the viewpoint of generating a magnetic field, it can be considered that a magnetic field generation coil is constituted by at least a pair of drive electrodes driven such that currents flow through the drive electrodes in different directions from each other in the magnetic field generation period. In this case, it can be considered that a drive circuit which drives the magnetic field generation coil is constituted by the first scanner circuit SCL, the second scanner circuit SCR, the first selection drive circuit SDL, and the second selection drive circuit SDR illustrated in FIG. 4. This drive circuit drives the selected magnetic field generation coil such that the direction of the current flowing through the selected magnetic field generation coil is reversed a plurality of times at predetermined time intervals in one magnetic field touch detection period. That is, the drive circuit drives the selected magnetic field generation coil such that the direction of the current flowing through the magnetic field generation coil is reversed after a predetermined time passes.

Various modifications and alterations can be conceived by those skilled in the art within the spirit of the present invention, and it is understood that such modifications and alterations are also encompassed within the scope of the present invention.

For example, those skilled in the art can suitably modify the above-described embodiments by addition, deletion, or design change of components, or by addition, omission, or condition change of steps. Such modifications are also encompassed within the scope of the present invention as long as they include the gist of the present invention.

For example, in the above-described embodiments, the case has been described where the drive electrodes TL(0) to TL(p) extend in the row direction and are arranged in parallel to each other in the column direction. However, the row direction and the column direction change depending on the view direction. A case where the drive electrodes TL(0) to TL(p) extend in the column direction and are arranged in parallel to each other in the row direction when viewed from a different direction is also included within the scope of the present invention. In addition, the term "parallel" used in the present specification means a state where two objects extend without crossing each other from one ends to the other ends. Therefore, a state where two lines (or electrodes) are provided such that part or the whole of one line (or electrode) is inclined with respect the other line (or electrode) is also referred to as "parallel" in the present specification as long as these lines (or electrodes) do not cross each other from the one ends to the other ends.

In the present embodiment, the magnetic field drive signal is the voltage Vd, and the electric field drive signal is an AC signal which periodically changes between the ground voltage Vs and the voltage Vd. However, each of the magnetic field drive signal and the electric field drive signal is not limited to this. For example, the magnetic field drive signal may be the first magnetic filed drive signal, and the electrical field drive signal is an AC signal which periodically changes between a first electric field drive voltage and a second electric field drive voltage. The first magnetic field drive voltage may be different from at least one of the first electric field drive voltage and the second electric field drive voltage.

What is claimed is:

1. An input detection device comprising:
a plurality of drive electrodes which are arranged in parallel to each other in plan view and each of which includes a pair of ends,
wherein at least one first drive electrode among the plurality of drive electrodes is configured to be driven such that a first drive state and a second drive state temporally alternately occur,
the first drive state is a state where a first drive voltage is supplied to one end of the first drive electrode and a second drive voltage different from the first drive voltage is supplied to the other end of the first drive electrode, and the second drive state is a state where the second drive voltage, which is different from the first drive voltage, is supplied to the one end of the first drive electrode and the first drive voltage is supplied to the other end of the first drive electrode.

2. The input detection device according to claim 1, wherein the plurality of drive electrodes include a second drive electrode which is arranged in parallel to the first drive electrode,
the second drive electrode is configured to be is brought into the second drive state where the second drive voltage is supplied to one end of the second drive electrode and the first drive voltage is supplied to the other end of the second drive electrode when the first drive electrode is in the first drive state, and
the second drive electrode is configured to be brought into the first drive state where the first drive voltage is supplied to the one end of the second drive electrode and the second drive voltage is supplied to the other end of the second drive electrode when the first drive electrode is in the second drive state.

3. The input detection device according to claim 2, wherein the plurality of drive electrodes include a third drive electrode which is arranged between the first drive electrode and the second drive electrode, and
since each of the first drive electrode and the second drive electrode is temporally alternately brought into the first drive state and the second drive state, a magnetic field generated by the first drive electrode and a magnetic field generated by the second drive electrode overlap in a region where the third drive electrode is arranged.

4. The input detection device according to claim 2, wherein each of the first drive electrode and the second drive electrode is configured to be temporally alternately driven to be in the first drive state and the second drive state, and thus, a direction of a current flowing through each of the first drive electrode and the second drive electrode changes, and a direction of a magnetic field generated at each of the first drive electrode and the second drive electrode changes.

5. The input detection device according to claim 2, further comprising:
a first unit scanner circuit and a second unit scanner circuit which are arranged in proximity to the one ends of the plurality of drive electrodes;
a first selection drive circuit which is configured to supply the first drive voltage to one end of a drive electrode selected by the first unit scanner circuit and supply the second drive voltage to one end of a drive electrode selected by the second unit scanner circuit;
a third unit scanner circuit and a fourth unit scanner circuit which are arranged in proximity to the other ends of the plurality of drive electrodes; and
a second selection drive circuit which is configured to supply the first drive voltage to the other end of a drive electrode selected by the third unit scanner circuit and supply the second drive voltage to the other end of a drive electrode selected by the fourth unit scanner circuit,
wherein the first unit scanner circuit and the fourth unit scanner circuit is configured to select an identical drive electrode from among the plurality of drive electrodes as the first drive electrode, and
the second unit scanner circuit and the third unit scanner circuit is configured to select an identical drive electrode from among the plurality of drive electrodes as the second drive electrode.

6. The input detection device according to claim 5, wherein each of the first unit scanner circuit, the second unit scanner circuit, the third unit scanner circuit, and the fourth unit scanner circuit includes a shift register which has a plurality of shift stages connected in series,
the shift register is configured to shift selection information indicating selection of a drive electrode according to a shift clock signal,
a position of a shift stage which stores the selection information in the shift register of the first unit scanner circuit is apart from a position of a shift stage which stores the selection information in the shift register of the second unit scanner circuit,
the first selection drive circuit is configured to supply the first drive voltage and the second drive voltage to the drive electrodes corresponding to the positions of the shift stages which store the selection information in the first unit scanner circuit and the second unit scanner circuit,
a position of a shift stage which stores the selection information in the shift register of the third unit scanner circuit is apart from a position of a shift stage which stores the selection information in the shift register of the fourth unit scanner circuit, and
the second selection drive circuit is configured to supply the second drive voltage and the first drive voltage to the drive electrodes corresponding to the positions of the shift stages which store the selection information in the third unit scanner circuit and the forth unit scanner circuit.

7. The input detection device according to claim 6, further comprising:
a first register which is configured to store information determining a shift quantity by which the positions of the shift stages are apart.

8. The input detection device according to claim 2, wherein the plurality of drive electrodes include a third drive electrode which is arranged between the first drive electrode and the second drive electrode, and
the third drive electrode is configured to be brought into a floating potential when each of the first drive electrode and the second drive electrode is temporally alternately brought into the first drive state and the second drive state.

9. The input detection device according to claim 1, wherein the input detection device includes a magnetic field generation period in which a magnetic field is generated by the first drive electrode, and a magnetic field detection period in which a magnetic field generated by an external object is detected according to the magnetic field generated in the magnetic field generation period, and
the first drive electrode is configured to be driven such that each of the first drive state and the second drive state occurs once or more times in the magnetic field generation period.

10. The input detection device according to claim 1, wherein the input detection device is configured to drive the first drive electrode to be in the second drive state at a timing when a change amount of a current flowing through the first drive electrode becomes less than a predetermined value when the first drive electrode is driven to be in the first drive state.

11. The input detection device according to claim 1, wherein the input detection device is configured to drive the first drive electrode to be in the second drive state at a timing when a current flowing through the first drive electrode becomes steady when the first drive electrode is driven to be in the first drive state.

12. The input detection device according to claim 1, wherein the first drive electrode includes a plurality of adjacent drive electrodes.

13. An electronic device comprising:
an input detection device according to claim 1.

14. The input detection device according to claim 1, further comprising a plurality of pixels,
wherein, in each pixel, a display drive signal is supplied to the drive electrode.

15. The input detection device according to claim 1, further comprising:
a scan line; and
a signal line,
wherein at least one of the scan line and the signal line is configured to be brought into a floating potential when the drive electrode becomes at least one of the first drive state and the second drive state.

16. An input detection device comprising:
a plurality of drive electrodes which include at least one first drive electrode and are arranged on a first substrate;
a first selection drive circuit which is arranged in proximity to one ends of the plurality of drive electrodes;
a second selection drive circuit which is arranged in proximity to the other ends of the plurality of drive electrodes;
wherein, in a first period, the first selection drive circuit is configured to supply a first drive voltage to one end of the first drive electrode, and
the second selection drive circuit is configured to supply a second drive voltage which is different from the first drive voltage to the other end of the first drive electrode, and
in a second period which is different from the first period, the first selection drive circuit is configured to supply the second drive voltage to the one end of the first drive electrode, and
the second selection drive circuit is configured to supply the first drive voltage to the other end of the first drive electrode.

* * * * *